US 7,127,488 B1

(12) United States Patent
Scott et al.

(10) Patent No.: US 7,127,488 B1
(45) Date of Patent: Oct. 24, 2006

(54) SYSTEM AND METHOD FOR GATHERING INFORMATION RELATED TO A GEOGRAPHICAL LOCATION OF A CALLER IN AN INTERNET-BASED COMMUNICATION SYSTEM

(75) Inventors: David Scott, Norcross, GA (US); Xiaofeng Gao, Alpharetta, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 663 days.

(21) Appl. No.: 10/201,706

(22) Filed: Jul. 23, 2002

(51) Int. Cl.
*G06F 13/00* (2006.01)

(52) U.S. Cl. ............... 709/204; 709/219; 709/223; 709/229

(58) Field of Classification Search ............... 709/204, 709/206, 217, 219, 225, 227, 223, 229
See application file for complete search history.

(56) References Cited

U.S. PATENT DOCUMENTS

| | | | |
|---|---|---|---|
| 4,649,533 A | 3/1987 | Chorley et al. ............... 370/58 |
| 5,121,423 A | 6/1992 | Morihiro ..................... 379/142 |
| D338,889 S | 8/1993 | Fuqua et al. ............... D14/240 |
| 5,263,084 A | 11/1993 | Caput et al. ................. 379/215 |
| 5,265,145 A | 11/1993 | Lim ........................... 379/88 |
| 5,274,699 A | 12/1993 | Ranz .......................... 379/142 |
| 5,289,542 A | 2/1994 | Kessler .......................... 380/9 |
| 5,315,650 A | 5/1994 | Smith et al. ................. 379/399 |
| 5,420,914 A | 5/1995 | Blumhardt ............. 379/114.09 |
| 5,425,089 A | 6/1995 | Chan et al. ................. 379/183 |
| 5,452,346 A | 9/1995 | Miyamoto ................... 379/142 |
| 5,459,779 A | 10/1995 | Backaus et al. ........ 379/212.01 |
| 5,481,594 A | 1/1996 | Shen et al. .................... 379/67 |
| 5,481,599 A | 1/1996 | MacAllister eet al. ...... 379/101 |
| 5,530,741 A | 6/1996 | Rubin ........................ 379/142 |
| 5,546,447 A | 8/1996 | Skarbo et al. ............... 379/142 |
| 5,550,905 A | 8/1996 | Silverman .................... 379/142 |
| 5,608,788 A | 3/1997 | Demlow et al. ........ 379/142.07 |
| 5,619,561 A | 4/1997 | Reese .......................... 379/142 |
| 5,644,629 A | 7/1997 | Chow .......................... 379/142 |
| D383,466 S | 9/1997 | Burrell et al. ............. D14/240 |
| 5,696,815 A | 12/1997 | Smyk .......................... 379/142 |
| 5,724,412 A | 3/1998 | Srinivasan ............... 379/93.23 |
| 5,734,706 A | 3/1998 | Windsor et al. ............. 379/142 |
| 5,754,635 A | 5/1998 | Kim ........................... 379/142 |
| 5,771,281 A | 6/1998 | Batten, Jr. ............... 379/93.23 |
| 5,771,283 A | 6/1998 | Chang et al. ............... 379/142 |
| 5,781,621 A | 7/1998 | Lim et al. .................... 379/142 |
| 5,796,806 A | 8/1998 | Birckbichler ................ 379/67 |
| 5,802,251 A | 9/1998 | Cohen et al. .............. 395/2.84 |
| 5,805,587 A | 9/1998 | Norris et al. ............... 370/352 |

(Continued)

OTHER PUBLICATIONS

Address Allocation for Private Internets Rekhter et al.; Feb. 1996.

(Continued)

*Primary Examiner*—Viet D. Vu
(74) *Attorney, Agent, or Firm*—Thomas, Kayden, Horstemeyer, & Risley LLP

(57) ABSTRACT

In a telecommunication system having at least two communicants (i.e., a caller and a callee), a system and method are presented for collecting information associated with the geographical location of either of the communicants from a server. In one embodiment, the approach entails receiving an invite to an Internet telephony session from an Internet telephony caller device, wherein the invite to the Internet telephony session includes an Internet address of the Internet telephony caller device. Additionally, the approach includes a retrieving of a geographical location corresponding to the Internet address of the Internet telephony caller device, and collecting geographical location information associated with the retrieved geographical location.

21 Claims, 40 Drawing Sheets

U.S. PATENT DOCUMENTS

| | | | |
|---|---|---|---|
| 5,805,682 A | 9/1998 | Voit et al. | 379/142.16 |
| 5,841,838 A | 11/1998 | Itoh et al. | 379/67 |
| 5,859,903 A | 1/1999 | Lee | 379/157 |
| 5,901,212 A | 5/1999 | True et al. | 379/215 |
| 5,903,636 A | 5/1999 | Malik | 379/142 |
| 5,905,794 A | 5/1999 | Gunn et al. | 379/382 |
| 5,915,000 A | 6/1999 | Nguyen et al. | 379/52 |
| 5,940,484 A | 8/1999 | DeFazio et al. | 379/142 |
| D413,605 S | 9/1999 | Thomas | D14/241 |
| 5,948,040 A | 9/1999 | DeLorme et al. | 701/201 |
| 5,953,399 A | 9/1999 | Farris et al. | 379/201 |
| 5,969,647 A | 10/1999 | Mou et al. | 341/55 |
| 5,970,127 A | 10/1999 | Smith et al. | 379/142 |
| 5,970,128 A | 10/1999 | Kim | 379/142 |
| 5,982,866 A | 11/1999 | Kowalski | 379/127 |
| 6,021,188 A | 2/2000 | Meg | 379/142 |
| 6,044,148 A | 3/2000 | Bleile | 379/375 |
| 6,061,434 A | 5/2000 | Corbett | 379/93.35 |
| 6,101,246 A | 8/2000 | Heinmiller et al. | 379/142 |
| 6,108,630 A | 8/2000 | Kuechler et al. | 704/270 |
| 6,111,939 A | 8/2000 | Brabanec | 379/142 |
| 6,137,871 A | 10/2000 | Maier et al. | 379/142 |
| 6,144,644 A | 11/2000 | Bajzath et al. | 370/259 |
| 6,154,531 A | 11/2000 | Clapper | 379/142 |
| 6,160,876 A | 12/2000 | Moss et al. | 379/142 |
| 6,163,691 A | 12/2000 | Buettner et al. | 455/414 |
| 6,173,049 B1 | 1/2001 | Malik | 379/207 |
| 6,178,232 B1 | 1/2001 | Latter et al. | 379/88.21 |
| D437,879 S | 2/2001 | Weinandt | D18/50 |
| 6,185,289 B1 | 2/2001 | Hetz et al. | 379/221.08 |
| 6,192,115 B1 | 2/2001 | Toy et al. | 379/130 |
| 6,202,023 B1 | 3/2001 | Hancock et al. | 701/201 |
| 6,219,407 B1 | 4/2001 | Kanevsky et al. | 379/88.02 |
| 6,243,448 B1 | 6/2001 | Corbett et al. | 379/93.35 |
| 6,243,461 B1 | 6/2001 | Hwang | 379/372 |
| 6,266,399 B1 | 7/2001 | Weller et al. | 379/88.19 |
| 6,282,275 B1 | 8/2001 | Gurbani et al. | 379/142 |
| 6,292,479 B1 | 9/2001 | Bartholomew et al. | 370/352 |
| 6,292,549 B1 | 9/2001 | Lung et al. | 379/142.01 |
| 6,295,502 B1 | 9/2001 | Hancock et al. | 701/201 |
| 6,304,644 B1 | 10/2001 | Karnowski | 379/156 |
| 6,310,943 B1 | 10/2001 | Kowalski | 379/127.03 |
| 6,317,488 B1 | 11/2001 | DePond et al. | 379/93.35 |
| 6,324,271 B1 | 11/2001 | Sawyer et al. | 379/142.05 |
| 6,332,021 B1 | 12/2001 | Latter et al. | 379/142.01 |
| 6,339,639 B1 | 1/2002 | Henderson | 379/142.08 |
| 6,341,161 B1 | 1/2002 | Latter et al. | 379/142.01 |
| 6,345,187 B1 | 2/2002 | Berthoud et al. | 455/462 |
| 6,351,637 B1 | 2/2002 | Lee | 455/415 |
| 6,353,664 B1 | 3/2002 | Cannon et al. | 379/142.1 |
| 6,366,661 B1 | 4/2002 | Devillier et al. | 379/211.01 |
| 6,366,772 B1 | 4/2002 | Arnson | 455/415 |
| 6,411,692 B1 | 6/2002 | Scherer | 379/127.01 |
| 6,421,425 B1 | 7/2002 | Bossi et al. | 379/52 |
| 6,427,003 B1 | 7/2002 | Corbett et al. | 379/93.35 |
| 6,442,262 B1 | 8/2002 | Moss et al. | 379/142.02 |
| 6,445,781 B1 | 9/2002 | Heinmiller et al. | 379/142.01 |
| 6,449,351 B1 | 9/2002 | Moss et al. | 379/142.09 |
| 6,480,589 B1 | 11/2002 | Lee et al. | 379/142.04 |
| 6,493,430 B1 | 12/2002 | Leuca et al. | 379/88.12 |
| 6,493,439 B1 | 12/2002 | Lung et al. | 379/142.01 |
| 6,496,569 B1 | 12/2002 | Pelletier et al. | 379/88.21 |
| 6,496,571 B1 | 12/2002 | Wilson | 379/93.23 |
| 6,498,841 B1 | 12/2002 | Bull et al. | 379/142.08 |
| 6,529,591 B1 | 3/2003 | Dosani et al. | 379/106.03 |
| 6,539,080 B1 | 3/2003 | Bruce et al. | 379/88.17 |
| 6,542,583 B1 | 4/2003 | Taylor | 379/88.02 |
| 6,542,591 B1 | 4/2003 | Amro et al. | 379/142.01 |
| 6,542,812 B1 | 4/2003 | Obradovich et al. | 701/207 |
| 6,546,092 B1 | 4/2003 | Corbett et al. | 379/93.35 |
| 6,553,110 B1 | 4/2003 | Peng | 379/210.03 |
| 6,560,317 B1 | 5/2003 | Quagliana | 379/52 |
| 6,570,971 B1 | 5/2003 | Latter et al. | 379/142.01 |
| 6,570,974 B1 | 5/2003 | Gerszberg et al. | 379/218.01 |
| 6,574,319 B1 | 6/2003 | Latter et al. | 379/142.07 |
| 6,625,595 B1 | 9/2003 | Anderson et al. | 707/3 |
| 6,631,181 B1 | 10/2003 | Bates et al. | 379/88.18 |
| 6,639,979 B1 | 10/2003 | Kim | 379/142.06 |
| 6,650,743 B1 | 11/2003 | Heinmiller et al. | 379/142.01 |
| 6,661,785 B1 | 12/2003 | Zhang et al. | 370/352 |
| 6,687,341 B1 | 2/2004 | Koch et al. | 379/88.17 |
| 6,718,021 B1 | 4/2004 | Crockett et al. | 379/93.23 |
| 6,724,872 B1 | 4/2004 | Moore et al. | 379/93.35 |
| 6,728,355 B1 | 4/2004 | Kowalski | 379/142.06 |
| 6,731,727 B1 | 5/2004 | Corbett et al. | 379/93.35 |
| 6,732,188 B1 * | 5/2004 | Flockhart et al. | 709/245 |
| 6,748,058 B1 | 6/2004 | Bell et al. | 379/88.21 |
| 6,748,068 B1 | 6/2004 | Walsh et al. | 379/142.03 |
| 6,757,274 B1 | 6/2004 | Bedingfield et al. | 370/352 |
| 6,757,740 B1 * | 6/2004 | Parekh et al. | 709/245 |
| 6,765,998 B1 | 7/2004 | Bruce et al. | 379/88.18 |
| 6,766,003 B1 | 7/2004 | Moss et al. | 379/142.01 |
| D494,953 S | 8/2004 | Leung | D14/141.3 |
| 6,771,754 B1 | 8/2004 | Pelletier et al. | 379/142.01 |
| 6,771,755 B1 | 8/2004 | Simpson | 379/142.04 |
| 6,778,524 B1 * | 8/2004 | Augart | 370/351 |
| 6,785,301 B1 | 8/2004 | Chapman et al. | 370/522 |
| 6,785,368 B1 | 8/2004 | Eason et al. | 379/88.19 |
| 6,807,267 B1 | 10/2004 | Moss et al. | 379/207.15 |
| 6,810,077 B1 | 10/2004 | Dezonno | 375/222 |
| 6,810,115 B1 | 10/2004 | Fukuda | 379/142.01 |
| 6,813,344 B1 * | 11/2004 | Lemke | 379/142.06 |
| 6,816,481 B1 | 11/2004 | Adams et al. | 370/352 |
| 6,826,271 B1 | 11/2004 | Kanabar et al. | 379/212.01 |
| 6,831,974 B1 | 12/2004 | Watson et al. | 379/265.02 |
| 6,845,151 B1 | 1/2005 | Peng | 379/142.06 |
| 6,865,266 B1 | 3/2005 | Perhsan | 379/221.13 |
| 6,898,275 B1 | 5/2005 | Dolan et al. | 379/211.02 |
| 2001/0005854 A1 | 6/2001 | Murata et al. | 709/206 |
| 2002/0016748 A1 | 2/2002 | Emodi et al. | 705/26 |
| 2002/0055926 A1 * | 5/2002 | Dan et al. | 707/100 |
| 2002/0119430 A1 * | 8/2002 | Szynalski | 434/219 |
| 2002/0120629 A1 * | 8/2002 | Leonard | 707/100 |
| 2003/0007620 A1 | 1/2003 | Elsey et al. | 379/218.01 |
| 2003/0133553 A1 | 7/2003 | Khakoo et al. | 379/142.01 |
| 2003/0135626 A1 * | 7/2003 | Ray et al. | 709/228 |
| 2003/0187949 A1 | 10/2003 | Bhatt et al. | 709/218 |
| 2003/0196206 A1 * | 10/2003 | Shusman | 725/91 |
| 2003/0215078 A1 | 11/2003 | Brahm et al. | 379/211.02 |
| 2004/0120100 A1 | 6/2004 | Reynolds et al. | 379/88.19 |
| 2004/0192332 A1 * | 9/2004 | Samn | 455/456.1 |

OTHER PUBLICATIONS

The IP Network Address Translator (NAT) Egevang, et al.; May 1994.

SIP: Session Initiation Protocol Handley, et al.; Mar. 1999.

* cited by examiner

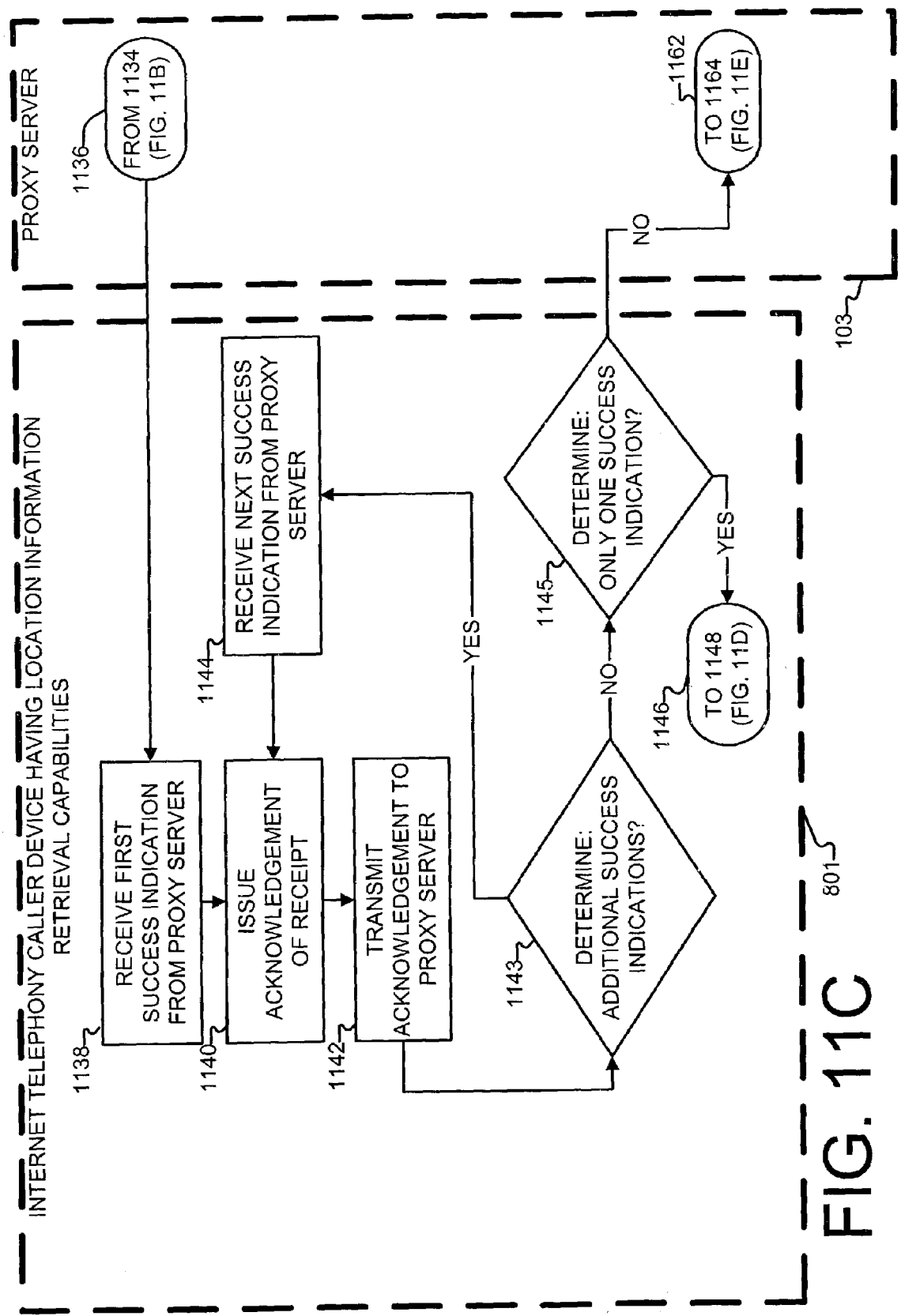

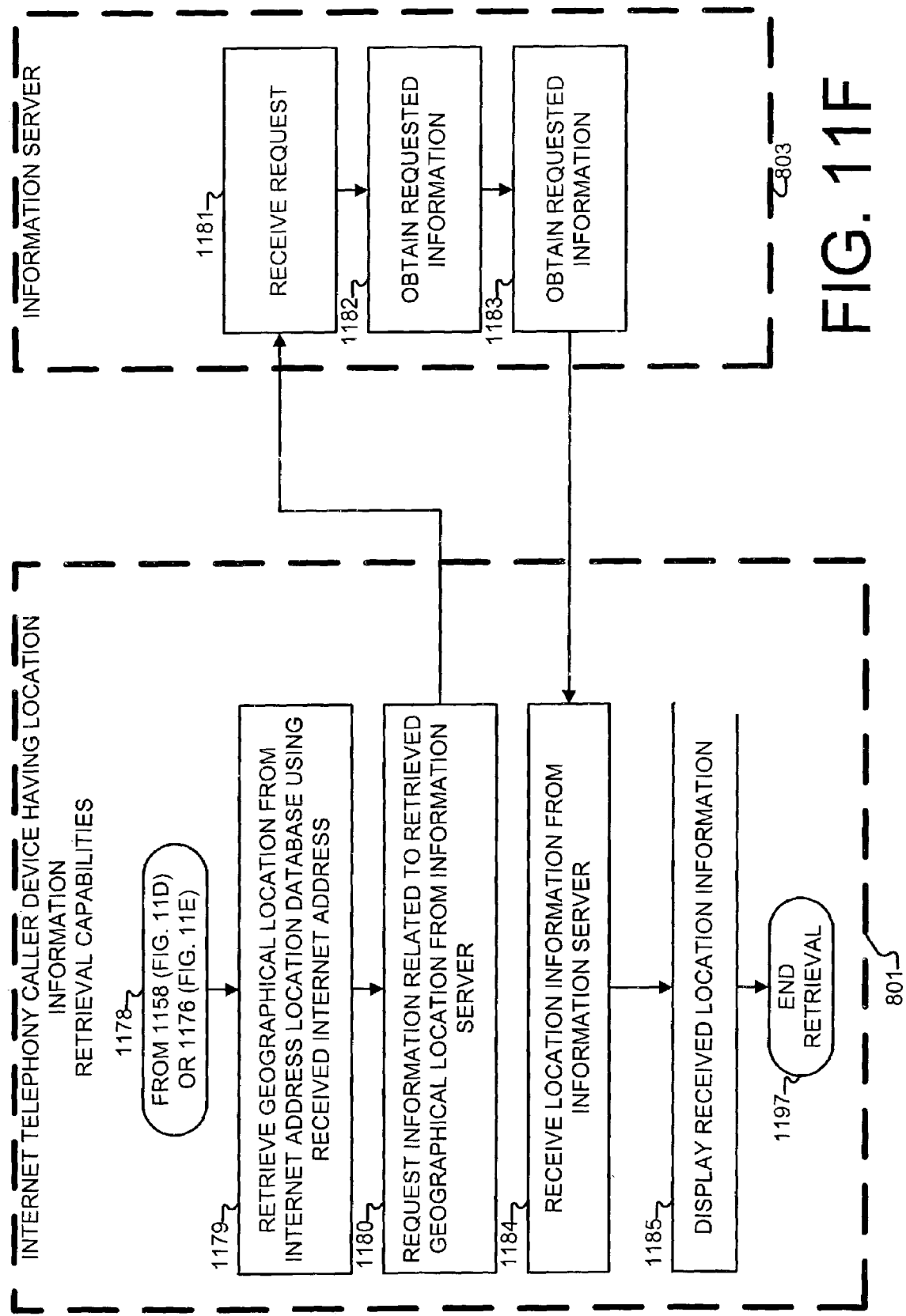

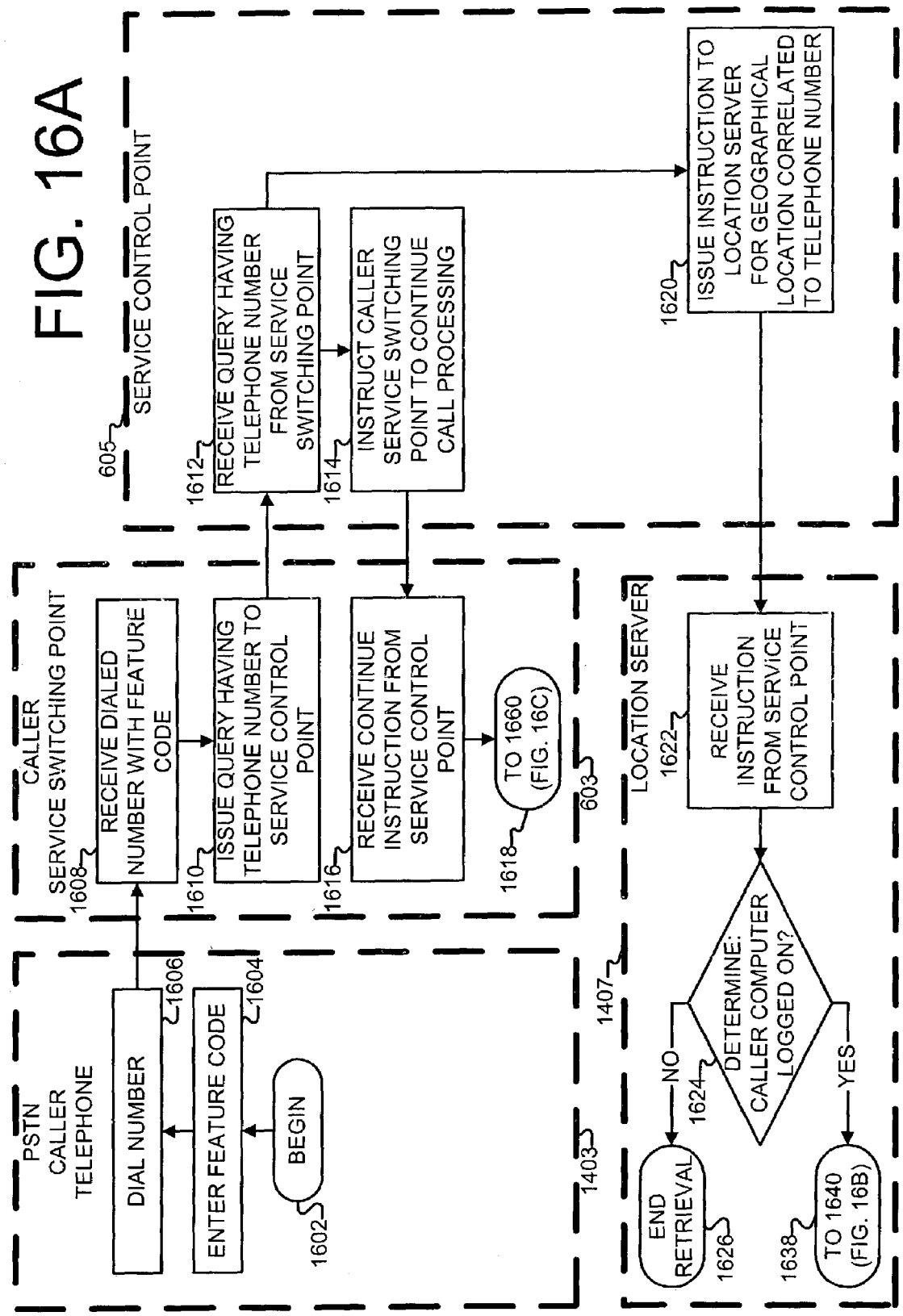

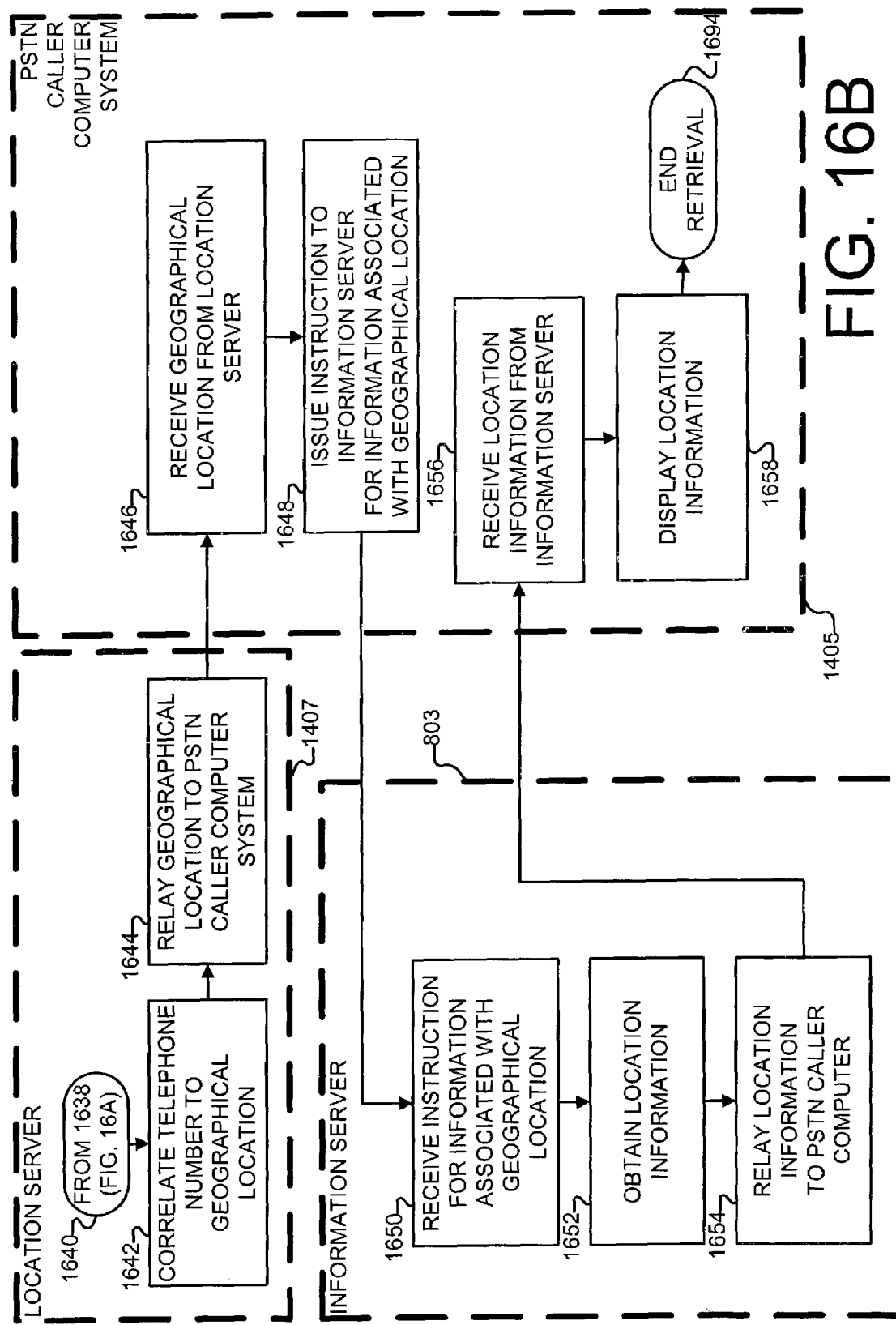

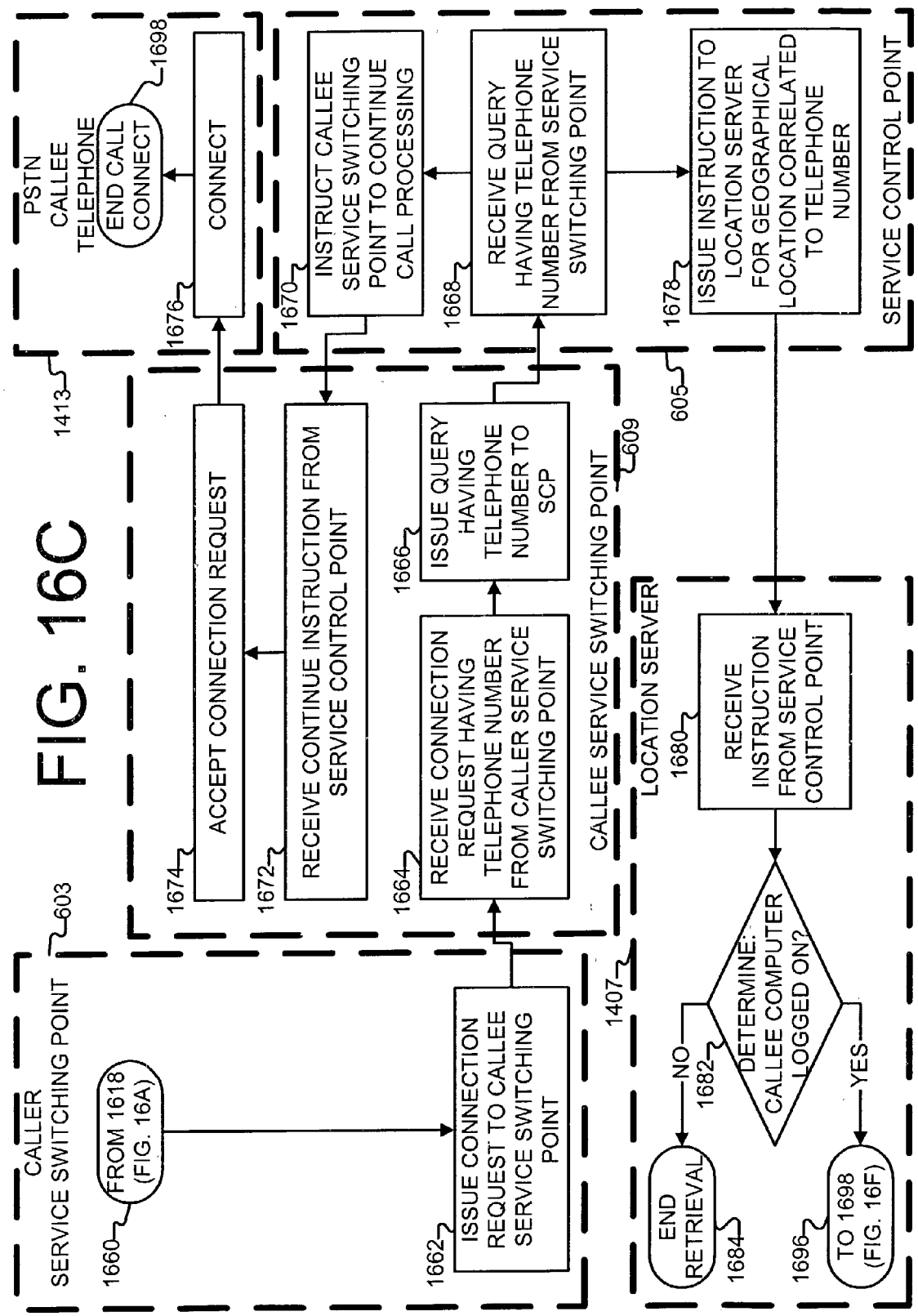

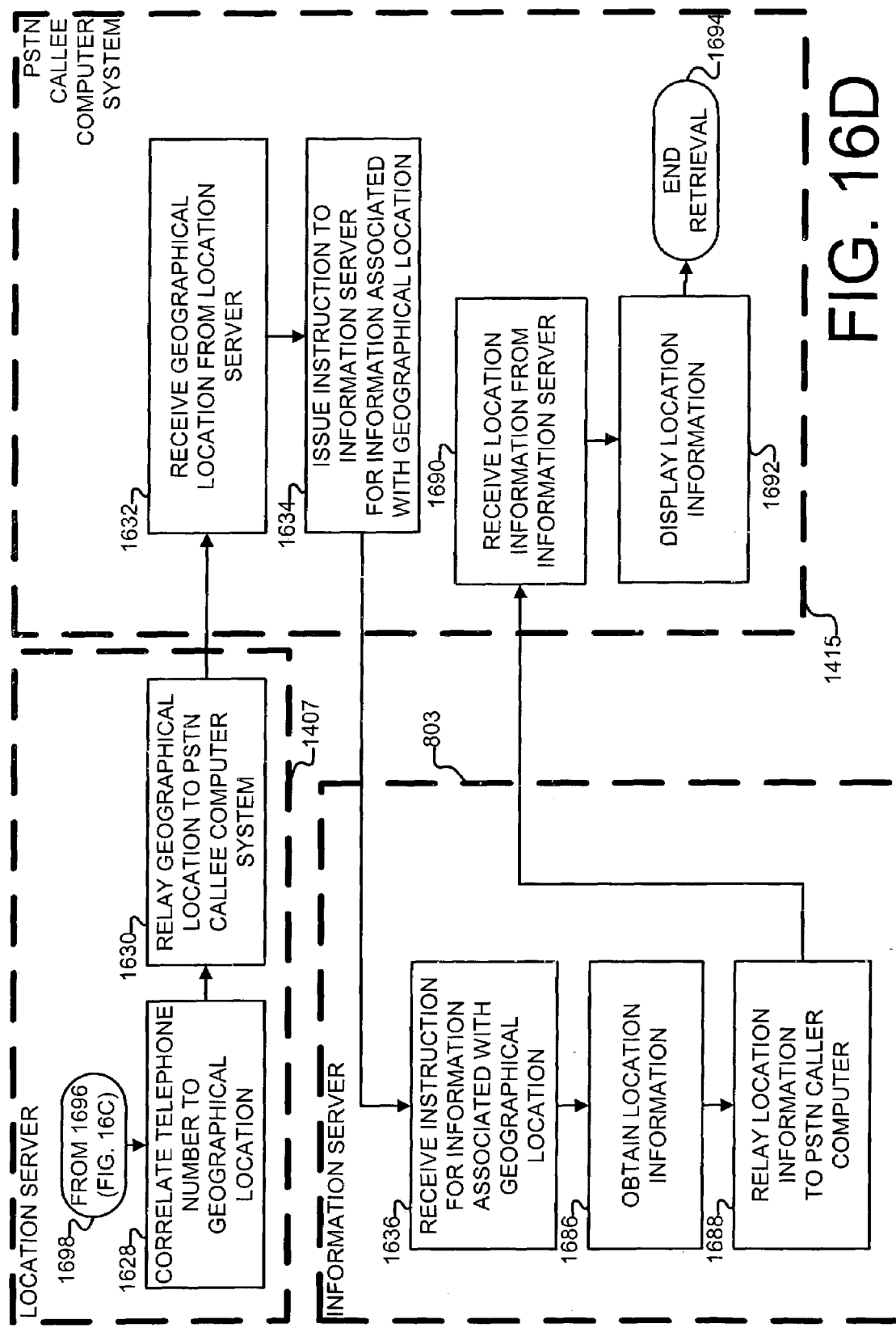

SYSTEM AND METHOD FOR GATHERING INFORMATION RELATED TO A GEOGRAPHICAL LOCATION OF A CALLER IN AN INTERNET-BASED COMMUNICATION SYSTEM

FIELD OF INVENTION

The present invention relates generally to telecommunications, and, more particularly, to a system and method for gathering information related to a geographical location.

BACKGROUND

Modern communications systems permit callers and callees, who are often separated by great distances, to freely dialogue with one another. However, when a caller initiates a call (or session) to a callee, very little information about the callee may be available to the caller prior to establishing a session. Similarly, when a callee receives a call from a caller, very little information about the caller may be available to the callee until a session has been established. In some instances, additional information about a caller or callee may facilitate dialogue between the two parties. To date, very little is available to provide such information in a communication system. A need, therefore, exists in the industry to address this deficiency.

SUMMARY

In architecture, one embodiment, among others, of the system comprises Internet telephony logic configured to respond to an invite to an Internet telephony session from an Internet telephony caller device, wherein the invite to the Internet telephony session includes an Internet address of the Internet telephony caller device. This embodiment of the system further comprises geographical location retrieval logic configured to retrieve a geographical location corresponding to the Internet address of the Internet telephony caller device, and information collection logic configured to collect geographical location information associated with the retrieved geographical location.

Another embodiment, among others, may be seen as a method comprising the step of receiving an invite to an Internet telephony session, wherein the invite to the Internet telephony session includes an Internet address of a Internet telephony caller device. This embodiment of the method further comprises the steps retrieving a geographical location corresponding to the Internet address of the Internet telephony caller device, and collecting geographical location information associated with the retrieved geographical location.

Other systems, methods, features, and advantages of the present invention will be or become apparent to one with skill in the art upon examination of the following drawings and detailed description. It is intended that all such additional systems, methods, features, and advantages be included within this description, and be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIGS. 11A through 11G are flowcharts showing another embodiment of a process for obtaining location information in an Internet telephony system.

FIGS. 16A through 16D are flowcharts showing one embodiment of a process for obtaining location information in a PSTN telephony system.

DETAILED DESCRIPTION OF THE PREFERRED EMBODIMENTS

Figure 1:
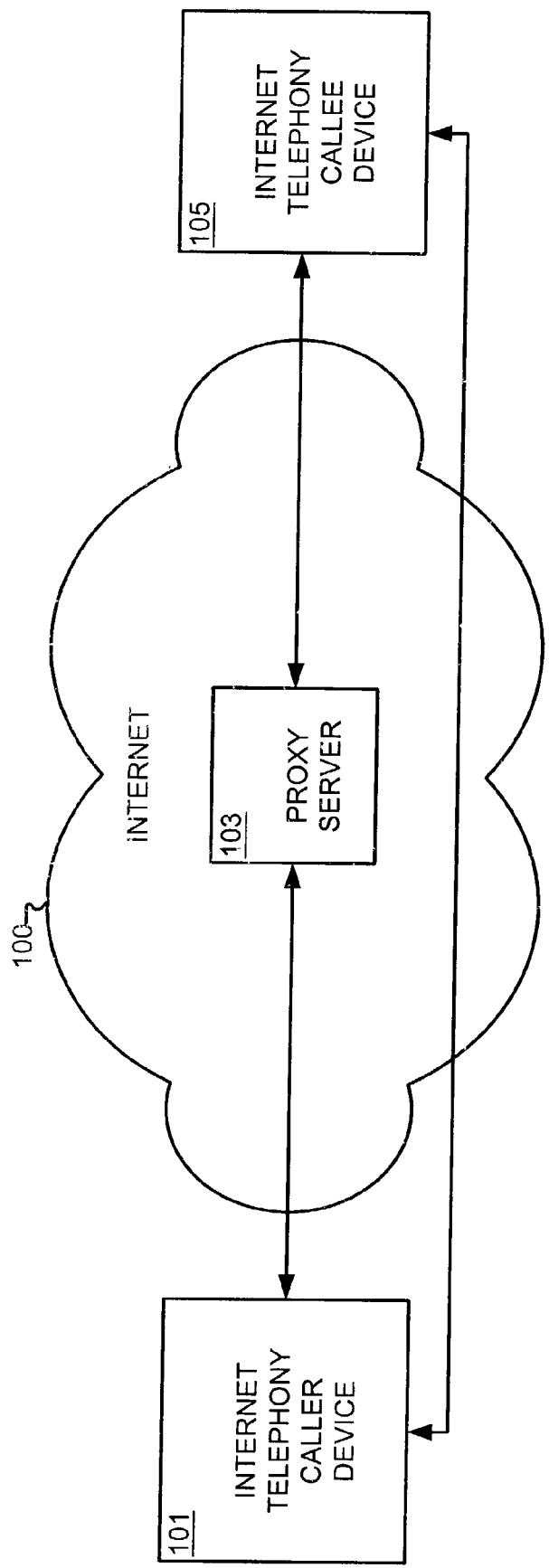
FIG. 1 is a block diagram showing an Internet telephony system of the prior art, in which a caller device and a callee device are engaged in Internet telephony.

Having summarized various aspects of the present invention, reference is now made in detail to the description of the embodiments as illustrated in the drawings. While the several embodiments are described in connection with these drawings, there is no intent to limit the invention to the embodiment or embodiments disclosed herein. On the contrary, the intent is to cover all alternatives, modifications, and equivalents included within the spirit and scope of the invention as defined by the appended claims.

FIG. 1 is a block diagram showing an Internet telephony system of the prior art, in which a caller device 101 and a callee device 105 are engaged in Internet telephony. As shown in the environment of FIG. 1, an Internet telephony caller device 101 establishes a session with an Internet telephony callee device 105 through a proxy server 103, which may be located within the Internet 100. The Internet telephony caller device 101 may be a general-purpose computer, a session initiation protocol (SIP) telephone, or any programmable device that is configured to engage in Internet telephony. Once the session has been established between the Internet telephony caller device 101 and the Internet telephony callee device 105 through the proxy server 103, the Internet telephony caller device 101 and the Internet telephony callee device 105 may engage directly in the session without the assistance of the proxy server 103. In a preferred embodiment, the session is established over the Internet 100. A prior art method, which uses the system of FIG. 1, is shown in FIGS. 2A and 2B.

Figure 2A:
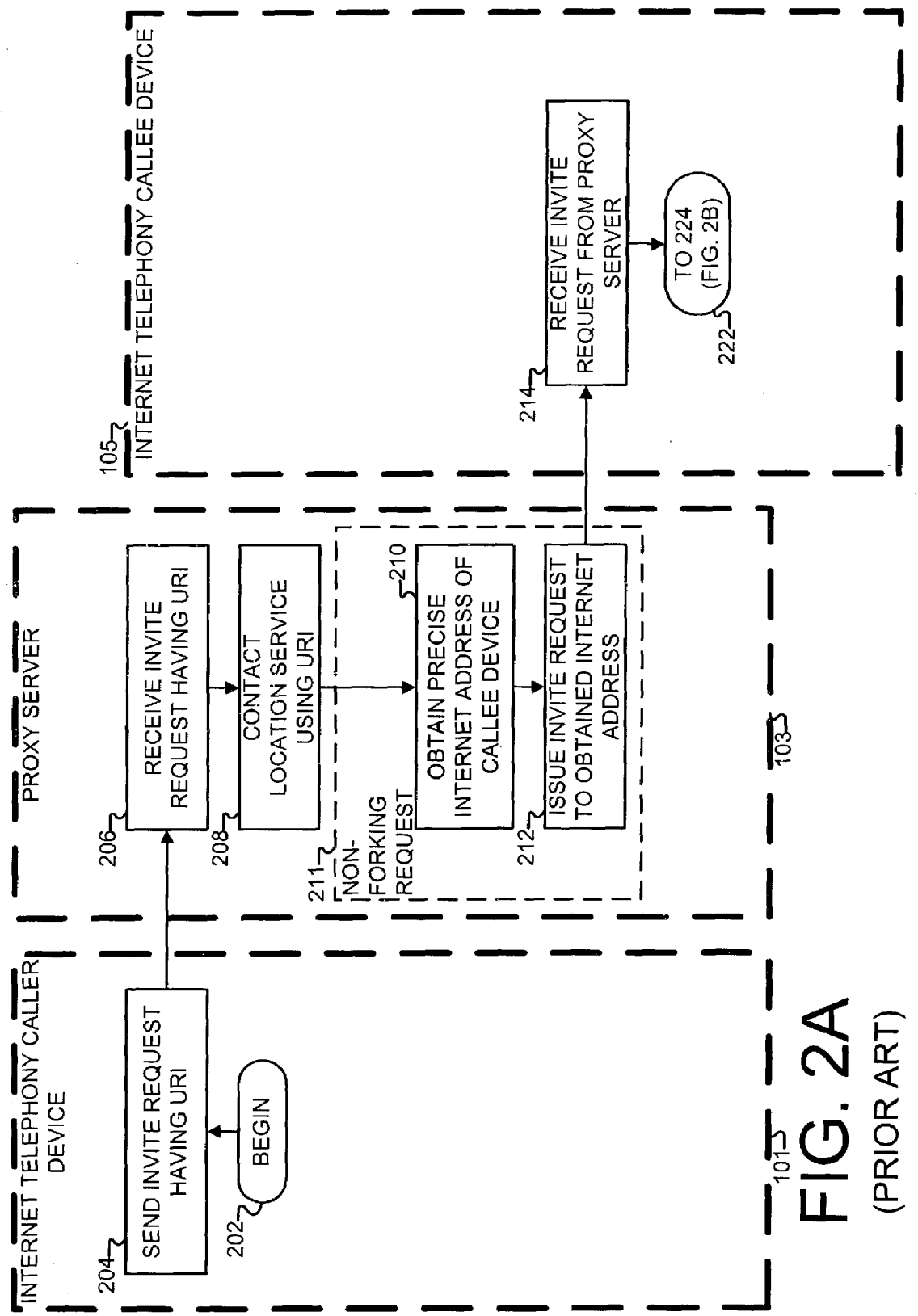
FIGS. 2A and 2B are flowcharts showing one process associated with the system of FIG. 1.
Figure 2B:
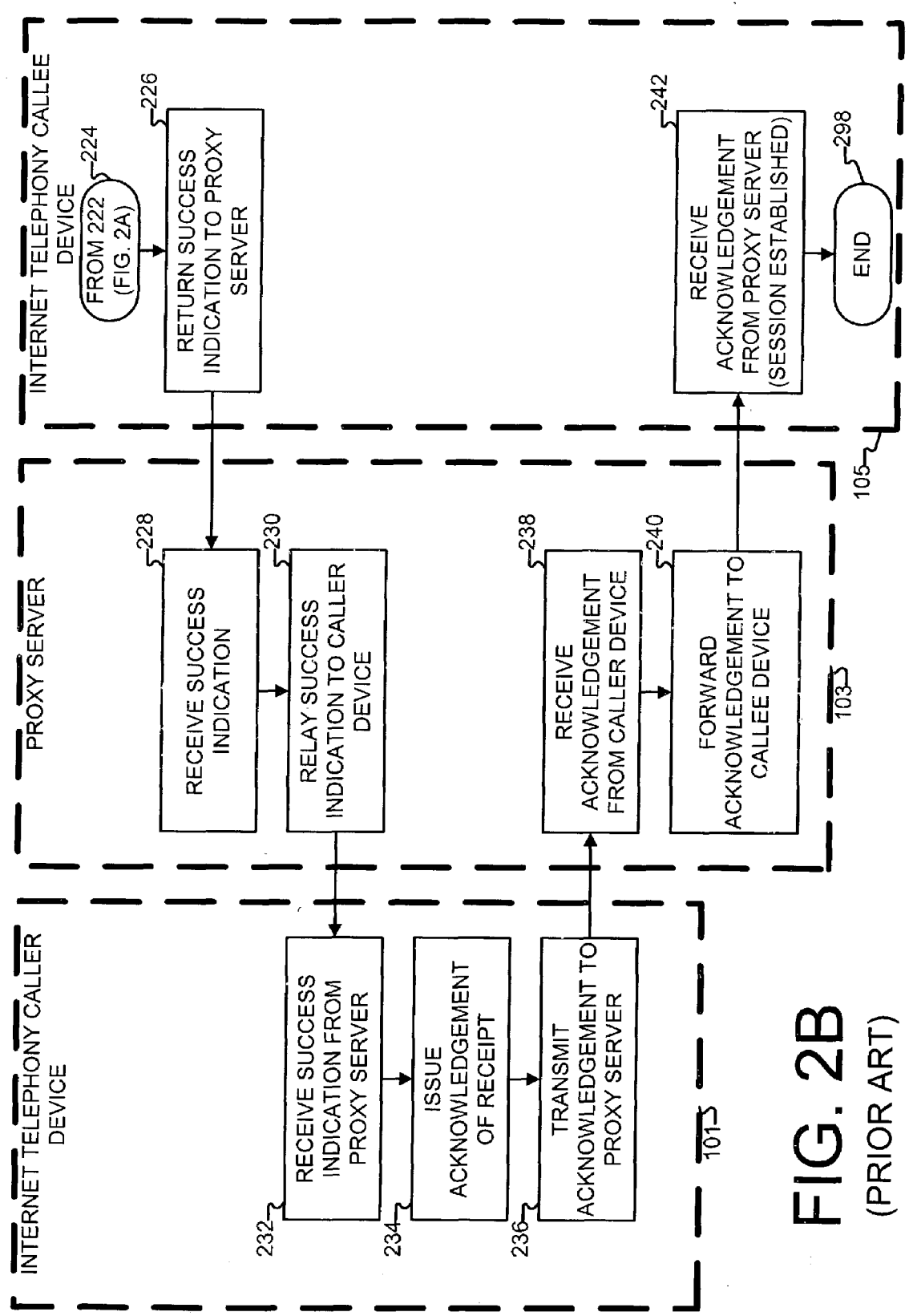

FIGS. 2A and 2B are flowcharts showing one process associated with the system of FIG. 1. In the embodiment of FIG. 2A, the process begins when an Internet telephony caller device 101 sends, in step 204, an invite request having a universal resource identifier (URI) of a desired callee. The URI may be a hypertext markup language (HTML) address, a file transfer protocol (FTP) address, a session initiation protocol (SIP) address, an email address, or any number of other identifiers. In the specific embodiment of FIG. 2A, the URI is a SIP address. The invite request sent 204 by the Internet telephony caller device 101 is received, in step 206, by a proxy server 103. The proxy server then contacts, in step 208, a location service (not shown) using the received 206 URI. If, as in the embodiment of FIGS. 2A and 2B, the request is a non-forking request 211 in which there is only one Internet protocol (IP) address located for the URI, then the proxy server 103 obtains, in step 210, the precise Internet address of the Internet telephony callee device 105, and issues, in step 212, an invite request to the obtained IP address. The issued 212 invite request is received, in step 214, by the Internet telephony callee device 105 from the proxy server 103.

At this point, the process continues in FIG. 2B, wherein the Internet telephony callee device 105 returns, in step 226, a success indication to the proxy server 103. The proxy server 103 receives, in step 228, the success indication from the Internet telephony callee device 105, and relays, in step 230, the success indication to the Internet telephony caller device 101. The relayed 230 success indication is received in step 232 by the Internet telephony caller device 101, which issues, in step 234, an acknowledgement of receipt, and transmits, in step 236, the acknowledgement to the proxy server 103. The proxy server 103 receives, in step 238, the acknowledgement from the caller device 101, and forwards, in step 240, the acknowledgement to the Internet telephony callee device 105. The Internet telephony callee device 105 receives, in step 242, the acknowledgement from the proxy server 103, thereby establishing a session between the Internet telephony caller device 101 and the Internet telephony callee device 105. Thus, as shown in the embodiment of FIGS. 2A and 2B, once the SIP session has been established between the Internet telephony caller device 101 and the Internet telephony callee device 105, a caller and a callee may freely dialogue using the established session.

While FIGS. 2A and 2B describe a process that is specific to SIP, it will be clear to one of ordinary skill in the art that other well-known Internet telephony sessions may be established using similar procedures. Additionally, while the session is described in terms of Internet telephony devices 101, 105, it will be clear to one of ordinary skill in the art that the Internet telephony devices 101, 105 may be general-purpose computers, SIP telephones, or any programmable device configured to engage in Internet telephony. Furthermore, since the process associated with a non-forking request 211 is described in detail in RFC 2543, further discussion of the process is omitted here. In any event, it can be seen from the process of FIGS. 2A and 2B that, while the Internet telephony caller device 101 has knowledge of the IP address of the Internet telephony callee device 105, and vice versa, neither the Internet telephony caller device 101 nor the Internet telephony callee device 105 has much more information than the IP address.

FIGS. 3A through 3E are flowcharts showing another process associated with the system of FIG. 1. Unlike the process described with reference to FIGS. 2A and 2B, which describe a non-forking request 211, the process of FIGS. 3A through 3E describe method steps associated with a parallel forking proxy 312. In this sense, rather than having a single IP address associated with the callee URI, the process of FIGS. 3A through 3E addresses a situation in which multiple IP addresses are associated with the callee URI. As such, the process begins with an Internet telephony caller device 101 sending, in step 304, an invite request, which has a URI of a callee. The invite request having the URI is received, in step 306, by a proxy server 103, which contacts, in step 308, a location service (not shown) using the received 306 URI. The proxy server 103 then obtains, in step 310, the precise Internet addresses of the Internet telephony callee device 105 from the location service. Since the process of FIGS. 3A through 3E relate to a situation in which multiple IP addresses are associated with the URI, the proxy server 103 issues parallel forking requests 312. For purposes of illustration, this may be seen as the proxy server 103 issuing, in step 314, an invite request to the first obtained 310 Internet address, and determining, in step 316, whether or not invitations have been issued for all obtained 310 IP addresses. If it is determined 316 that not all invite requests have been issued, then the proxy server issues, in step 318, another invite request to the next obtained 310 IP address, and again determines 316 whether or not invitations have been issued for all obtained 310 IP addresses. If, on the other hand, it is determined 316 that all invite requests have been issued, then the process continues to FIG. 3B.

Figure 3A:
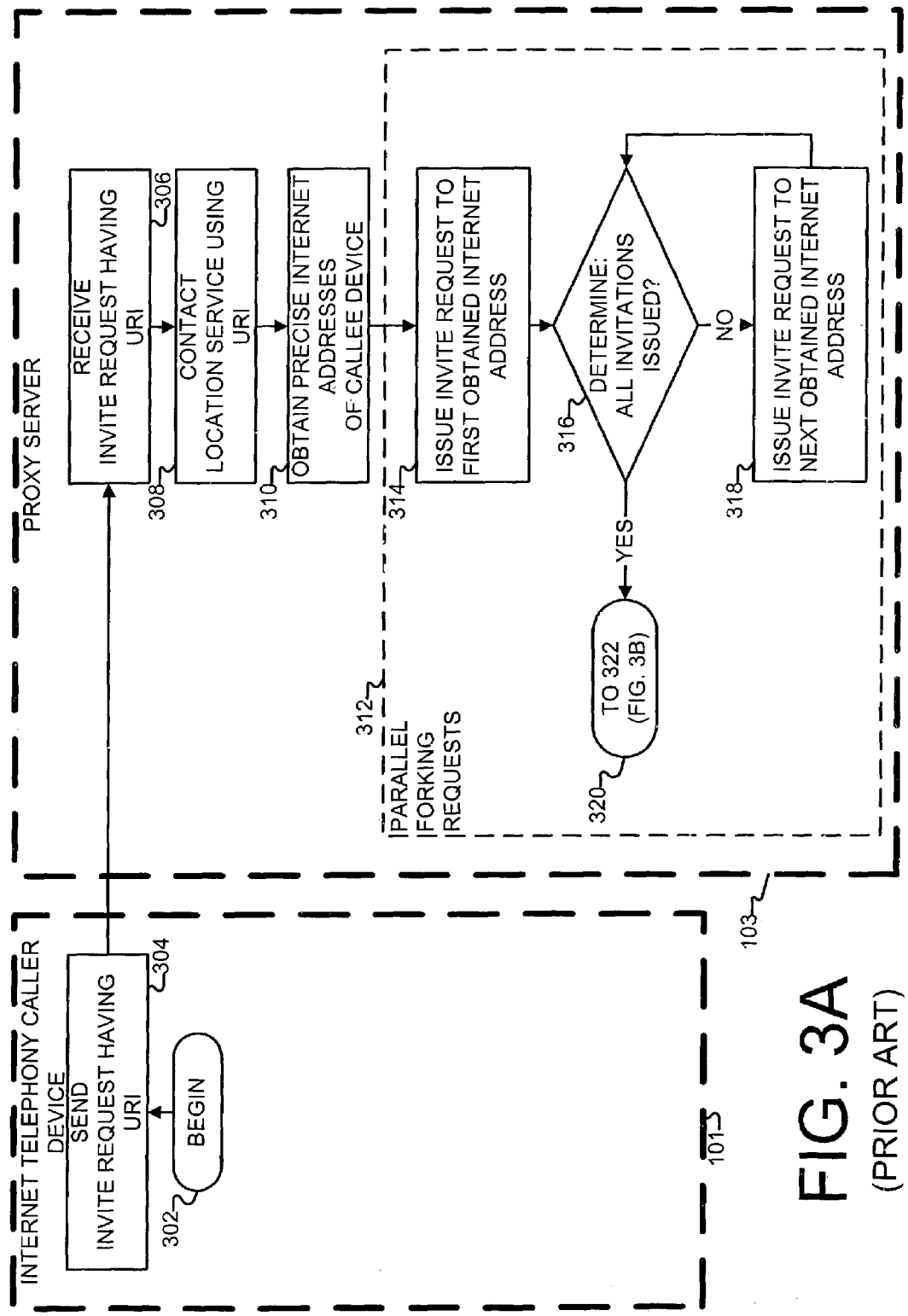
FIGS. 3A through 3E are flowcharts showing another process associated with the system of FIG. 1.
Figure 3B:
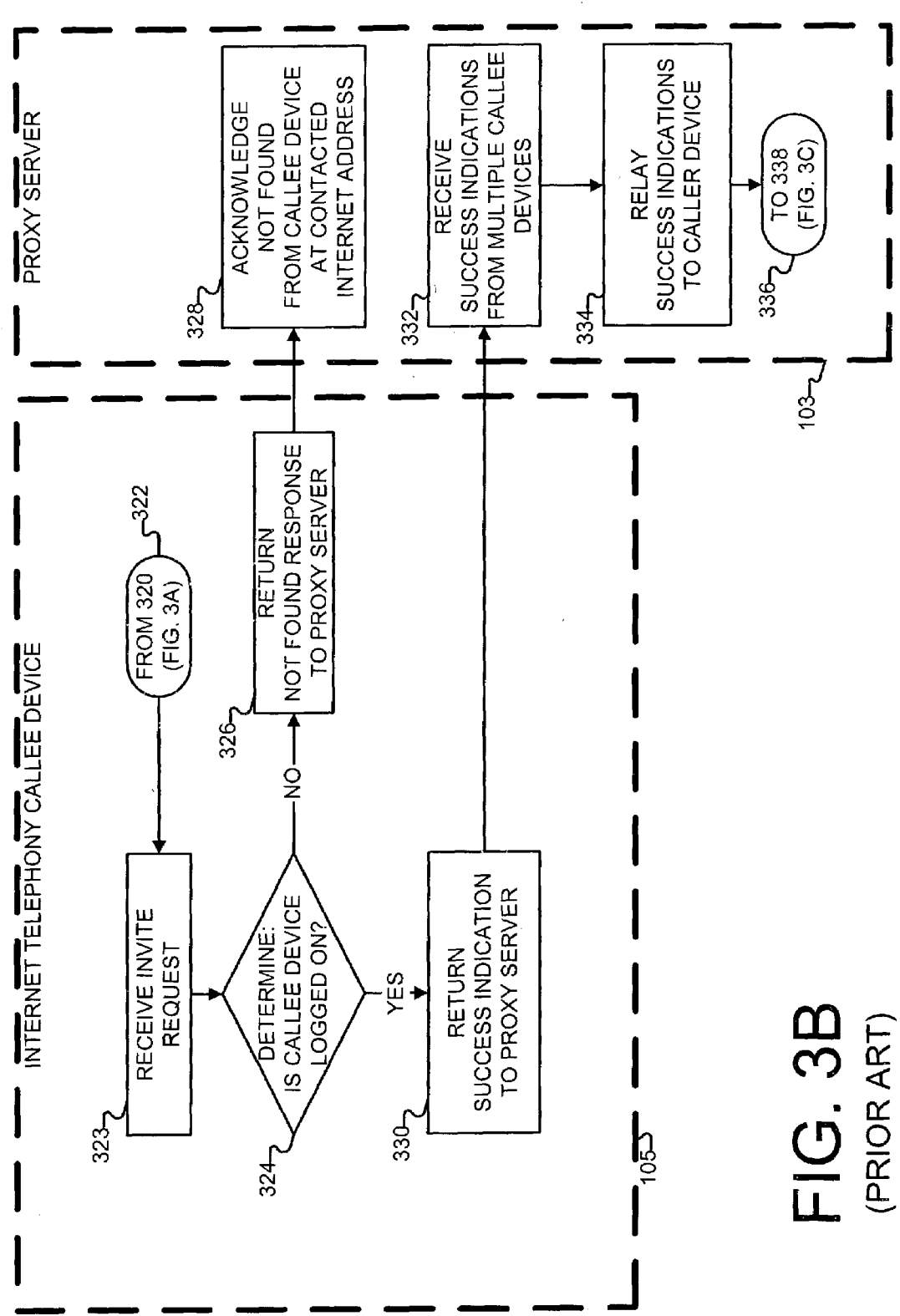

FIG. 3B shows an interchange between the Internet telephony callee device 105 and the proxy server 103 for a parallel forking proxy 312. While only one Internet telephony callee device 105 is shown for simplicity, it will be clear to one of ordinary skill in the art that an Internet telephony callee device 105 at each of the obtained 310 IP addresses function similarly to acknowledge or reject the invite request. As such, once all invite requests have been issued, each of the Internet telephony callee devices 305 receives, in step 323, an invite request. Upon receiving 323 the invite request, it is determined, in step 324, whether or not the Internet telephony callee device 105 is logged on (i.e., present) on the Internet 100. If it is determined 324 that the Internet telephony callee device 105 is not logged on, then a not found response is returned, in step 326, to the proxy server 103, which acknowledges, in step 328, the not found response from the Internet telephony callee device 105. However, if it is determined 324 that the Internet telephony callee device 105 is logged on, then a success indication is returned, in step 330, to the proxy server 103. Thus, if multiple IP addresses return success indications, then the proxy server 103 receives, in step 332, multiple success indications from each of the logged-on Internet telephony callee devices 105, and relays, in step 334, the success indications to the Internet telephony caller device 101, and the process continues in FIG. 3C.

Figure 3C:
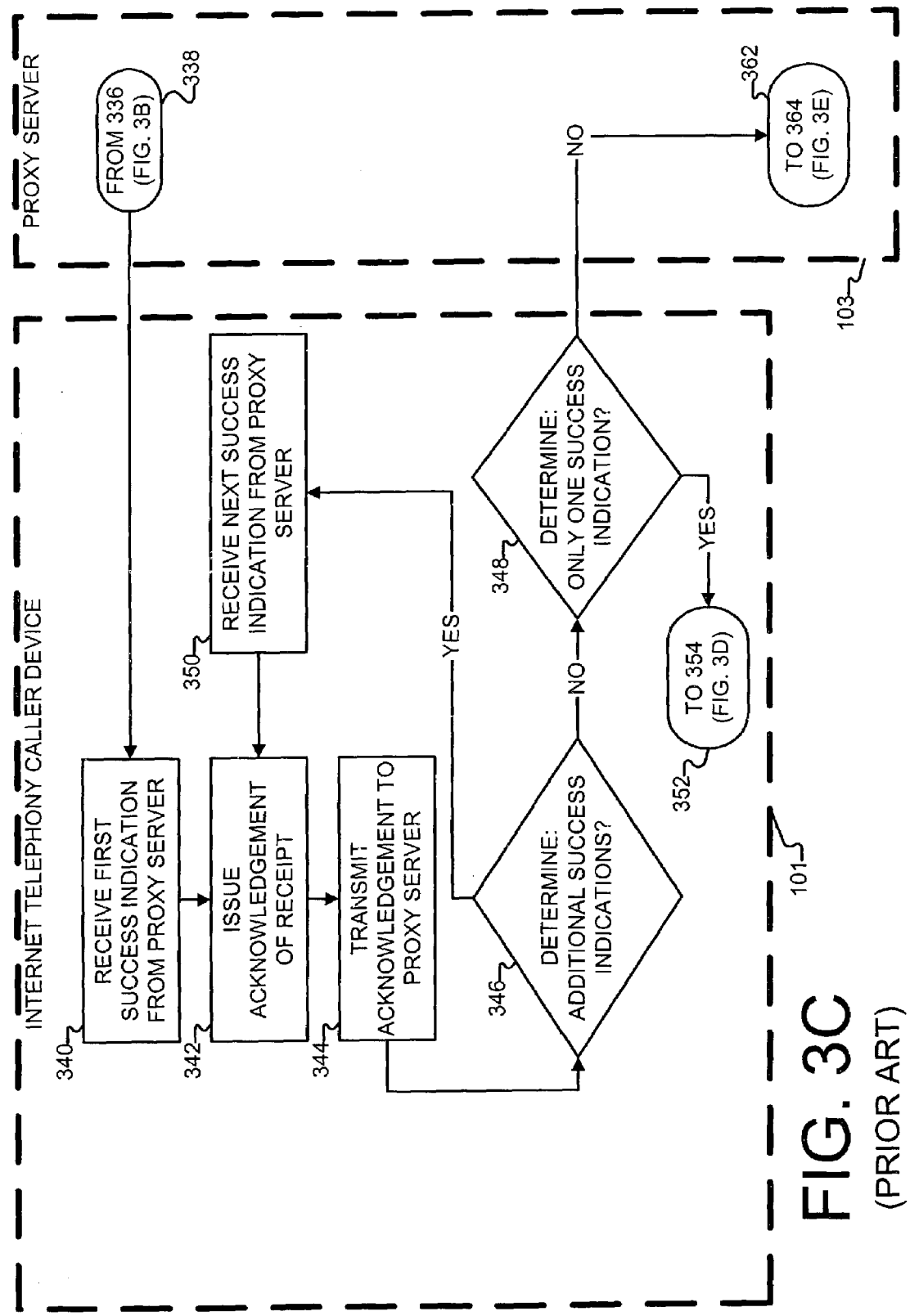

As shown in FIG. 3C, the Internet telephony caller device 101 receives, in step 340, the first success indication from the proxy server 103, and issues, in step 342, an acknowledgement of the receipt of the success indication. The Internet telephony caller device 101 then transmits, in step 344, the issued 342 acknowledgement to the proxy server 103, and determines, in step 346, whether or not there are additional success indications. If it is determined 346 that there are additional success indications, then the Internet telephony caller device 101 receives, in step 350, the next success indication from the proxy server 103, and the process repeats from the issuing step 342 until all success indications have been received. If, on the other hand, it is determined 346 that there are no additional success indications, then the Internet telephony caller device 101 determines, in step 348, whether or not only one success indication was received. If only one success indication was received by the Internet telephony caller device 101, then the process continues in FIG. 3D. However, if more than one success indication was received by the Internet telephony caller device 101, then the process continues in FIG. 3E.

Figure 3D:
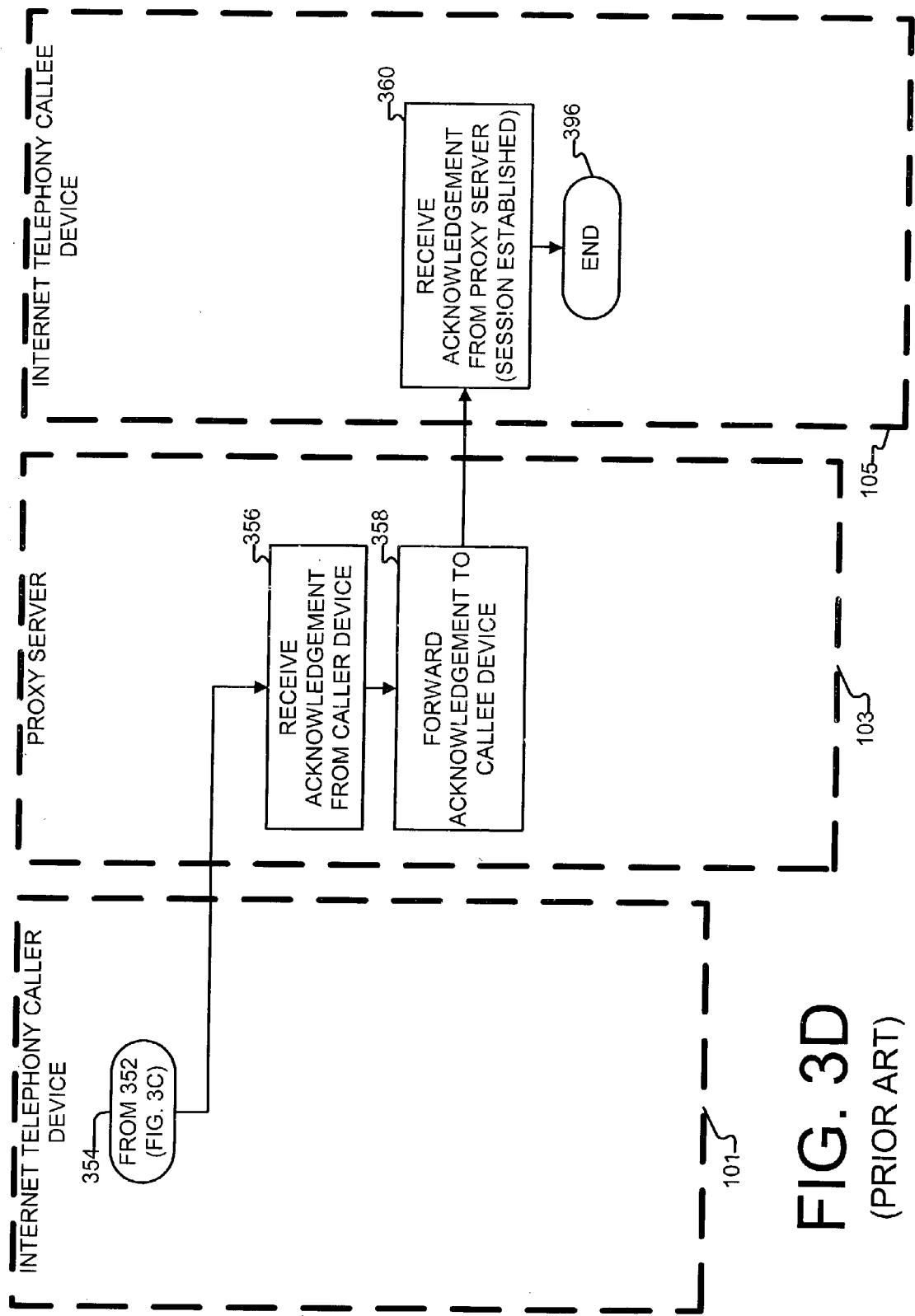

FIG. 3D shows establishment of a SIP session when only one success indication is received by the Internet telephony caller device 101. Since, in FIG. 3D, only one acknowledgement is issued 342 by the Internet telephony caller device 101, the proxy server 103 receives, in step 356, the acknowledgement, and forwards, in step 358, the acknowledgement to the Internet telephony callee device 105, which receives, in step 360, the acknowledgement from the proxy server 103, thereby establishing a session between the Internet telephony caller device 101 and the Internet telephony callee device 105. Once the session has been established, the caller and the callee are free to dialogue using the established session.

Figure 3E:
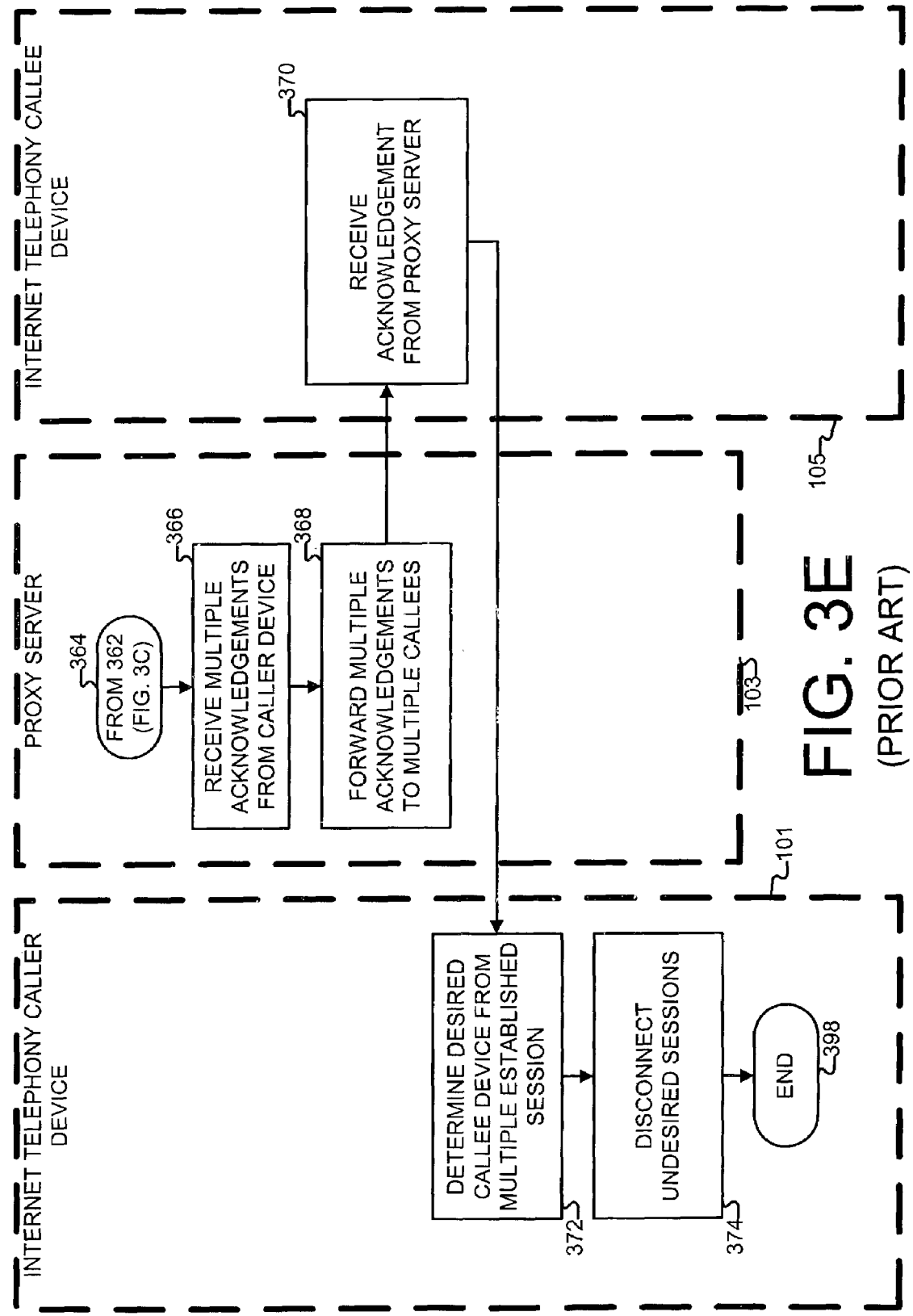

FIG. 3E shows establishment of a SIP session when multiple success indications are received by the Internet telephony caller device 101. Since multiple acknowledgements have been issued 342 by the Internet telephony caller device 101, the proxy server 103 receives, in step 366, multiple acknowledgements. The multiple acknowledgements are then forwarded, in step 368, to each of the Internet telephony callee devices 105 that are logged on. Each of the Internet telephony callee device 105 receives, in step 370, the acknowledgement from the proxy server 103, at which point multiple session are established between the Internet telephony caller device 101 and the multiple Internet telephony callee devices 105 that are logged on. A caller at the Internet telephony caller device 101 may further determine, in step 372, which of the multiple established sessions is the desired session, and disconnect, in step 374, all of the undesired sessions, thereby continuing the session with only the desired callee at the desired Internet telephony callee device 105.

While FIGS. 3A through 3E describe a process that is specific to SIP, it will be clear to one of ordinary skill in the art that other well-known Internet telephony sessions may be established using similar procedures. Additionally, while the session is described in terms of Internet telephony devices 101, 105, it will be clear to one of ordinary skill in the art that the Internet telephony devices 101, 105 may be general-purpose computers, SIP telephones, or any programmable device configured to engage in Internet telephony. Furthermore, since the process associated with a parallel forking requests 312 is described in detail in RFC 2543, further discussion of the process is omitted here. In any event, it can be seen from the process of FIGS. 3A through 3E that, while the Internet telephony caller device 101 again has knowledge of the IP address of the Internet telephony callee device 105, and vice versa, neither the Internet telephony caller device 101 nor the Internet telephony callee device 105 has much more information than the IP address.

Figure 4:
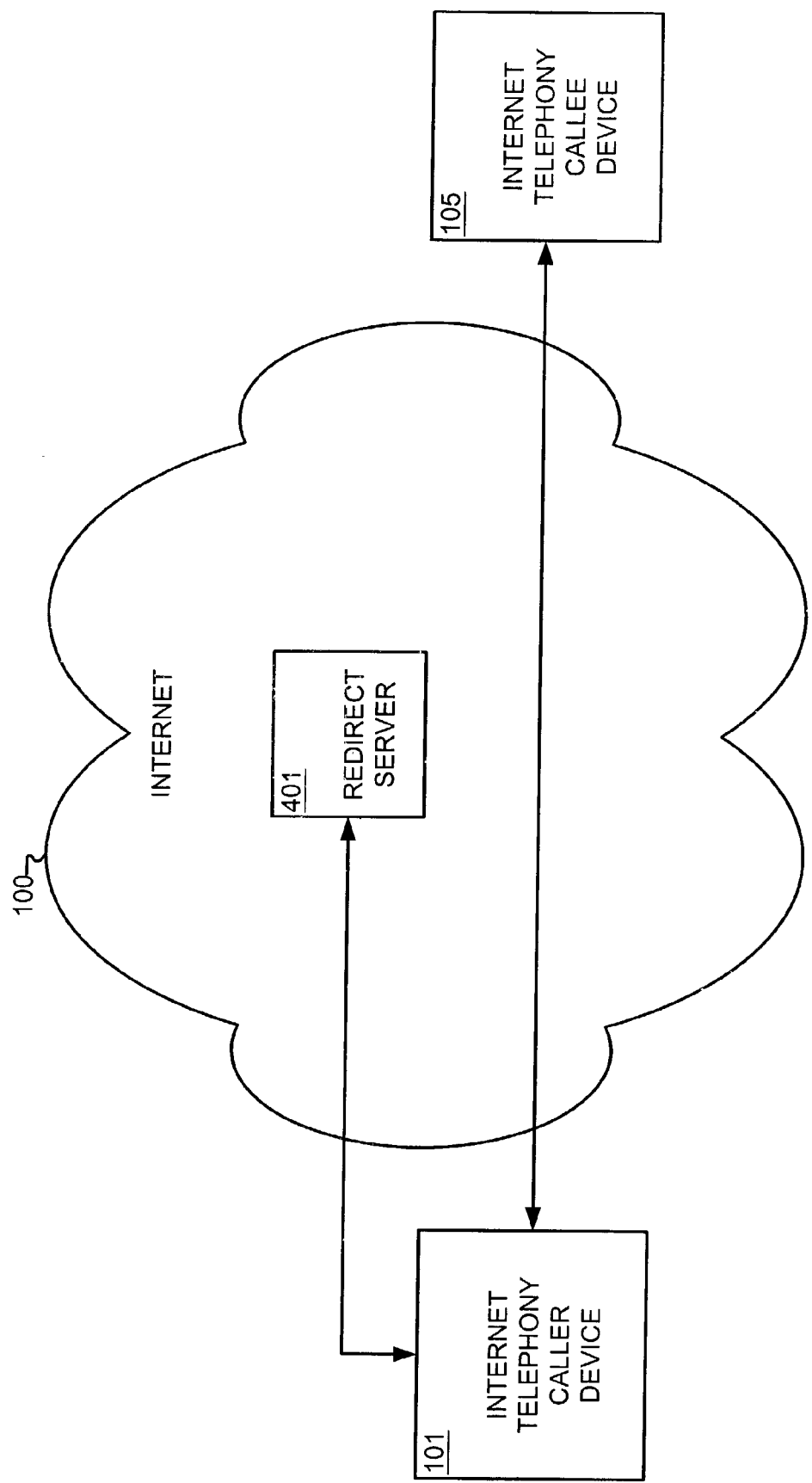
FIG. 4 is a block diagram showing another Internet telephony system of the prior art, in which a caller device and a callee device are engaged in Internet telephony.

FIG. 4 is a block diagram showing another Internet telephony system of the prior art, in which an Internet telephony caller device 101 and an Internet telephony callee device 105 are engaged in Internet telephony. As shown in the environment of FIG. 4, an Internet telephony caller device 101 establishes a session with an Internet telephony callee device 105 by using a redirect server 401, which may be located within the Internet 100. Again, the Internet telephony caller device 101 may be a general-purpose computer, a SIP telephone, or any programmable device that is configured to engage in Internet telephony. Once an IP address of the Internet telephony callee device 105 has been obtained by the Internet telephony caller device 101 from the redirect server 401, the Internet telephony caller device 101 may establish a session with the Internet telephony callee device 105. In a preferred embodiment, the session is established over the Internet 100. A prior art method, which uses the system of FIG. 4, is shown in FIGS. 5A and 5B.

Figure 5A:
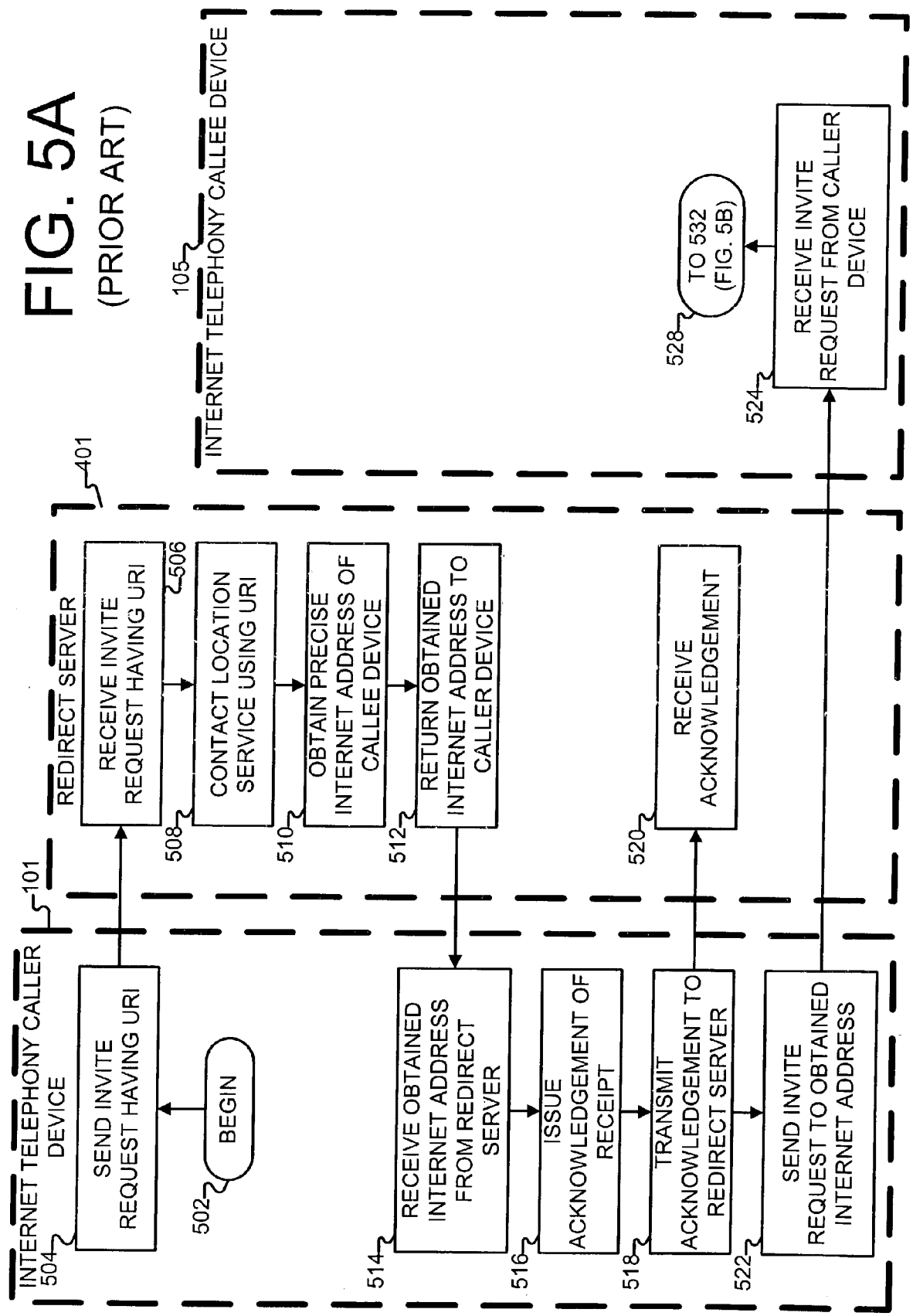
FIGS. 5A and 5B are flowcharts showing one process associated with the system of FIG. 4.
Figure 5B:
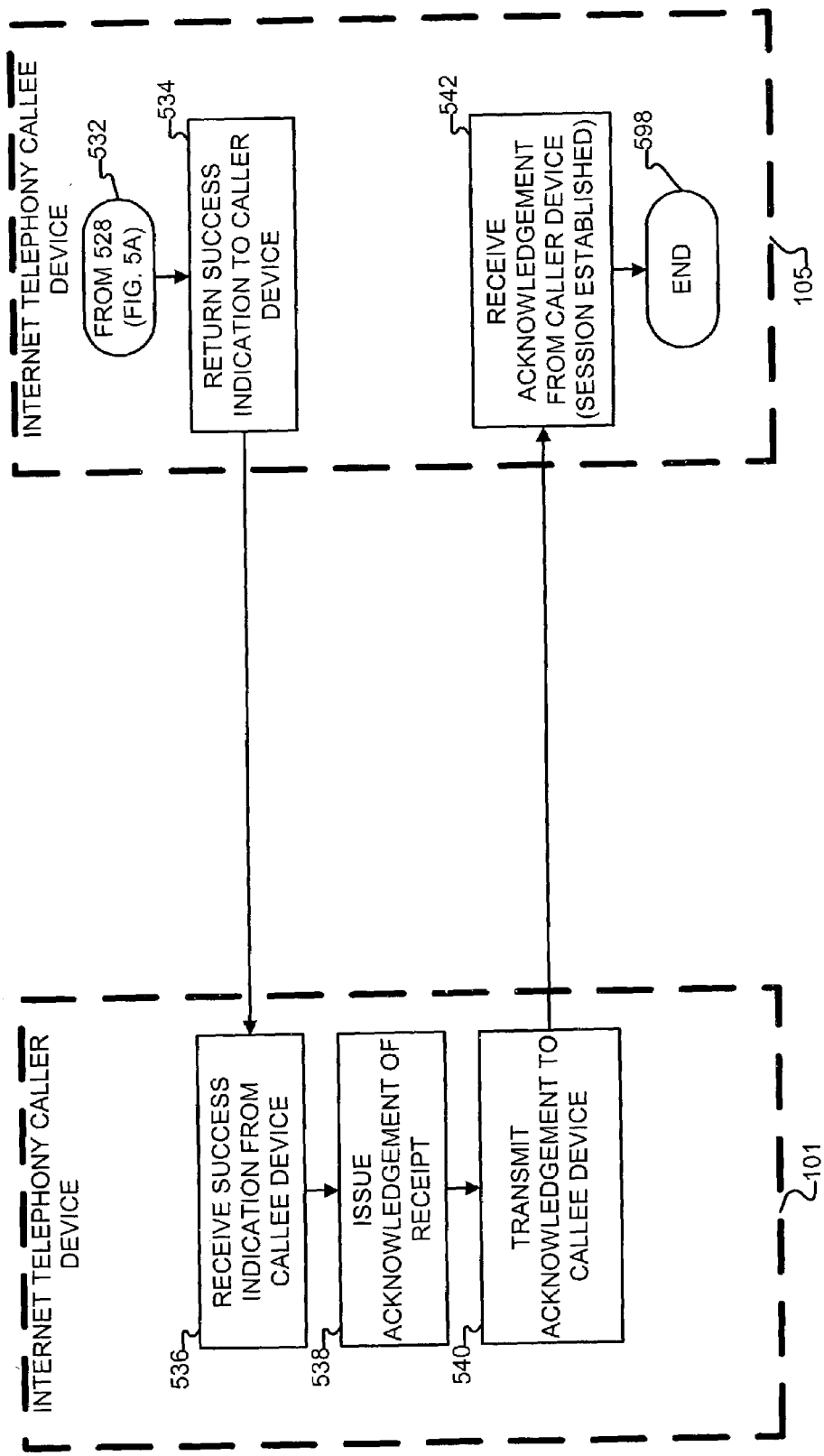

FIGS. 5A and 5B are flowcharts showing one process associated with the system of FIG. 4. In the embodiment of FIG. 5A, the process begins when an Internet telephony caller device 101 sends, in step 504, an invite request having a URI of a desired callee. The URI may be a HTML address, a FTP address, a SIP address, an email address, or any number of other identifiers. In the specific embodiment of FIG. 5A, the URI is a SIP address. The invite request sent 504 by the Internet telephony caller device 101 is received, in step 506, by a redirect server 401. The redirect server 401 contacts, in step 508, a location service (not shown) using the URI in the received 506 invite request. A precise IP address of the Internet callee device 105 is then obtained, in step 510, from the location service, and the obtained IP address is returned, in step 512, to the Internet telephony caller device 101. The Internet telephony caller device 101 receives, in step 514, the obtained Internet address from the redirect server 401, and issues, in step 516, an acknowledgement of the receipt of the IP address. The acknowledgement is then transmitted, in step 518, by the Internet telephony caller device 101 to the redirect server 401. Additionally, the Internet telephony caller device 101 sends, in step 522, an invite request to the obtained IP address, which is assigned to an Internet telephony callee device 105. The Internet telephony callee device 105 receives, in step 524, the invite request from the Internet telephony caller device 101, and the process continues in FIG. 5B.

As shown in FIG. 5B, once the invite request has been received 524, the Internet telephony callee device 105 returns, in step 534, a success indication to the Internet telephony caller device 101. The Internet telephony caller device 101 receives, in step 536, the success indication from the Internet telephony callee device 105, and issues, in step 538, an acknowledgement of the receipt of the success indication. The acknowledgement is then transmitted, in step 540, from the Internet telephony caller device 101 to the Internet telephony callee device 105. The Internet telephony callee device 105 receives, in step 542, the acknowledgement from the Internet telephony caller device 101, thereby establishing a session with the Internet telephony caller device 101. Thus, as shown in the embodiment of FIGS. 5A and 5B, once the SIP session has been established between the Internet telephony caller device 101 and the Internet telephony callee device 105, a caller and a callee may freely dialogue using the established session.

While FIGS. 5A and 5B describe a process that is specific to SIP, it will be clear to one of ordinary skill in the art that other well-known Internet telephony sessions may be established using similar procedures. Additionally, while the session is described in terms of Internet telephony devices 101, 105, it will be clear to one of ordinary skill in the art that the Internet telephony devices 101, 105 may be general-purpose computers, SIP telephones, or any programmable device configured to engage in Internet telephony. Furthermore, since the process associated with the redirect server 401 is described in detail in RFC 2543, further discussion of the process is omitted here. In any event, it can be seen from the process of FIGS. 5A and 5B that, while the Internet telephony caller device 101 again has knowledge of the IP address of the Internet telephony callee device 105, and vice versa, neither the Internet telephony caller device 101 nor the Internet telephony callee device 105 has much more information than the IP address.

While several embodiments of Internet telephony sessions have been shown in FIGS. 1 through 5B to illustrate the deficiency associated with Internet telephony, similar deficiencies exist in public switched telephone network (PSTN) since current systems provide very little information other than caller identification. This deficiency is illustrated through FIGS. 6, 7A, and 7B.

Figure 6:
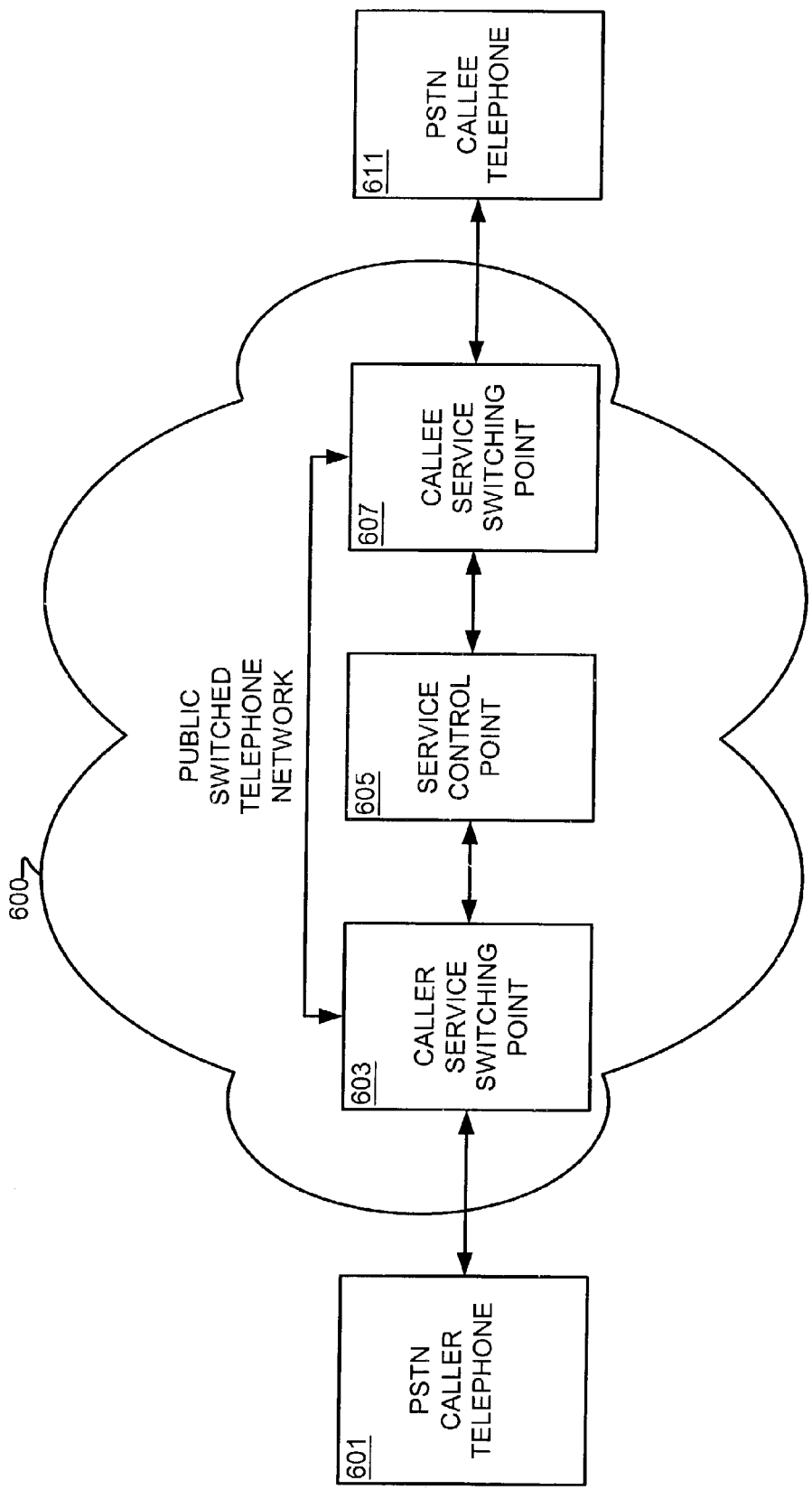
FIG. 6 is a block diagram showing a telephony system in a public switched telephone network (PSTN), in which a caller telephone communicates with a callee telephone.

FIG. 6 is a block diagram showing a prior-art PSTN telephony system, in which a PSTN caller telephone 601 communicates with a PSTN callee telephone 611. Since PSTN telephony systems are well known, only a cursory discussion of PSTN is presented with reference to FIG. 6. As shown in FIG. 6, a PSTN caller telephone 601 and a PSTN callee telephone 611 are configured to communicate with each other through a PSTN 600. The PSTN 600 includes a caller service switching point (SSP) 603, which is configured to connect both outgoing and incoming calls to the PSTN caller telephone 603 through the PSTN 600. The PSTN 600 also includes a callee SSP 607, which is similarly configured to connect outgoing and incoming calls to the PSTN callee telephone 613. Both the caller SSP 603 and the callee SSP 607 are configured to communicate with a service control point (SCP) 605, which, as is well-known, performs a variety of advanced intelligent network (AIN) functions including area number calling service, disaster recovery service, do not disturb service, and 5-digit extension dialing service, etc. A broad overview of the system of FIG. 6 may begin with a caller dialing a telephone number using the PSTN caller telephone 603. The dialed call is processed by the caller SSP 603, which contacts the SCP 605 for further call processing. The SCP 605 contacts a callee SSP 607 with a connection request in order to connect the call from the caller. The callee SSP 607 accepts the connection request and connects the call through to the PSTN callee telephone 611.

Figure 7A:
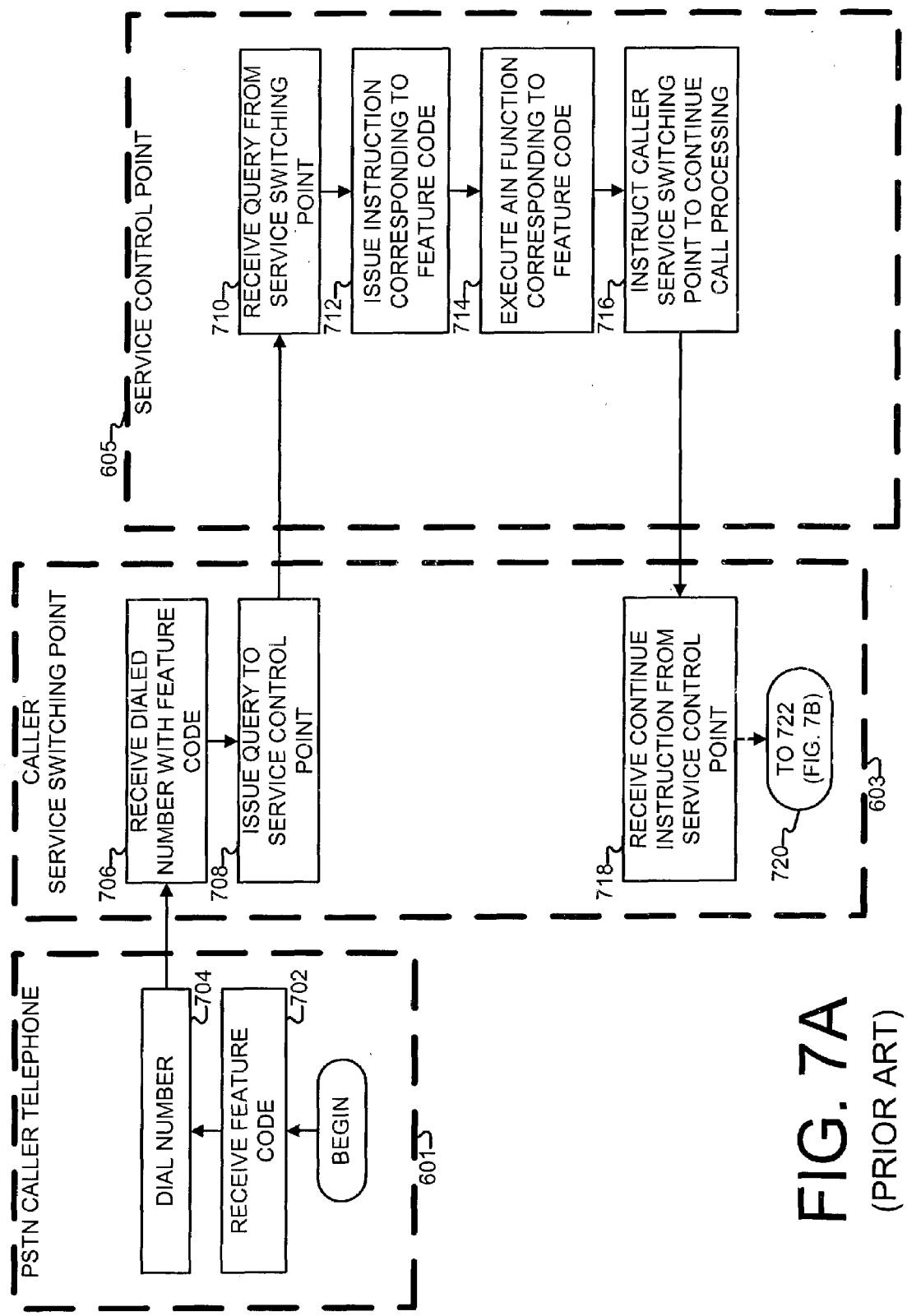
FIGS. 7A and 7B are flowcharts showing one process associated with the system of FIG. 6.
Figure 7B:
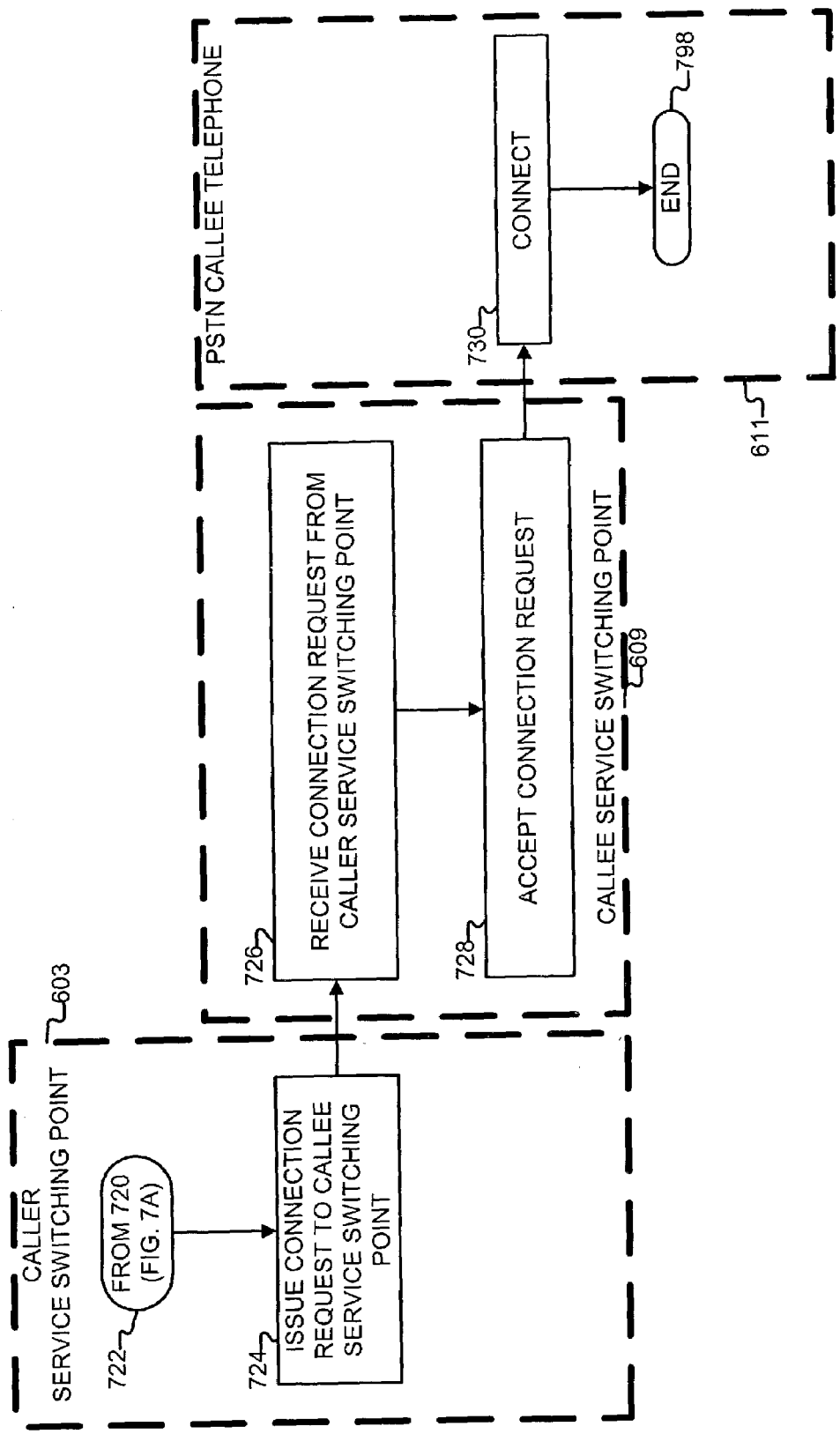

FIGS. 7A and 7B are flowcharts showing one process associated with the prior-art system of FIG. 6. Since call connection in a PSTN 600 are well known, only an abridged description is presented with reference to FIGS. 7A and 7B. Specifically, the example of FIGS. 7A and 7B shows execution of an arbitrary advanced intelligent network (AIN) instruction using a dialed feature code. As shown in FIG. 7A, a PSTN caller telephone receives, in step 702, a feature code. A telephone number is then dialed, in step 704, and a caller service switching point 603 receives, in step 706, the dialed number with the feature code. Upon receiving 706 the dialed number with the feature code, the caller service switching point 603 issues, in step 708, a query to the service control point 605. The service control point 605 receives, in step 710, the query from the service switching point, and issues, in step 712, an instruction corresponding to the feature code. In response to the issued 712 instruction, the service control point 605 executes, in step 714, an AIN function corresponding to the feature code. Examples of AIN functions, which are well known in the art, include area number calling service, disaster recovery service, do not disturb service, five digit extension dialing service, etc. Upon executing 714, the AIN function corresponding to the feature code, the service control point 605 instructs, in step 716, the caller service switching point to continue the call processing. The caller service switching point receives, in step 718, a continue processing instruction from the service control point 605, and the process continues in FIG. 7B.

As shown in FIG. 7B, once the caller service switching point 603 receives 718 the continue instruction, the caller service switching point 603 issues, in step 724, a connection request to the caller service switching point. The callee service switching point 609 receives, in step 726, the connection request from the caller service switching point and accepts, in step 728, the connection request. Once the connection request has been accepted 728, a call is connected in step 730, between the PSTN callee telephone 611 and the PSTN caller telephone 601. Thus, as shown in the embodiment of FIGS. 7A and 7B, once the PSTN telephone call has been established between the PSTN callee telephone 611 and the PSTN caller telephone 601, a callee and a caller may freely dialogue using the established call through the PSTN 600.

As seen from FIGS. 7A and 7B, while a callee may know the caller's telephone number through a mechanism such as caller ID, and the caller may know the callee's telephone number to which the caller has dialed, very little additional information is available to either the callee or the caller during the process outlined in FIGS. 7A and 7B.

Figure 8:
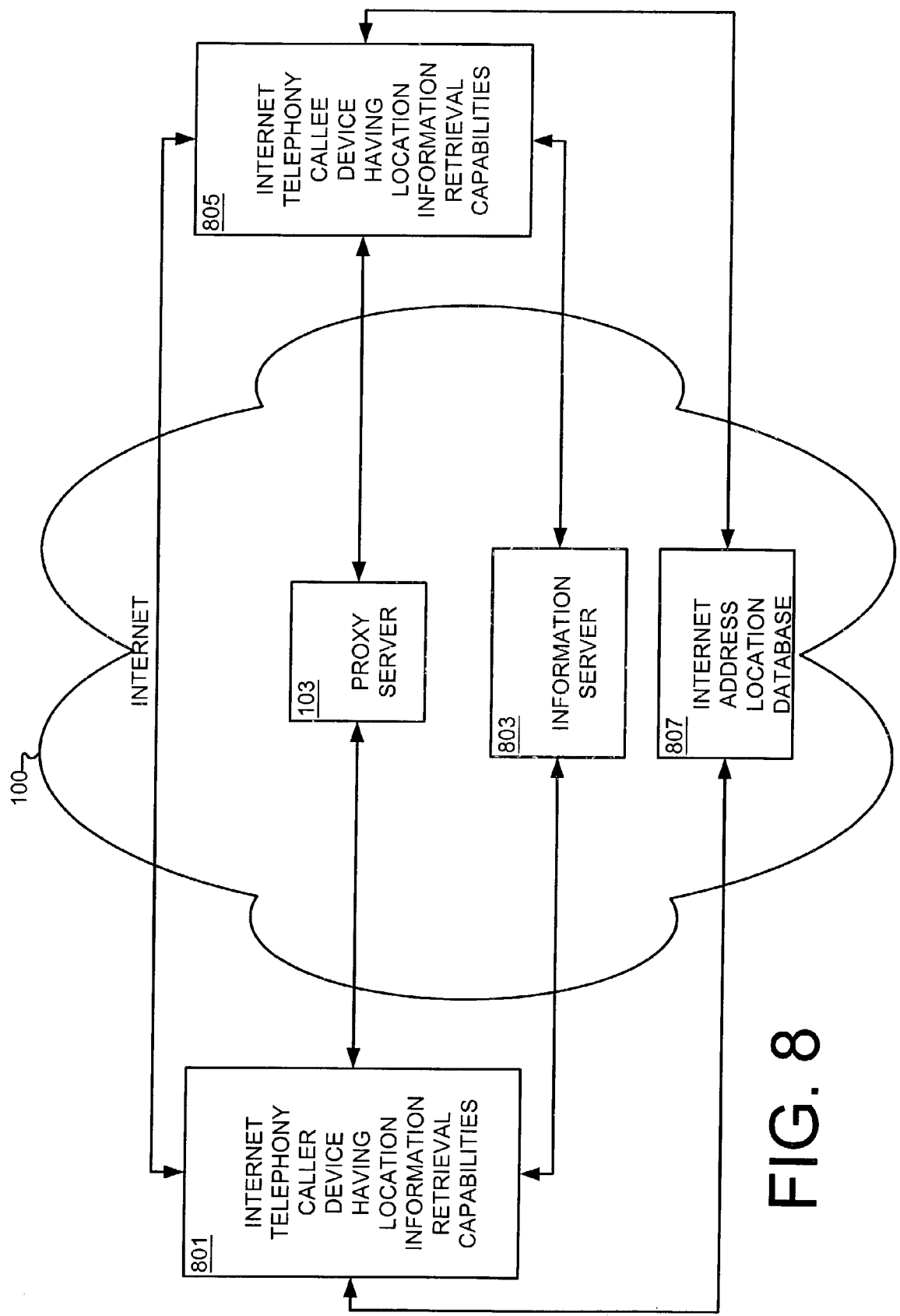
FIG. 8 is a block diagram showing one embodiment of an Internet telephony system, in which a caller device and a callee device are configured to retrieve location information.

FIG. 8 is a block diagram showing one embodiment of an Internet telephony system, in which an Internet telephony caller device having location information retrieval capabilities 801 and an Internet telephony callee device having location information retrieval capabilities 805 are in communication with each other over the Internet 100. The Internet telephony caller device having location information retrieval capabilities 801 may be a general-purpose computer, a session initiation protocol (SIP) telephone, or any programmable device that is configured to engage in Internet telephony. For simplicity, the Internet telephony caller device having location information retrieval capabilities 801 is referred to hereinafter as a location-information-retrieving caller device 801. Similarly, the Internet telephony callee device having location information retrieval capabilities 805 may also be a general-purpose computer, a session initiation protocol (SIP) telephone, or any programmable device that is configured to engage in Internet telephony. Again, for simplicity, the Internet telephony callee device having location information retrieval capabilities 805 is referred to hereinafter as a location-information-retrieving callee device 805.

In addition to the location-information-retrieving caller device 801 and location-information-retrieving callee device 805, the embodiment of FIG. 8 includes a proxy server 103, an information server 803, and an Internet address location database 807, which are, preferably, located within the Internet 100. A broad overview of the operation begins with the location-information-retrieving caller device 801 initiating a session with the location-information-retrieving callee device 805. In the embodiment of FIG. 8, a proxy server 103 is used to initiate the session. During the initiation of the session, the proxy server 103 relays the IP address of the location-information-retrieving callee device 805 to the location-information-retrieving caller device 801, and, also, relays the IP address of the location-information-retrieving caller device 801 to the location-information-retrieving callee device 805. Thus, as the session is being initiated, both the location-information-retrieving caller device 801 and the location-information-retrieving callee device 805 have knowledge of the other's IP address. Once the location-information-retrieving caller device 801 knows the IP address of the location-information-retrieving callee device 805, the location-information-retrieving caller device 801 accesses the Internet address location database 807 to obtain a geographical location associated with the IP address of the location-information-retrieving callee device 805. The obtained geographical location is then used to further retrieve geographical location information associated with the location-information-retrieving callee device 805 from an information server 803. Similarly, once the location-information-retrieving callee device 805 knows the IP address of the location-information-retrieving caller device 801, the location-information-retrieving callee device 805 accesses the Internet address location database 807 to obtain a geographical location associated with the IP address of the location-information-retrieving caller device 801. The obtained geographical location is then used to further retrieve geographical location information associated with the location-information-retrieving caller device 801 from the information server 803. The information server 803 has various information related to geographic locations, such as local time, local weather reports, local news, local sporting events, etc. for any given geographical location. Thus, the information server 803 may comprise a plurality of databases (not shown) such as Internet servers for weather (e.g., www.weather.com, etc.), for sports (e.g., www.espn.com, etc.), for news (e.g., www.cnn.com, etc.), or a plethora of other Internet accessible databases. Alternatively, the information server 803 may be a dedicated server or system configured to locally store all of the geographical location information. Thus, either the location-information-retrieving caller device 801 or the location-information-retrieving callee device 805 may access the information server 803 to obtain information associated with a specific geographical location.

Figure 9A:
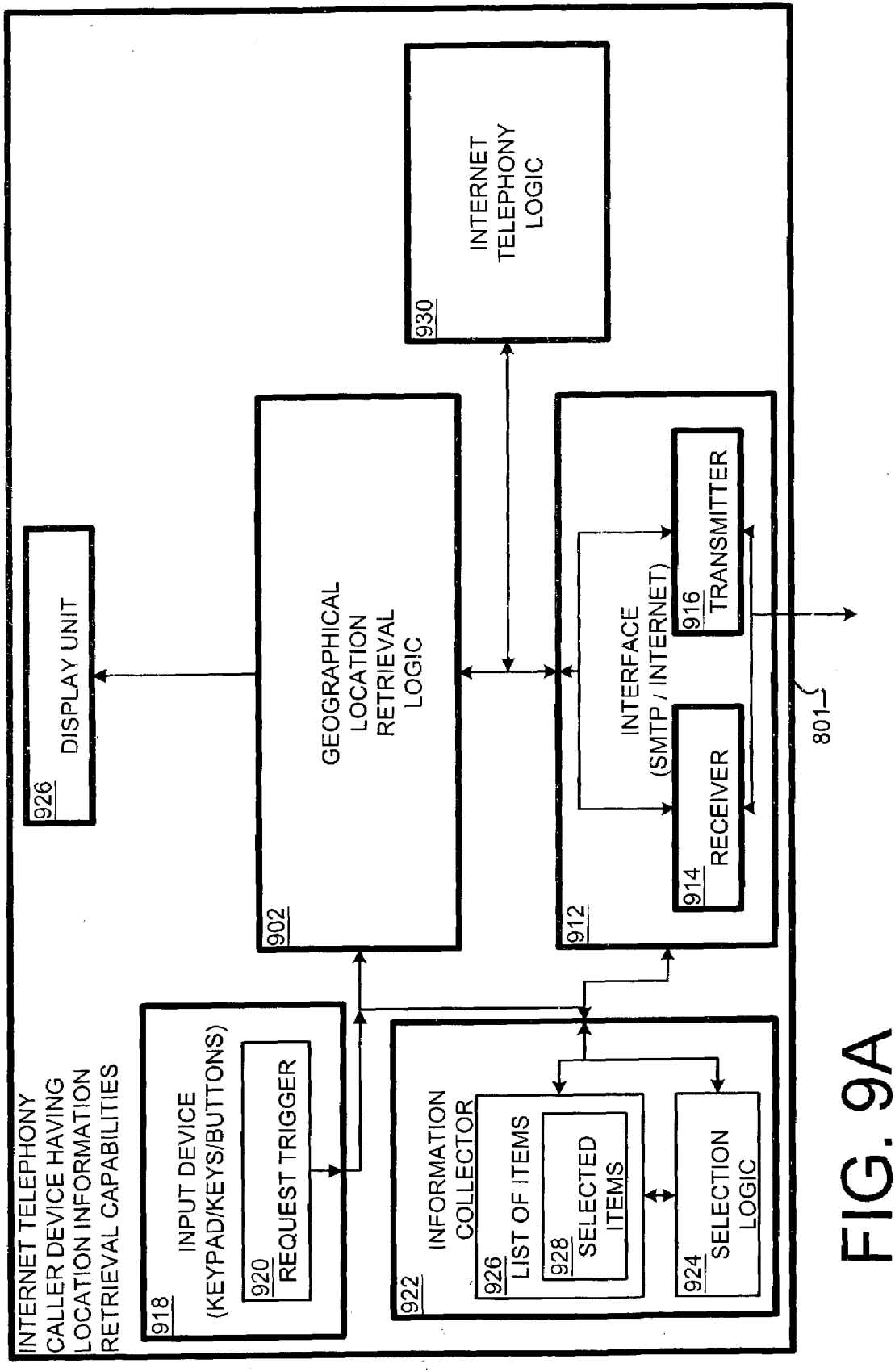
FIG. 9A is a block diagram showing the caller device of FIG. 8 in greater detail.
Figure 9B:
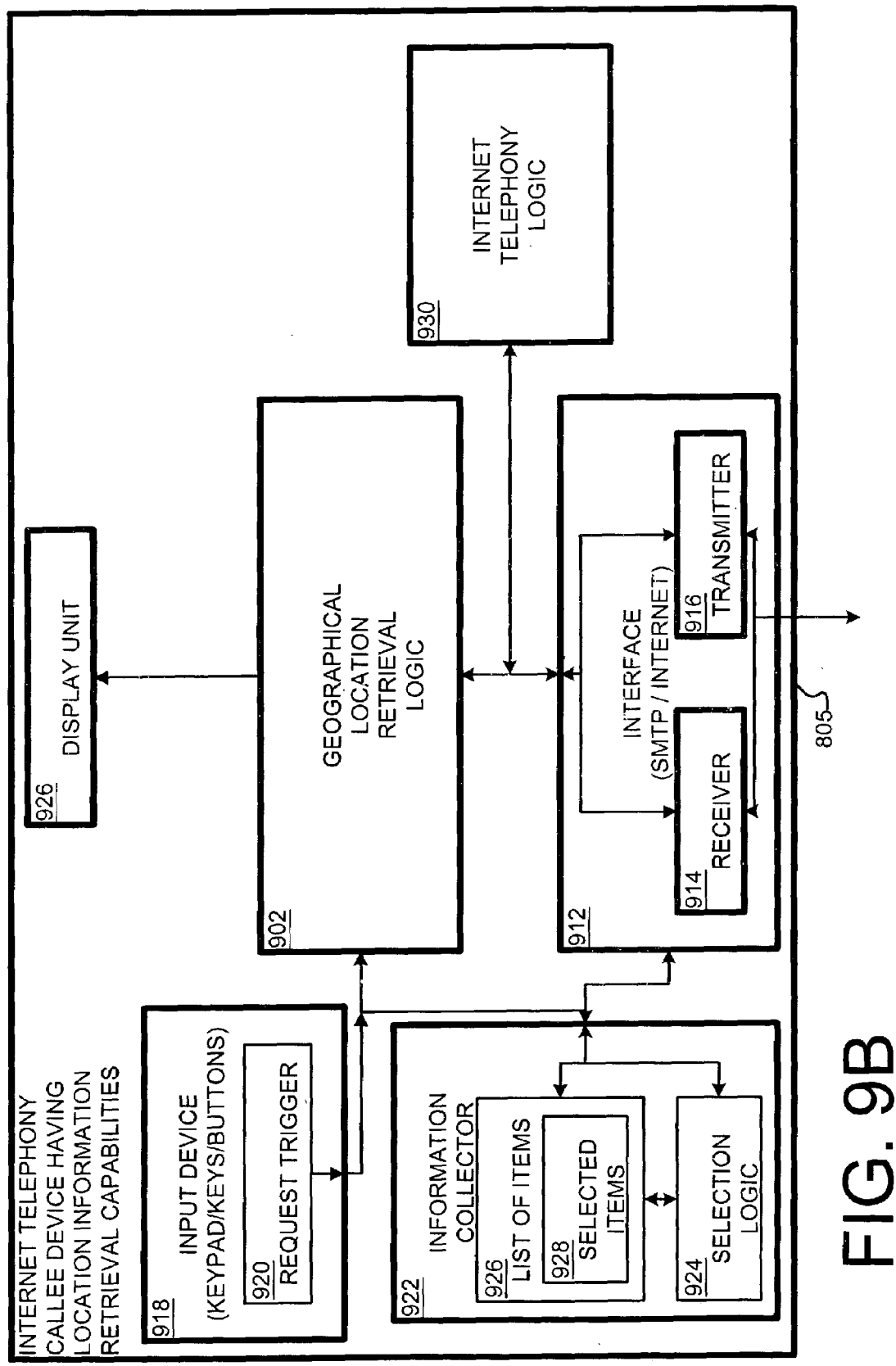
FIG. 9B is a block diagram showing the callee device of FIG. 8 in greater detail.

An embodiment of the location-information-retrieving caller device 801 and the location-information-retrieving callee device 805 are shown in greater detail in FIGS. 9A and 9B, respectively.

FIG. 9A is a block diagram showing the location-information-retrieving caller device 801 of FIG. 8 in greater detail. As shown in FIG. 9A, the location-information-retrieving caller device 801 comprises an Internet telephony logic 930, which may include any hardware or software necessary to engage in Internet telephony. Since hardware and software configured for Internet telephony are well known, further discussion of Internet telephony hardware and software are omitted here. The location-information-retrieving caller device 801 also comprises an input device 918, which may be a computer keyboard, a mouse, a numeric keypad, or any number of well-known input peripheral devices. Additionally, the location-information-retrieving caller device 801 comprises information collection logic 922, which includes a list of items 928 and selection logic 924. The list of items 928 may be a list showing available information for a specific geographical location, such as local time, local weather reports, local sporting events, local news, etc. from which a user may select desired items. For example, if a user desires to only find out the local news and local weather report for a given location, then the user may select only the local news and local weather report from the list of items. In this sense, the input device 918 may be used to input a user's selection. The selected items 930 may be stored in the information collection logic 922 for later use. Since systems and methods for selecting items from a list is well-known in the art, further discussion of the selection of the items is omitted here.

In addition to the input device 918 and the information collection logic 922, the location-information-retrieving caller device 801 further comprises geographical location retrieval logic 902, an interface 912 having a receiver 914 and a transmitter 916, and a display unit 926. The interface 912 is configured to receive information via the receiver 914 and transmit information via the transmitter 916. In one embodiment, the interface 912 receives the geographical location from the location server 1407, as well as the geographical location information from the information server 803. The geographical location retrieval logic 902 retrieves and stores a specific geographical location from the location server 1407. This information is used by the information collection logic 922 during the retrieval of geographical location information associated with the callee's location. Once the desired information has been collected by the information collection logic 922, the collected information may be displayed on the display unit 926. As such, the display unit 926 may be a computer monitor or any number of known display devices.

FIG. 9B is a block diagram showing the location-information-retrieving callee device 805 of FIG. 8 in greater detail. Since, in this embodiment, the operation of the location-information-retrieving callee device 805 is similar to the operation of the location-information-retrieving caller device 801, the components of location-information-retrieving callee device 805 are similar to the components of location-information-retrieving caller device 801 of FIG. 9A. As shown in FIG. 9B, the location-information-retrieving callee device 805 comprises Internet telephony logic 930 permits the location-information-retrieving callee device 805 to engage in Internet telephony. Since hardware and software for Internet telephony is well known, further discussion of Internet telephony-hardware and software is omitted here. The location-information-retrieving callee device 805 also comprises an input device 918, which may be a computer keyboard, a mouse, a numeric keypad, or any number of well-known input peripheral devices. Additionally, the location-information-retrieving callee device 805 comprises information collection logic 922, which includes a list of items 928 and selection logic 924. Similar to FIG. 9A, the list of items 928 may be a list showing available information for a specific geographical location, such as local time, local weather reports, local sporting events, local news, etc. from which a user may select desired items. For example, if a user desires to only find out the local news and local weather report for a given location, then the user may select only the local news and local weather report from the list of items. In this sense, the input device 918 may be used to input a user's selection. The selected items 930 may be stored in the information collection logic 922 for later use. Since systems and methods for selecting items from a list is well-known in the art, further discussion of the selection of the items is omitted here.

In addition to the input device 918 and the information collection logic 922, the location-information-retrieving callee device 805 further comprises geographical location retrieval logic 902, an interface 912 having a receiver 914 and a transmitter 916, and a display unit 926. The interface 912 is configured to receive information via the receiver 914 and transmit information via the transmitter 916. In one embodiment, the interface 912 receives the geographical location from the location server 1407, as well as the geographical location information from the information server 803. The geographical location retrieval logic 902 retrieves and stores a specific geographical location from the location server 1407. This information is used by the information collection logic 922 during the retrieval of geographical location information associated with the caller's location. Once the desired information has been collected by the information collection logic 922, the collected information may be displayed on the display unit 926. As such, the display unit 926 may be a computer monitor or any number of known display devices.

Having described embodiments of systems for retrieving geographical location information, several embodiments of methods associated with the retrieval of geographical location information are shown in FIGS. 10A through 11G.

Figure 10A:
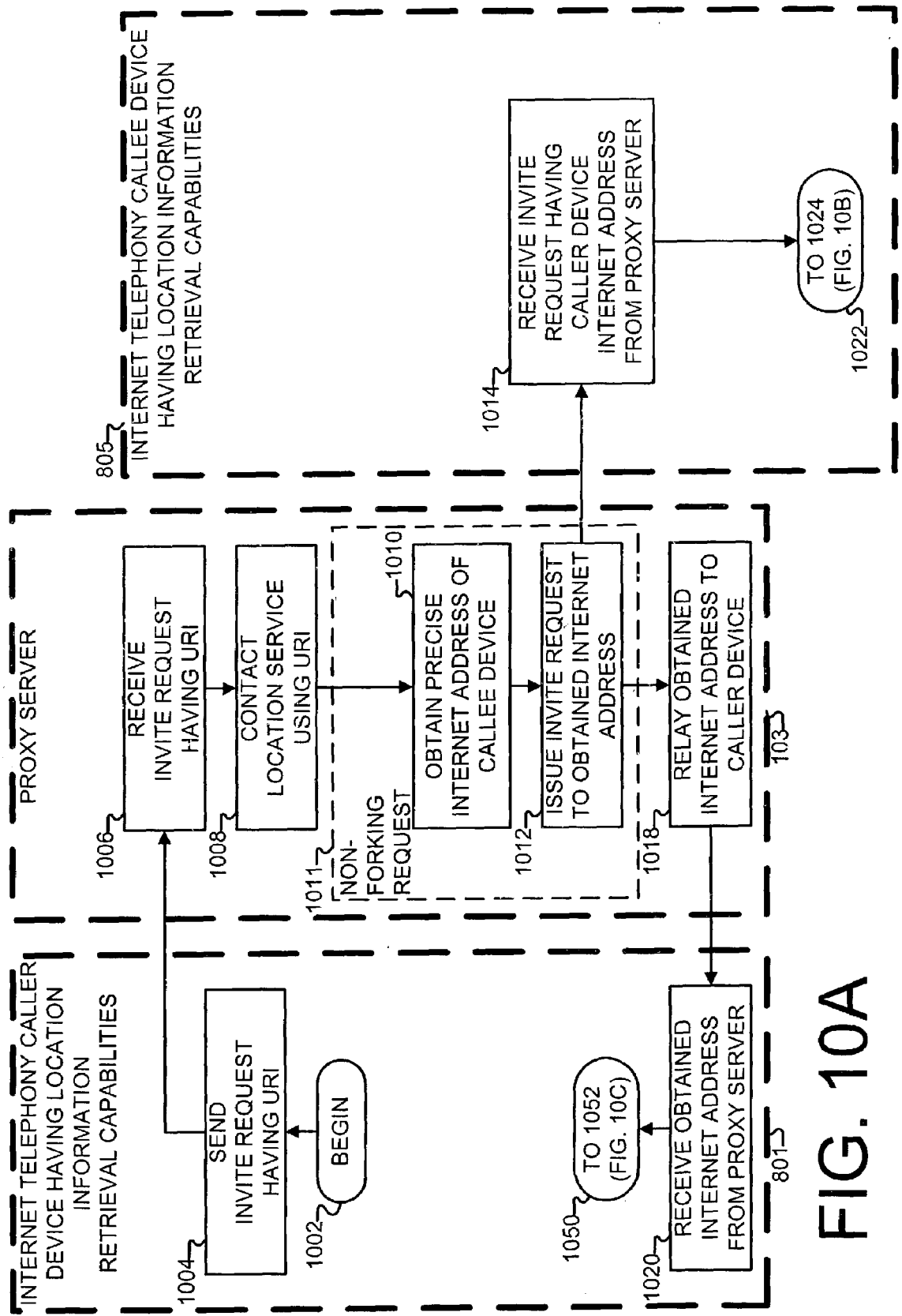
FIGS. 10A through 10D are flowcharts showing one embodiment of a process for obtaining location information in an Internet telephony system.

FIGS. 10A through 10D are flowcharts showing one embodiment of the process for obtaining location information in an internet telephony system, such as one shown in FIG. 8. As shown in FIG. 10A, the process begins when an internet telephony caller device having location information retrieval capabilities 801 sends, in step 1004, an invite request having a URI. A proxy server 103 receives, in step 1006, the invite request having the URI, and contact, in step 1008, a location service (not shown) using the URI. The URI may be an HTML address, an FTP address, an SIP address, an email address, or any number of other identifiers used on the internet. If, as in the embodiment of FIGS. 10A through 10D, the request is a non-forking request 1011, in which there is only one IP address located for the URI, then the proxy server 103 obtains, in step 1010, a precise internet address of the Internet telephony callee device, and issues, in step 1012, an invite request to the obtained internet address. The issued 1012 invite request is then received, in step 1014, by the internet telephony callee device having location information retrieval capabilities 805 from the proxy server 103, and the process here continues to FIG. 10B. Additionally, the obtained internet address in relayed, in step 1018, to the internet telephony caller device having location information retrieval capabilities 801. The internet telephony caller device having location information retrieval capabilities 801 receives, in step 1020, the internet address from the proxy server 103, and the process here continues in FIG. 10C.

Figure 10B:
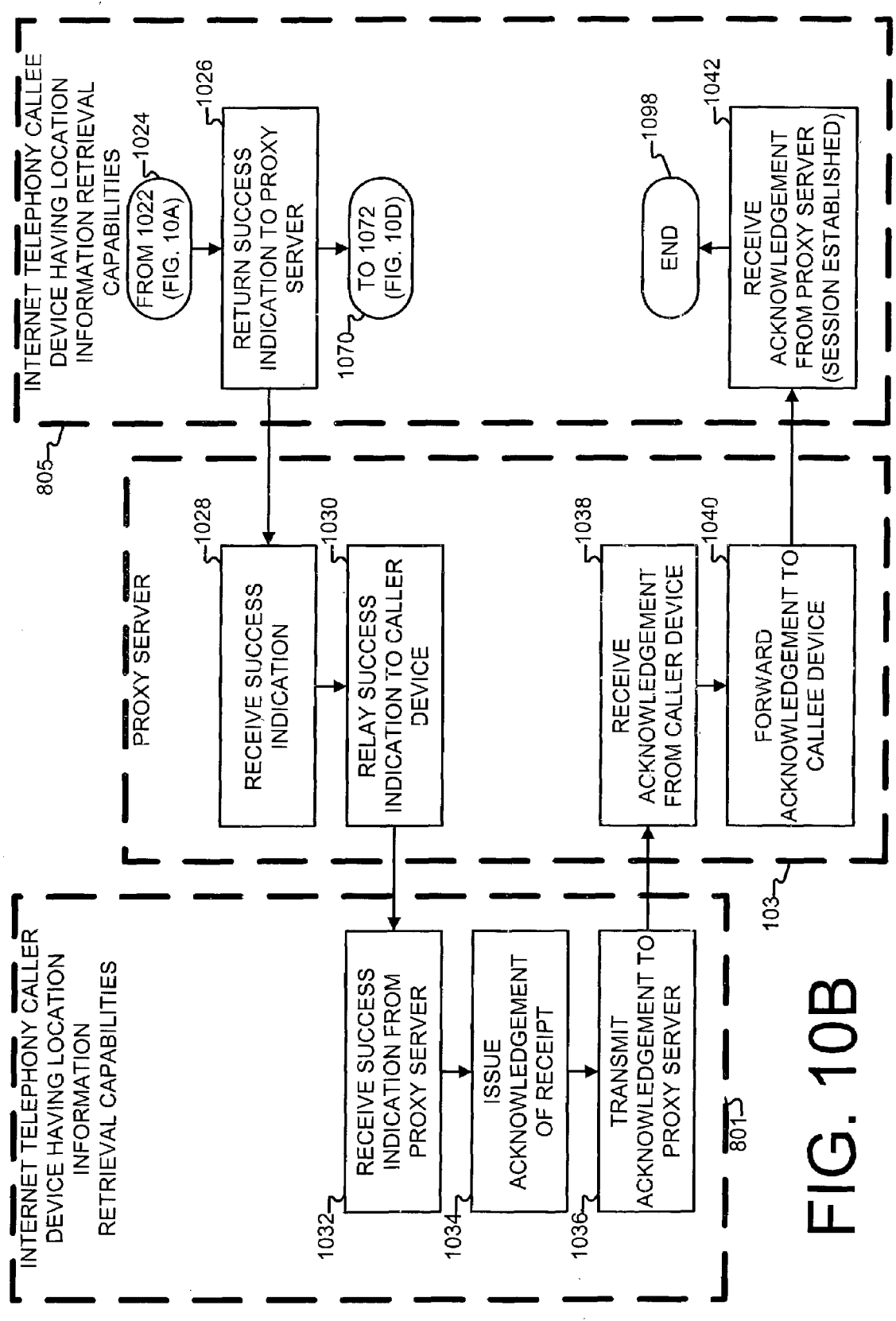

Continuing in FIG. 10B, once the internet telephony callee device 805 receives 1014 the invite request, the internet telephony callee device 805 returns and step 1026, a success indication to the proxy server 103. Upon returning 1026 the success indication to the proxy server 103, the geographical location information retrieval process continues in FIGS. 10D, while the session initiation process continues in FIG. 10B.

The session initiation process continues in FIG. 10B with the proxy server 103 receiving, in step 1028, the success indication, and relaying, in step 1030, the success indication to the location-information-retrieving caller device 801. The location-information-retrieving caller device 801 receives, in step 1032, the success indication from the proxy server 103, and issues, in step 1034, an acknowledgement of the receipt of the success indication. The issued 1034 acknowledgement is then transmitted, in step 1036, to the proxy server 103 by the location-information-retrieving caller device 801. The proxy server 103 receives, in step 1038, the acknowledgement from the location-information-retrieving caller device 801, and forwards, in step 1040, the acknowledgement to the location-information-retrieving callee device 805. The location-information-retrieving callee device 805 receives, in step 1042, the acknowledgement from the proxy server 103, thereby establishing a session between the location-information-retrieving caller device 801 and the location-information-retrieving callee device 805 over the Internet 100.

Figure 10C:
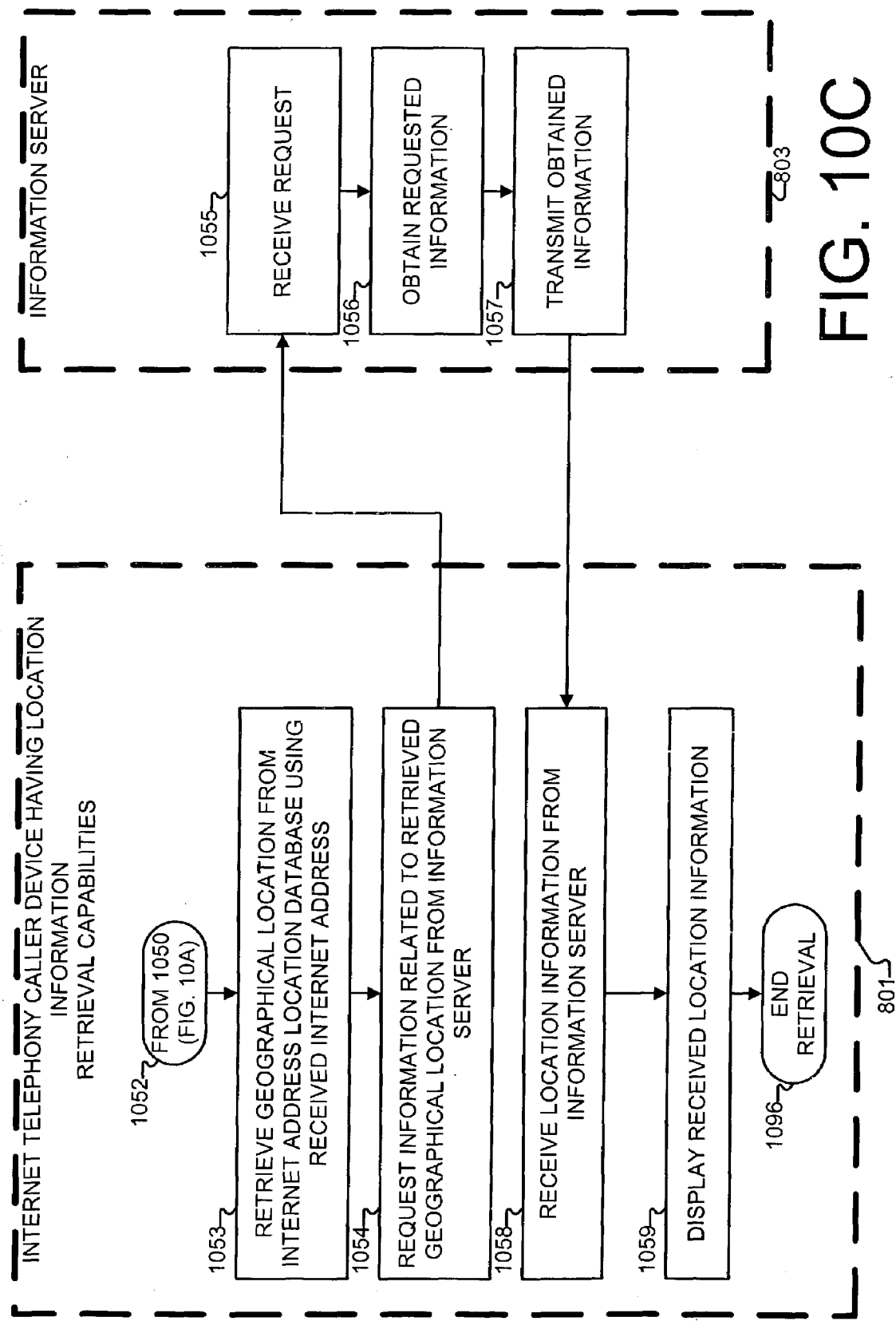

FIG. 10C is a flowchart showing one embodiment of a geographical location information retrieval process from the perspective of the location-information-retrieving caller device 801 once the location-information-retrieving caller device 801 has the IP address of the location-information-retrieving callee device 805. As shown in FIG. 10C, once the IP address of the location-information-retrieving callee device 805 is received 1020 by the location-information-retrieving caller device 801, the location-information-retrieving caller device 801 retrieves, in step 1053, the geographical location of the location-information-retrieving callee device 805 from the information server 803. In a preferred embodiment, the retrieval 1053 of the geographical location is performed by the geographical location retrieval logic 902 (FIG. 9A). Once the geographical location has been retrieved 1053, the location-information-retrieving caller device 801 requests, in step 1054, information that is related to the retrieved 1053 geographical location from the information server 803. In a preferred embodiment, the caller has already inputted a list of selected items 926 into the location-information-retrieving caller device 801. Thus, only the selected items 926 are requested by the location-information-retrieving caller device 801. The information server 803 receives, in step 1055, the request, and obtains, in step 1056, the requested information. The obtained 1056 information is then transmitted, in step 1057, from the information server 803 to the location-information-retrieving caller device 801. The location-information-retrieving caller device 801 receives, in step 1058, the requested information, and displays, in step 1059, the received information on a display 926 (FIG. 9A).

Figure 10D:
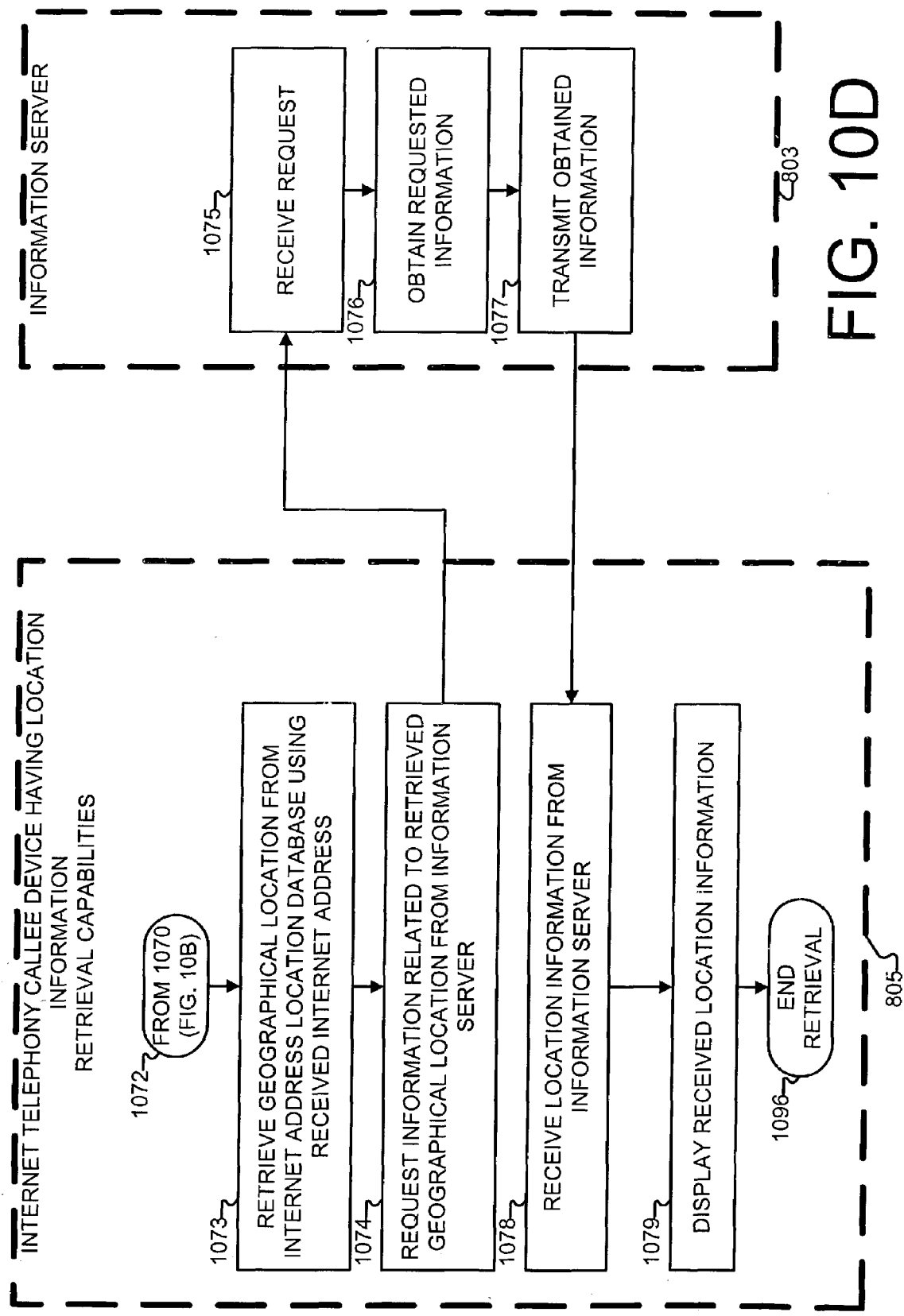

FIG. 10D is a flowchart showing one embodiment of a geographical location information retrieval process from the perspective of the location-information-retrieving callee device 805 once the location-information-retrieving callee device 805 has the IP address of the location-information-retrieving caller device 801. As shown in FIG. 10D, once the IP address of the location-information-retrieving caller device 801 is known by the location-information-retrieving callee device 805 (e.g., after the success indication has been returned 1026), the location-information-retrieving callee device 805 retrieves, in step 1073, the geographical location of the location-information-retrieving caller device 801 from the information server 803. In a preferred embodiment, the retrieval 1073 of the geographical location is performed by the geographical location retrieval logic 902 (FIG. 9B). Once the geographical location has been retrieved 1073, the location-information-retrieving callee device 805 requests, in step 1074, information that is related to the retrieved 1073 geographical location from the information server 803. In a preferred embodiment, the callee has already inputted a list of selected items 926 into the location-information-retrieving callee device 805. Thus, only the selected items 926 are requested by the location-information-retrieving callee device 805. The information server 803 receives, in step 1075, the request, and obtains, in step 1076, the requested information. The obtained 1076 information is then transmitted, in step 1077, from the information server 803 to the location-information-retrieving callee device 805. The location-information-retrieving callee device 805 receives, in step 1078, the requested information, and displays, in step 1079, the received information on a display 926 (FIG. 9B).

As shown by FIGS. 10A through 10D, the location-information-retrieving caller device 801 now has local geographical information associated with the location-information-retrieving callee device 805. Similarly, the location-information-retrieving callee device 805 has local geographical information associated with the location-information-retrieving caller device 801. In this sense, the information related to the specific geographic location of both the callee and the caller may facilitate dialogue between the callee and the caller.

FIGS. 11A through 11G are flowcharts showing another embodiment of a process for obtaining location information in an Internet telephony system. In the embodiment of FIGS. 11A through 11G, an example of parellel forking requests is shown. As such, the process begins when a location-information-retrieving caller device 801 sends, in step 1104, an invite request having a URI of a callee to a proxy server 103. The proxy server 103 receives, in step 1106, the invite request having the URI, and contacts, in step 1108, a location service (not shown) using the URI. Upon contacting the location service (not shown), the proxy server 103 obtains, in step 1110, precise Internet addresses of multiple location-information-retrieving callee devices 805 that are associated with the URI. Once the precise Internet addresses are obtained 1110, the proxy server 103 issues, in step 1114, an invite request to the first obtained Internet address, and determines, in step 1115, whether or not invitations have been issued to all of the obtained IP addresses. If it has been determined 1115 that not all invitations have been issued, then the proxy server 103 issues, in step 1116, an invite request to the next obtained Internet address, and again determines 1115 whether or not all invitations have been issued. Once invitations have been issued to all obtained IP addresses, the process continues in FIG. 11B.

Figure 11A:
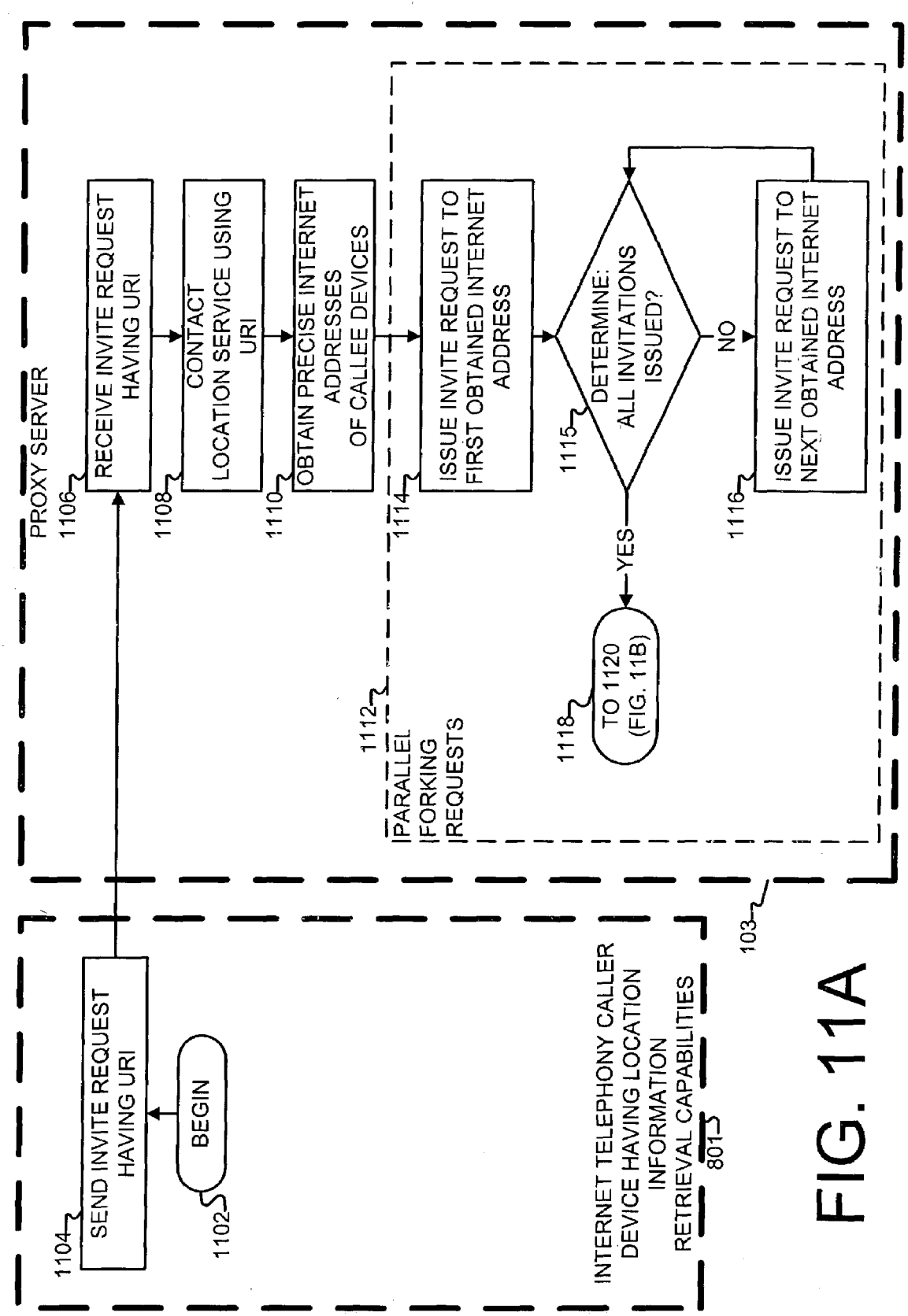
Figure 11B:
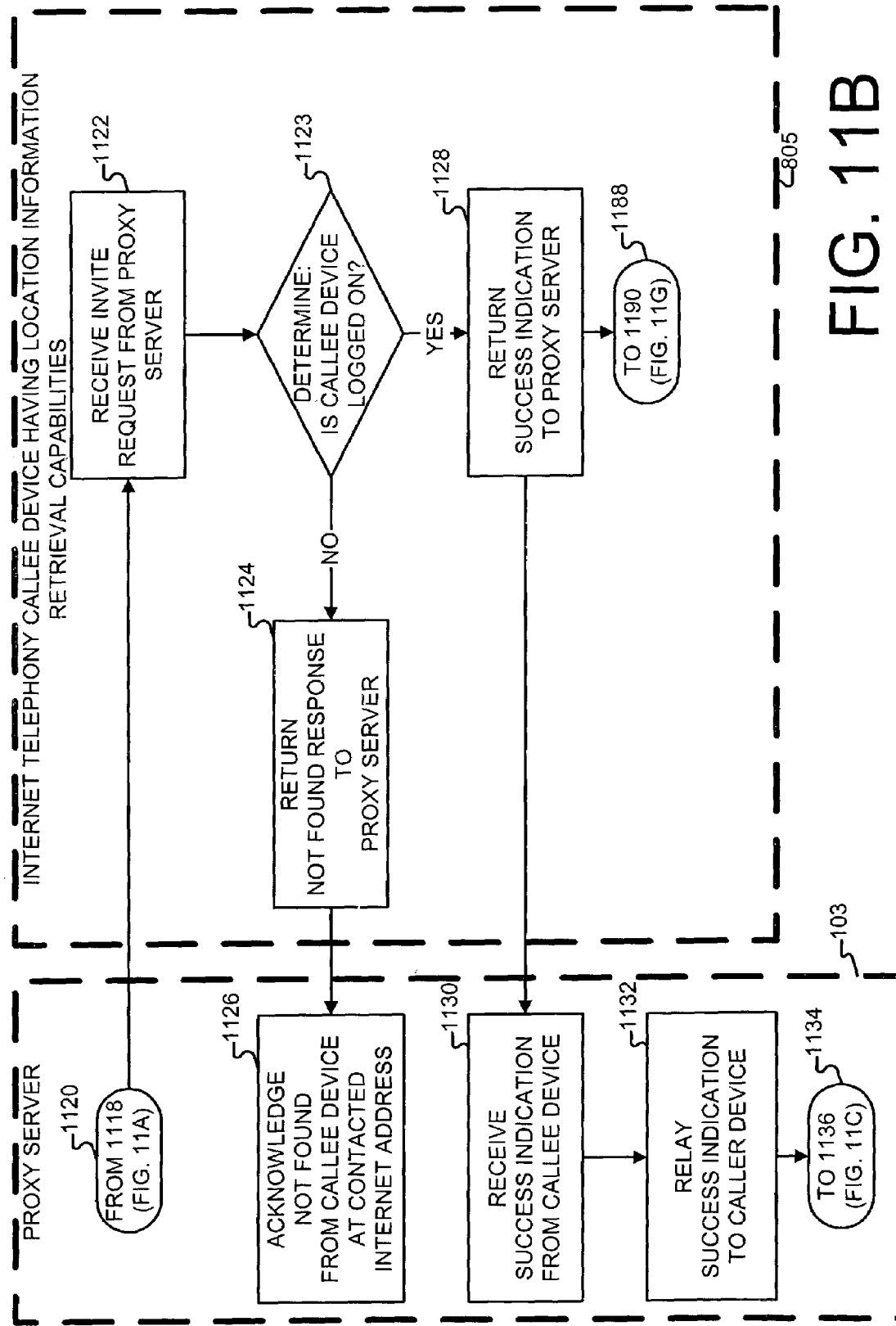

FIG. 11B is a flowchart showing a continuation of the process from FIG. 11A. While only one location-information-retrieving callee device 805 is shown for convenience, it will be clear to one of ordinary skill in the art that, for parallel forking requests 1112, multiple location-information-retrieving callee devices 805 receive invitations. Hence, while only one location-information-retrieving callee device 805 is shown, it should be evident that similar processes occur at each location-information-retrieving callee device 805 that receives an invite request. Continuing, once the proxy server 103 issues all invite requests, each location-information-retrieving callee device 805 receives, in step 1122, the invite request from the proxy server 103, and it is determined, in step 1123, whether or not the location-information-retrieving callee device 805 is logged onto the Internet. If it is determined 1123 that the location-information-retrieving callee device 805 is not logged onto the Internet, then a not found response is returned, in step 1124, to the proxy server 103, which acknowledges, in step 1126, the not found response. If, on the other hand, the location-information-retrieving callee device 805 is logged onto the Internet, then a success indication is returned, in step 1128, to the proxy server 103. At this point, since the location-information-retrieving callee device 805 has knowledge of the IP address of the location-information-retrieving caller device 801 from the invite request, the geographical location information retrieval process continues in FIG. 11G. Additionally, once the success indication has been returned 1128 to the proxy server 103, the proxy server 103 receives, in step 1130, the success indication from each of the location-information-retrieving callee devices 805 that are logged onto the Internet and relays, in step 1134, the success indication to the location-information-retrieving caller device 801, and the session initiation process continues in FIG. 11C.

As shown in FIG. 11C, the location-information-retrieving caller device 801 receives, in step 1138, the first success indication from the proxy server 103, and issues, in step 1140, an acknowledgement of the receipt of the success indication. The acknowledgement is then transmitted, in step 1142, to the proxy server 103. The location-information-retrieving caller device 801 then determines, in step 1143, whether or not there are additional success indications. If the location-information-retrieving caller device 801 determines 1143 that there are additional success indications, then the location-information-retrieving caller device 801 receives, in step 1144, the next success indication from the proxy server 103, and repeats the process until all success indications have been received 1144 and acknowledged 1140. When it is determined 1143 that there are no additional success indications, the location-information-retrieving caller device 801 further determines, in step 1145, whether or not only one success indication has been received. If only one success indication has been received, then the process continues to FIG. 11D. However, if more than one success indication has been received, then the process continues to FIG. 11E.

Figure 11D:
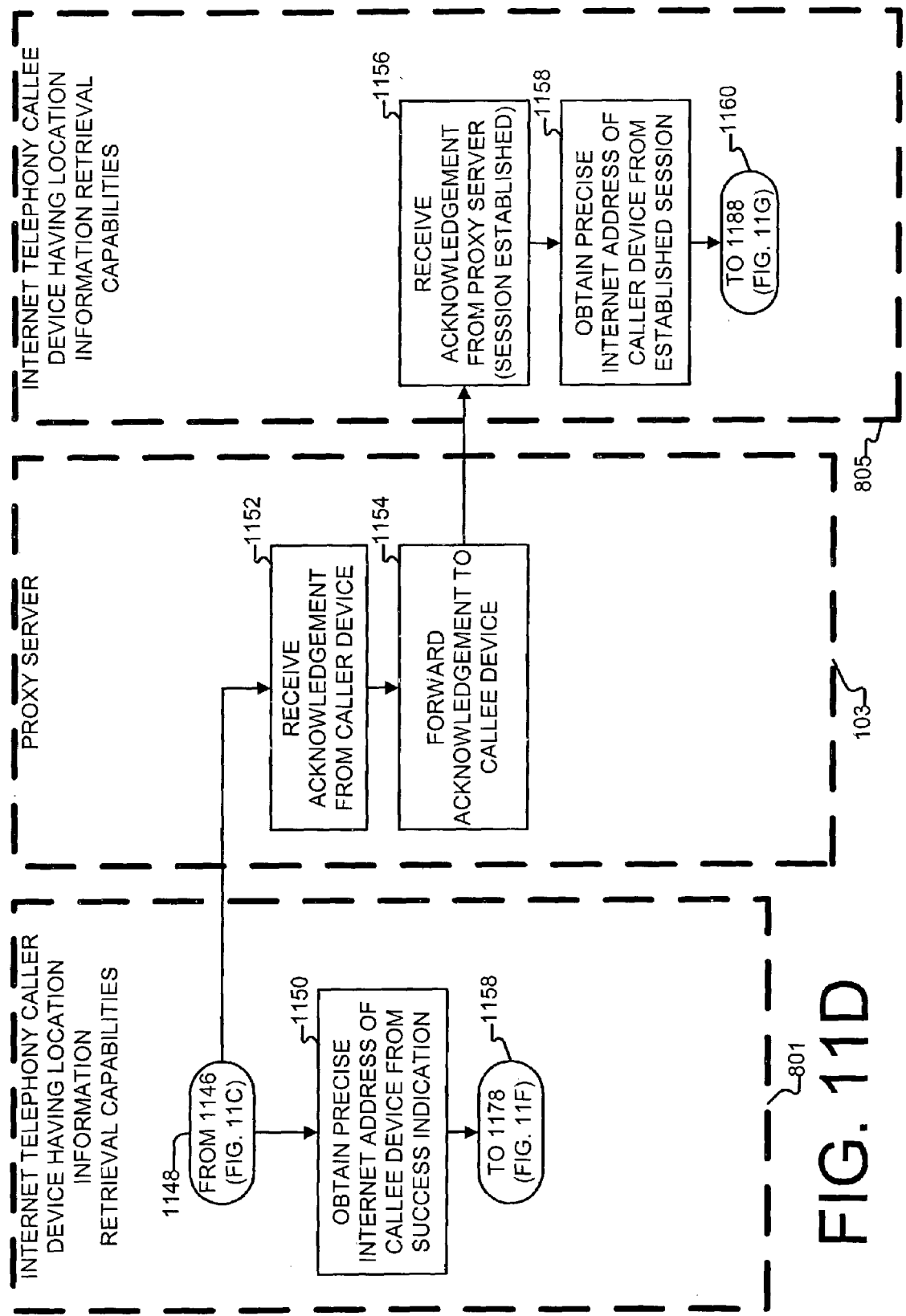

FIG. 11D shows the continuation of the process when only one success indication has been received. As shown here, if only one success indication has been received, the location-information-retrieving caller device 801 may obtain, in step 1150 a precise IP address of the location-information-retrieving callee device 805. Once the precise IP address of the location-information-retrieving callee device 805 has been obtained 1150, the geographical location information retrieval process continues in FIG. 11F. Additionally, once the single success indication has been received 1138 and an acknowledgement has been issued 1140, the proxy server 103 receives, in step 1152, the acknowledgement from the location-information-retrieving caller device 801. The acknowledgement is then forwarded to the location-information-retrieving callee device 805 by the proxy server 103. The location-information-retrieving callee device 805 receives the acknowledgement from the proxy server 103, thereby establishing a session between the location-information-retrieving caller device 801 and the location-information-retrieving callee device 805. At this point, the location-information-retrieving callee device 805 may obtain, in step 1158, the precise IP address of the location-information-retrieving caller device 801 from the established session. Once the precise IP address of the location-information-retrieving caller device 801 is known by the location-information-retrieving callee device 805, the geographical location information retrieval process, from the perspective of the location-information-retrieving callee device location-information-retrieving callee device 805, continues in FIG. 11G.

Figure 11E:
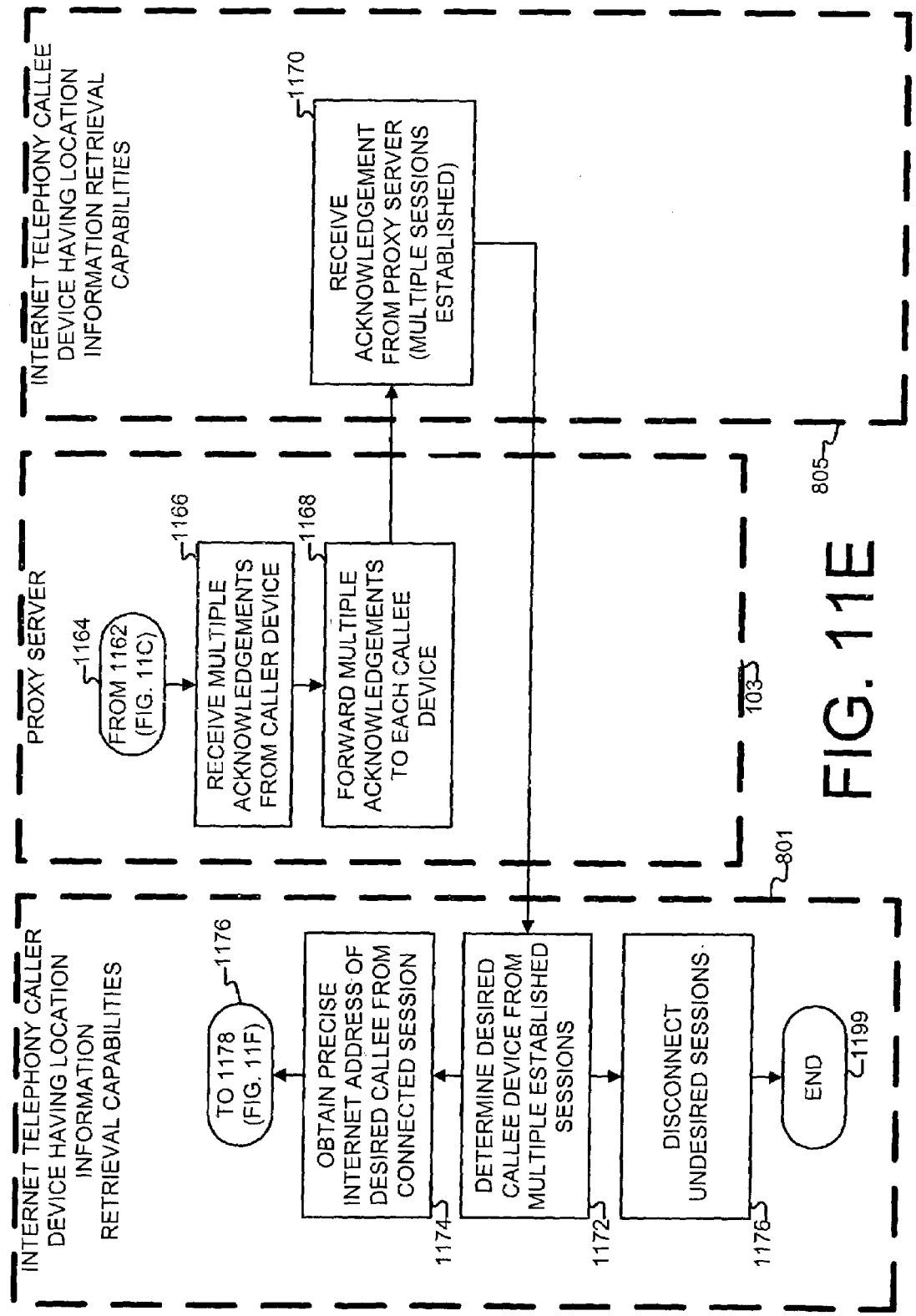

FIG. 11E shows the continuation of the process from FIG. 11C when more than one success indication has been received. As shown here, the proxy server 103 receives, in step 1166, multiple acknowledgements from the 801, and forwards, in step 1168, the acknowledgements to each of the location-information-retrieving callee devices 805 that are logged on to the Internet. Each of the location-information-retrieving callee devices 805 receives, in step 1170, its respective acknowledgement from the proxy server 103, thereby establishing multiple sessions between the various location-information-retrieving callee devices 805 and the location-information-retrieving caller device 801. The caller at the location-information-retrieving caller device 801 then determines, in step 1172, which of the multiple established session is the desired session, and all undesired sessions are then disconnected, in step 1176. Thus, at this point, only one session remains between the location-information-retrieving callee device 805 and the location-information-retrieving caller device 801, thereby permitting the location-information-retrieving caller device 801 to obtain, in step 1174, a precise IP address of the desired location-information-retrieving callee device 805. Once the precise IP address has been obtained 1174, the geographical location information retrieval process, from the perspective of the location-information-retrieving caller device 801, continues in FIG. 11F.

FIG. 11F is a flowchart showing one embodiment of a geographical location information retrieval process from the perspective of the location-information-retrieving caller device 801 once the IP address of the location-information-retrieving callee device 805 is known by the location-information-retrieving caller device 801. As shown in FIG. 11F, the location-information-retrieving caller device 801 retrieves, in step 1179, the geographical location of the location-information-retrieving callee device 805 from the information server 803. In a preferred embodiment, the retrieval 1179 of the geographical location is performed by the geographical location retrieval logic 902 (FIG. 9A). Once the geographical location has been retrieved 1179, the location-information-retrieving caller device 801 requests, in step 1180, information that is related to the retrieved 1179 geographical location from the information server 803. In a preferred embodiment, the caller has already inputted a list of selected items 926 into the location-information-retrieving caller device 801. Thus, only the selected items 926 are requested by the location-information-retrieving caller device 801. The information server 803 receives, in step 1181, the request, and obtains, in step 1182, the requested information. The obtained 1182 information is then transmitted, in step 1183, from the information server 803 to the location-information-retrieving caller device 801. The location-information-retrieving caller device 801 receives, in step 1184, the requested information, and displays, in step 1185, the received information on a display 926 (FIG. 9A).

Figure 11G:
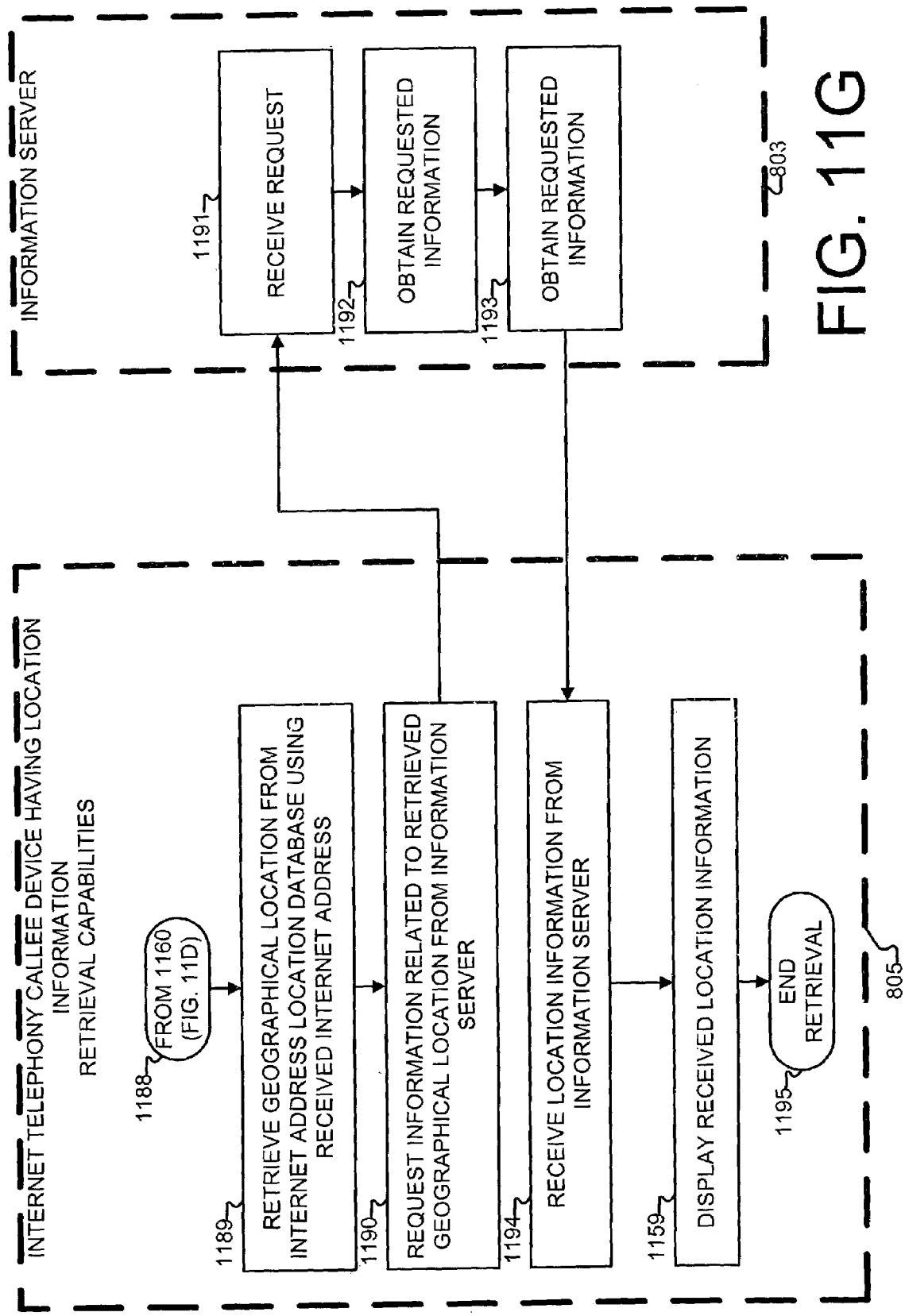

FIG. 11G is a flowchart showing one embodiment of a geographical location information retrieval process from the perspective of the location-information-retrieving callee device 805 once the location-information-retrieving callee device 805 has the IP address of the location-information-retrieving caller device 801. As shown in FIG. 11G, once the IP address of the location-information-retrieving caller device 801 is known by the location-information-retrieving callee device 805 (e.g., after the success indication has been returned), the location-information-retrieving callee device 805 retrieves, in step 1189, the geographical location of the location-information-retrieving caller device 801 from the information server 803. In a preferred embodiment, the retrieval 1189 of the geographical location is performed by the geographical location retrieval logic 902 (FIG. 9B). Once the geographical location has been retrieved 1189, the location-information-retrieving callee device 805 requests, in step 1190, information that is related to the retrieved 1073 geographical location from the information server 803. In a preferred embodiment, the callee has already inputted a list of selected items 926 into the location-information-retrieving callee device 805. Thus, only the selected items 926 are requested by the location-information-retrieving callee device 805. The information server 803 receives, in step 1191, the request, and obtains, in step 1192, the requested information. The obtained 1192 information is then transmitted, in step 1193, from the information server 803 to the location-information-retrieving callee device 805. The location-information-retrieving callee device 805 receives, in step 1194, the requested information, and displays, in step 1159, the received information on a display 926 (FIG. 9B).

Similar to the embodiment of FIGS. 10A through 10D, the location-information-retrieving caller device 801 of FIGS. 11A through 11G now has local geographical information associated with the location-information-retrieving callee device 805. Similarly, the location-information-retrieving callee device 805 has local geographical information associated with the location-information-retrieving caller device 801. In this sense, the information related to the specific geographic location of both the callee and the caller may facilitate dialogue between the callee and the caller.

Figure 12:
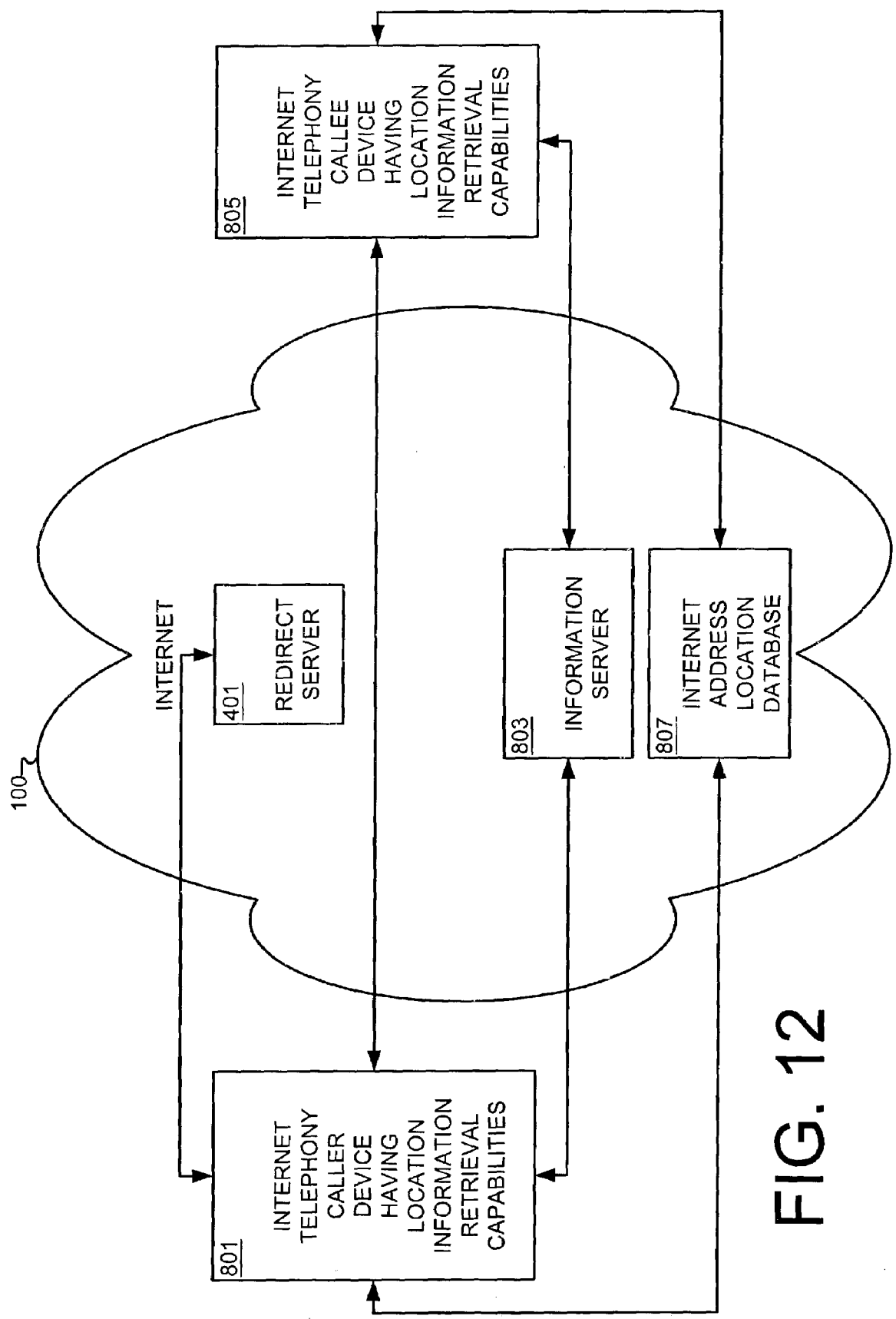
FIG. 12 is a block diagram showing another embodiment of an Internet telephony system, in which a caller device and a callee device are configured to retrieve location information.

FIG. 12 is a block diagram showing another embodiment of an Internet telephony system in which a location-information-retrieving caller device 801 and a location-information-retrieving callee device 805 are in communication with each other over the Internet 100. The embodiment of FIG. 12 includes a location-information-retrieving caller device 801, a location-information-retrieving callee device 805, a redirect server 401, an information server 803, and an Internet address location database Internet address location database 807. In a preferred embodiment, the information server 803, and the Internet address location database 807 are located within the Internet 100. A broad overview of the operation begins with the location-information-retrieving caller device 801 initiating a session with the location-information-retrieving callee device 805. In the embodiment of FIG. 12, a redirect server 401 is used to initiate the session. During the initiation of the session, the redirect server 401 relays the IP address of the location-information-retrieving callee device 805 to the location-information-retrieving caller device 801. The location-information-retrieving caller device 801 then directly initiates a session with the location-information-retrieving callee device 805 using the IP address received from the redirect server 401. Thus, as the session is being initiated, both the location-information-retrieving caller device 801 and the location-information-retrieving callee device 805 have knowledge of the other's IP address. Once the location-information-retrieving caller device 801 knows the IP address of the location-information-retrieving callee device 805, the location-information-retrieving caller device 801 accesses the Internet address location database 807 to obtain a geographical location associated with the IP address of the location-information-retrieving callee device 805. The obtained geographical location is then used to further retrieve geographical location information associated with the location-information-retrieving callee device 805 from an information server 803. Similarly, once the location-information-retrieving callee device 805 knows the IP address of the location-information-retrieving caller device 801, the location-information-retrieving callee device 805 accesses the Internet address location database 807 to obtain a geographical location associated with the IP address of the location-information-retrieving caller device 801. The obtained geographical location is then used to further retrieve geographical location information associated with the location-information-retrieving caller device 801 from the information server 803. The information server 803 has various information related to geographic locations, such as local time, local weather reports, local news, local sporting events, etc. for any given geographical location. Thus, the information server 803 may comprise a plurality of databases (not shown) such as Internet servers for weather (e.g., www.weather.com, etc.), for sports (e.g., www.espn.com, etc.), for news (e.g., www.cnn.com, etc.), or a plethora of other Internet accessible databases. Alternatively, the information server 803 may be a dedicated server or system configured to locally store all of the geographical location information. Thus, either the location-information-retrieving caller device 801 or the location-information-retrieving callee device 805 may access the information server 803 to obtain information associated with a specific geographical location.

Figure 13A:
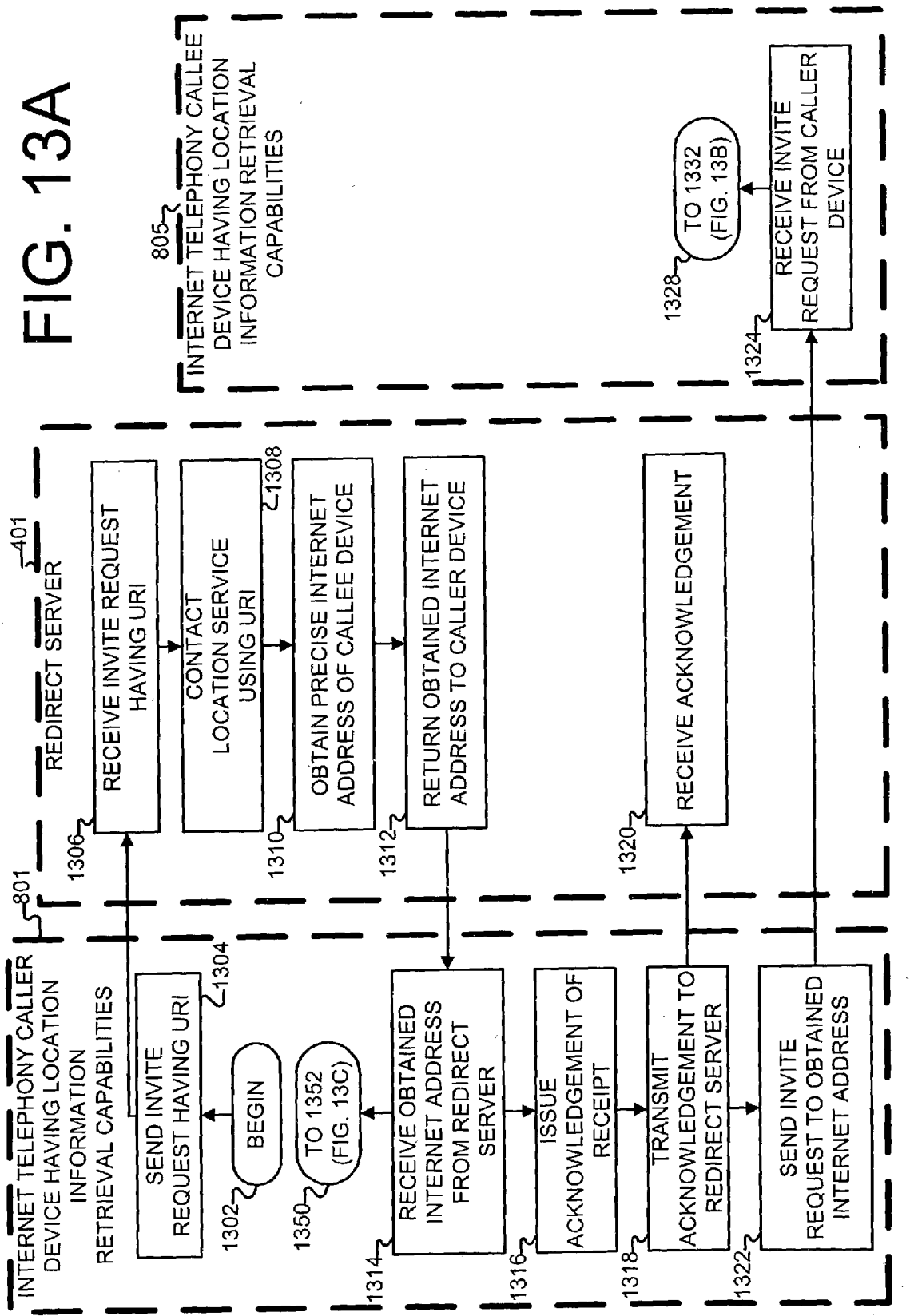
FIGS. 13A through 13D are flowcharts showing one embodiment of a process for obtaining location information in an Internet telephony system.
Figure 13B:
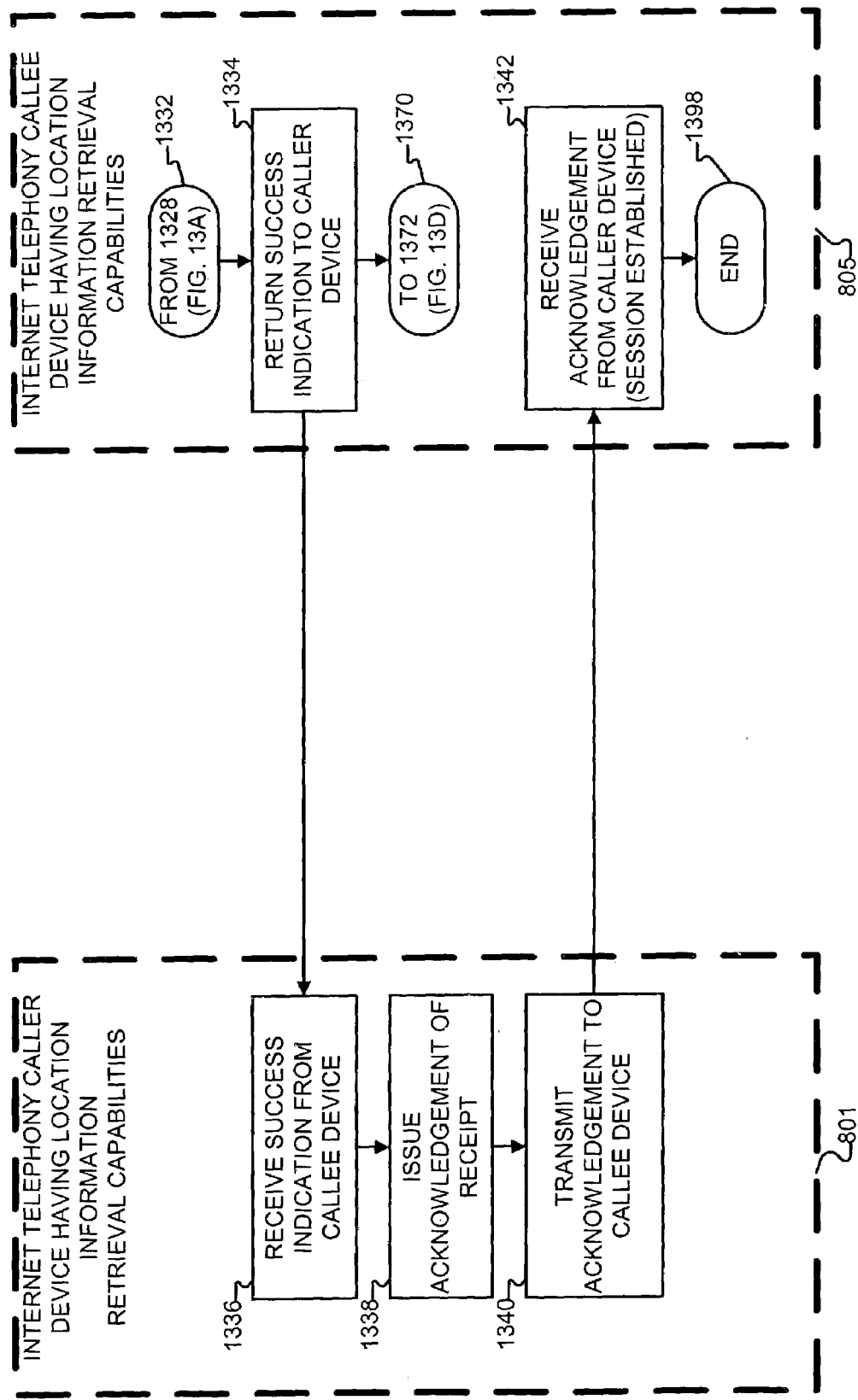
Figure 13C:
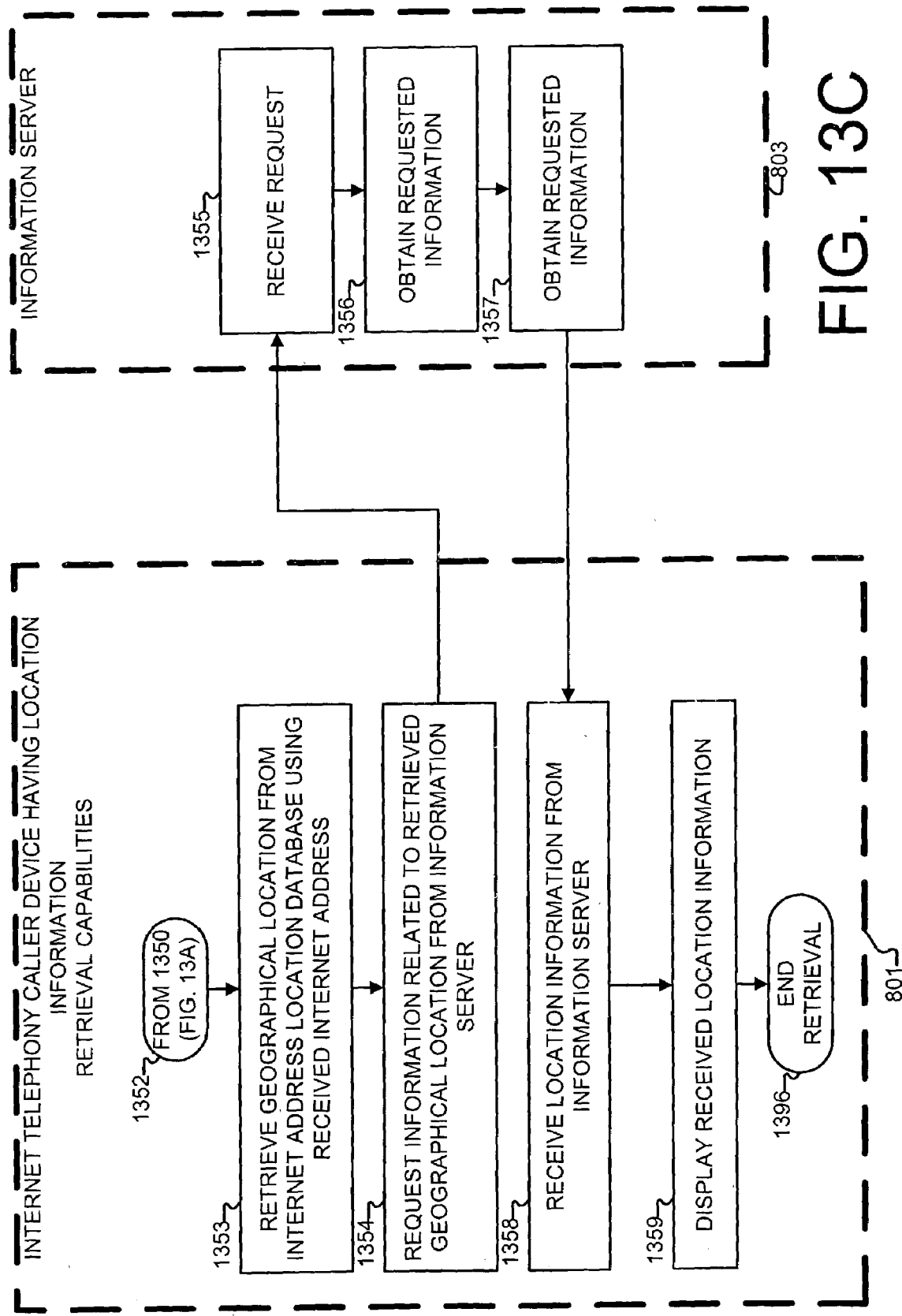

FIGS. 13A through 13D are flowcharts showing one embodiment of a process for obtaining location information in the Internet telephony system of FIG. 12. As shown in FIG. 13A, the process begins when an location-information-retrieving caller device 801 sends, in step 1304, an invite request having a URI of a callee to a redirect server 401. The redirect server receives, in step 1306, the invite request having the URI, and contacts, in step 1308, a location service (not shown) using the received URI. Upon contacting the location service (not shown), the redirect server 401 obtains, in step 1310, a precise IP address of a location-information-retrieving callee device 805 using the URI. The IP address is returned to the location-information-retrieving caller device 801, which receives, in step 1314, the IP address from the redirect server 401. At this point, since the location-information-retrieving caller device 801 has knowledge of the IP address of the location-information-retrieving callee device 805, it may retrieve geographical location information related to the location-information-retrieving callee device 805. This is shown in FIG. 13C. Additionally, once the IP address has been received from the redirect server 401, the location-information-retrieving caller device 801 issues, in step 1316, an acknowledgement of the receipt of the IP address. The acknowledgement is transmitted, in step 1318, to the redirect server 401, which receives, in step 1320, the acknowledgement from the location-information-retrieving caller device 801. The location-information-retrieving caller device 801 then sends, in step 1322, an invite request directly to the obtained IP address of the location-information-retrieving callee device 805, which is received, in step 1324, by the location-information-retrieving callee device 805, and the initiation of the session continues in FIG. 13B.

Figure 13D:
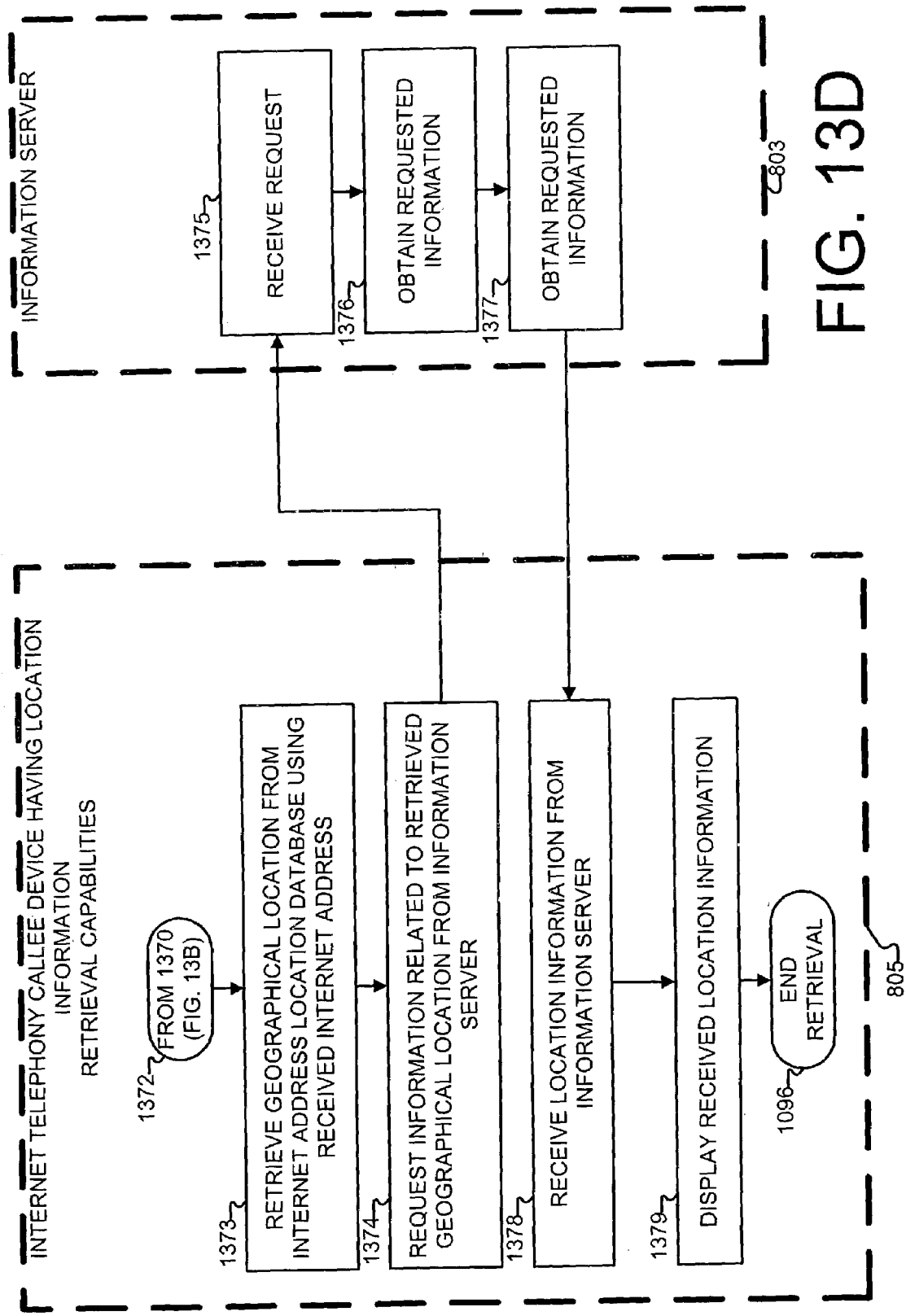

Continuing with FIG. 13B, the location-information-retrieving callee device 805, upon receiving the invite request, returns, in step 1334, a success indication to the location-information-retrieving caller device 801. At this point, the location-information-retrieving callee device 805 has knowledge of the IP address of the location-information-retrieving caller device 801 from the invite request, and, therefore, may initiate retrieval of geographical location information associated with the location-information-retrieving caller device 801. This is shown in FIG. 13D. The returned success indication is received, in step 1336, by the location-information-retrieving caller device 801, which issues, in step 1338, an acknowledgement of the receipt of the success indication. The acknowledgement is transmitted, in step 1340, to the location-information-retrieving callee device 805, which receives, in step 1342, the acknowledgement from the location-information-retrieving caller device 801, thereby establishing a session between the location-information-retrieving caller device 801 and the location-information-retrieving callee device 805.

FIG. 13C is a flowchart showing one embodiment of a geographical location information retrieval process from the perspective of the location-information-retrieving caller device 801 once the location-information-retrieving caller device 801 has the IP address of the location-information-retrieving callee device 805. As shown in FIG. 13C, once the IP address of the location-information-retrieving callee device 805 is received 1314 by the location-information-retrieving caller device 801, the location-information-retrieving caller device 801 retrieves, in step 1353, the geographical location of the location-information-retrieving callee device 805 from the information server 803. In a preferred embodiment, the retrieval 1353 of the geographical location is performed by the geographical location retrieval logic 902 (FIG. 9A). Once the geographical location has been retrieved 1353, the location-information-retrieving caller device 801 requests, in step 1354, information that is related to the retrieved 1353 geographical location from the information server 803. In a preferred embodiment, the caller has already inputted a list of selected items 926 into the location-information-retrieving caller device 801. Thus, only the selected items 926 are requested by the location-information-retrieving caller device 801. The information server 803 receives, in step 1355, the request, and obtains, in step 1356, the requested information. The obtained 1356 information is then transmitted, in step 1357, from the information server 803 to the location-information-retrieving caller device 801. The location-information-retrieving caller device 801 receives, in step 1358, the requested information, and displays, in step 1359, the received information on a display 926 (FIG. 9A).

FIG. 13D is a flowchart showing one embodiment of a geographical location information retrieval process from the perspective of the location-information-retrieving callee device 805 once the location-information-retrieving callee device 805 has the IP address of the location-information-retrieving caller device 801. As shown in FIG. 13D, once the IP address of the location-information-retrieving caller device 801 is known by the location-information-retrieving callee device 805 (e.g., after the success indication has been returned), the location-information-retrieving callee device 805 retrieves, in step 1373, the geographical location of the location-information-retrieving caller device 801 from the information server 803. In a preferred embodiment, the retrieval 1373 of the geographical location is performed by the geographical location retrieval logic 902 (FIG. 9B). Once the geographical location has been retrieved 1373, the location-information-retrieving callee device 805 requests, in step 1374, information that is related to the retrieved 1373 geographical location from the information server 803. In a preferred embodiment, the callee has already inputted a list of selected items 926 into the location-information-retrieving callee device 805. Thus, only the selected items 926 are requested by the location-information-retrieving callee device 805. The information server 803 receives, in step 1375, the request, and obtains, in step 1376, the requested information. The obtained 1376 information is then transmitted, in step 1377, from the information server 803 to the location-information-retrieving callee device 805. The location-information-retrieving callee device 805 receives, in step 1378, the requested information, and displays, in step 1379, the received information on a display 926 (FIG. 9B).

Having described several embodiments of systems and methods for retrieving geographical location information in an Internet telephony system, attention is now turned to FIGS. 14 through 16D, which show embodiments of a system and method for retrieving geographical location information in a PSTN telephony system.

Figure 14:
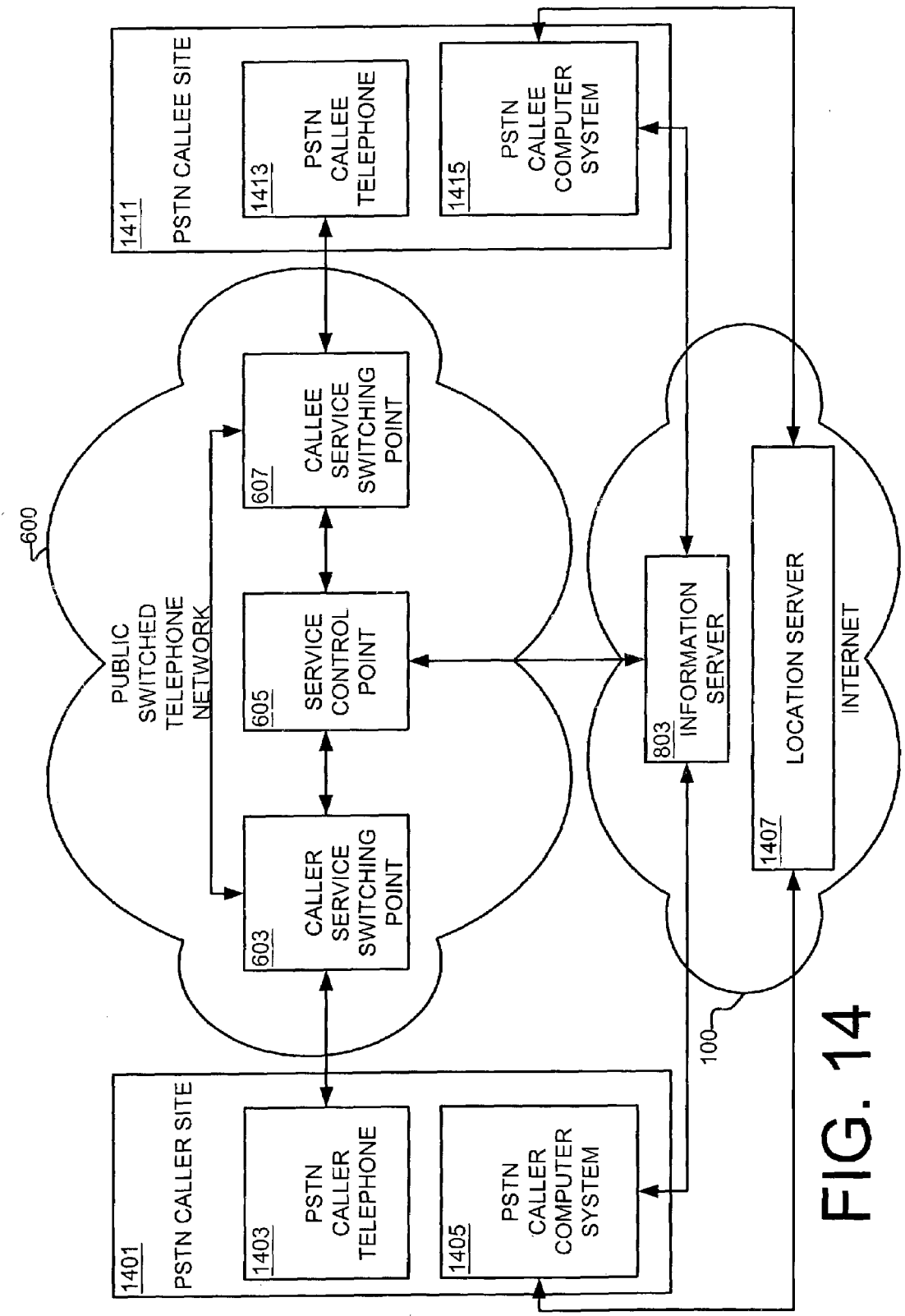
FIG. 14 is a block diagram showing one embodiment of a PSTN telephony system, in which a PSTN caller and a PSTN callee may retrieve location information.

FIG. 14 is a block diagram showing a PSTN telephony system, in which a PSTN caller telephone 1403 and a PSTN callee telephone 1413 are in communication with each other. As shown in FIG. 14, a PSTN caller site 1401 and a PSTN callee site 1411 are configured to communicate with each other through a PSTN 600. The PSTN caller site 1401 includes a PSTN caller telephone 1403 and a PSTN caller computer system 1405, while the PSTN callee site 1411 includes a PSTN callee telephone 1413 and a PSTN callee computer system 1415. The PSTN 600 includes a caller service switching point (SSP) 603, which is configured to connect both outgoing and incoming calls to the PSTN caller telephone 1403 through the PSTN 600. The PSTN 600 also includes a callee SSP 607, which is similarly configured to connect outgoing and incoming calls to the PSTN callee telephone 1413. Both the caller SSP 603 and the callee SSP 607 are configured to communicate with a service control point (SCP) 605, which, as is well-known, performs a variety of advanced intelligent network (AIN) functions including area number calling service, disaster recovery service, do not disturb service, and 5-digit extension dialing service, etc. In the embodiment of FIG. 14, the SCP 605 is configured to further execute part of the location information retrieval function. In this sense, the SCP 605 communicates with a location server 1407 on the Internet 100, which has information correlating telephone numbers with geographical locations. For example, the location server 1407 may have information that correlates a telephone area code to a specific geographical location, thereby permitting look-up of a geographical location if a telephone area code is known. More specifically, if an area code is associated with a broad geographic region, then the location server 1407 may have information that more specifically correlates a telephone number to, for example, a city or a county within the broad geographical region.

The operating environment shown in FIG. 14 also includes an information server 803 located, preferably, in the Internet 100. The information server 803 has various information related to geographic locations, such as local time, local weather reports, local news, local sporting events, etc. The information server 803 may comprise a plurality of databases (not shown) such as Internet servers for weather (e.g., www.weather.com, etc.), for sports (e.g., www.espn.com, etc.), for news (e.g., www.cnn.com, etc.), or a plethora of other Internet accessible databases. Alternatively, the information server 803 may be a dedicated server or system configured to locally store all of the geographical location information. Thus, either a PSTN caller computer system 1405 or a PSTN callee computer system 1415 may access the information server 803 to obtain information associated with a specific geographical location.

A broad overview of one embodiment of the operation of the system of FIG. 14 may begin with a caller programming into the PSTN caller computer system 1405 a list of selected items associated with a callee. Similarly, the callee may program into the PSTN callee computer system 1415 a list of selected items associated with the caller. When the caller, who is logged on to the Internet 100 at the PSTN caller site 1401, dials a telephone number using the PSTN caller telephone 1403, the dialed call is processed by the caller SSP 603, which contacts the SCP 605 for further call processing. The SCP 605 contacts a callee SSP 607 with a connection request in order to connect the call from the caller. Additionally, the SCP 605 issues an instruction to a location server 1407 to correlate the dialed telephone number to a specific geographical location and forward the geographical location to the PSTN caller computer system 1405. The location server 1407 determines whether or not the PSTN caller computer system 1405 is logged on at the PSTN caller site 1401, and if it is determined that the PSTN caller computer system 1405 is logged on, then the location server 1407 correlates the dialed telephone number to a specific geographical location, and relays the geographical location to the PSTN caller computer system 1405. The PSTN caller computer system 1405 receives the geographical location, and accesses the information server 802, which has information related to the geographical location, and retrieves the desired information. The retrieved information is displayed for the caller at the PSTN caller site 1401.

During this time, the callee SSP 607 accepts the connection request and connects the call through to the PSTN callee telephone 1413. At this point, the SCP 605 further issues an instruction to a location server 1407 to correlate the caller's telephone number to a specific geographical location and forward the geographical location to the PSTN callee computer system 1415. The location server 1407 determines whether or not the PSTN callee computer system 1415 is logged on at the PSTN callee site 1411, and if it is determined that the PSTN callee computer system 1415 is logged on, then the location server 1407 correlates the caller's telephone number to a specific geographical location, and relays the geographical location to the PSTN callee computer system 1415. The PSTN callee computer system 1415 receives the geographical location, and accesses the information server 802, which has information related to the geographical location, and retrieves the desired information. The retrieved information is displayed for the caller at the PSTN callee site 1411. Specific embodiments of a PSTN caller computer system 1405 and a PSTN callee computer system 1415 are shown in FIGS. 15A and 15B, respectively.

Figure 15A:
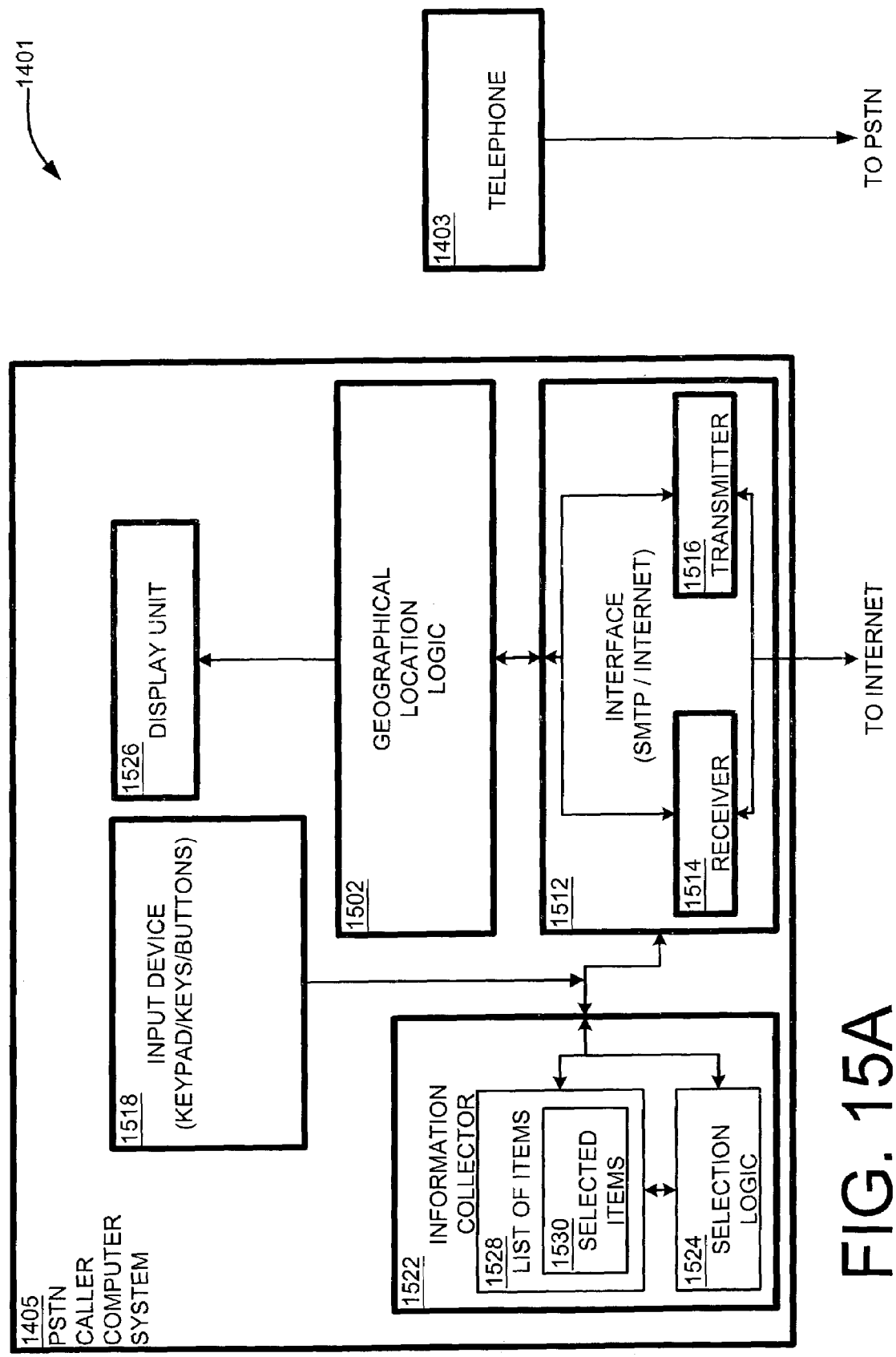
FIG. 15A is a block diagram showing the caller computer of FIG. 14 in greater detail.

FIG. 15A is a block diagram showing the PSTN caller computer system 1405 of FIG. 14 in greater detail. As shown in FIG. 15A, the PSTN caller computer system 1405 comprises an input device 1518, which may be a computer keyboard, a mouse, a numeric keypad, or any number of well-known input peripheral devices. Additionally, the PSTN caller computer system 1405 comprises information collection logic 1522, which includes a list of items 1528 and selection logic 1524. The list of items 1528 may be a list showing available information for a specific geographical location, such as local time, local weather reports, local sporting events, local news, etc. from which a user may select desired items. For example, if a user desires to only find out the local news and local weather report for a given location, then the user may select only the local news and local weather report from the list of items. In this sense, the input device 1518 may be used to input a user's selection. The selected items 1530 may be stored in the information collection logic 1522 for later use. Since systems and methods for selecting items from a list is well-known in the art, further discussion of the selection of the items is omitted here.

In addition to the input device 1518 and the information collection logic 1522, the PSTN caller computer system 1415 further comprises geographical location logic 1502, an interface 1512 having a receiver 1514 and a transmitter 1516, and a display unit 1526. The interface 1512 is configured to receive information via the receiver 1514 and transmit information via the transmitter 1516. In one embodiment, the interface 1512 receives the geographical location from the location server 1407, as well as the geographical location information from the information server 803. The geographical location logic 1502 stores the specific geographical location that has been received from the location server 1407. This information is used by the information collection logic 1522 during the retrieval of geographical location information associated with the callee's location. Once the desired information has been collected by the information collection logic 1522, the collected information may be displayed on the display unit. As such, the display unit 1526 may be a computer monitor or any number of known display devices.

Figure 15B:
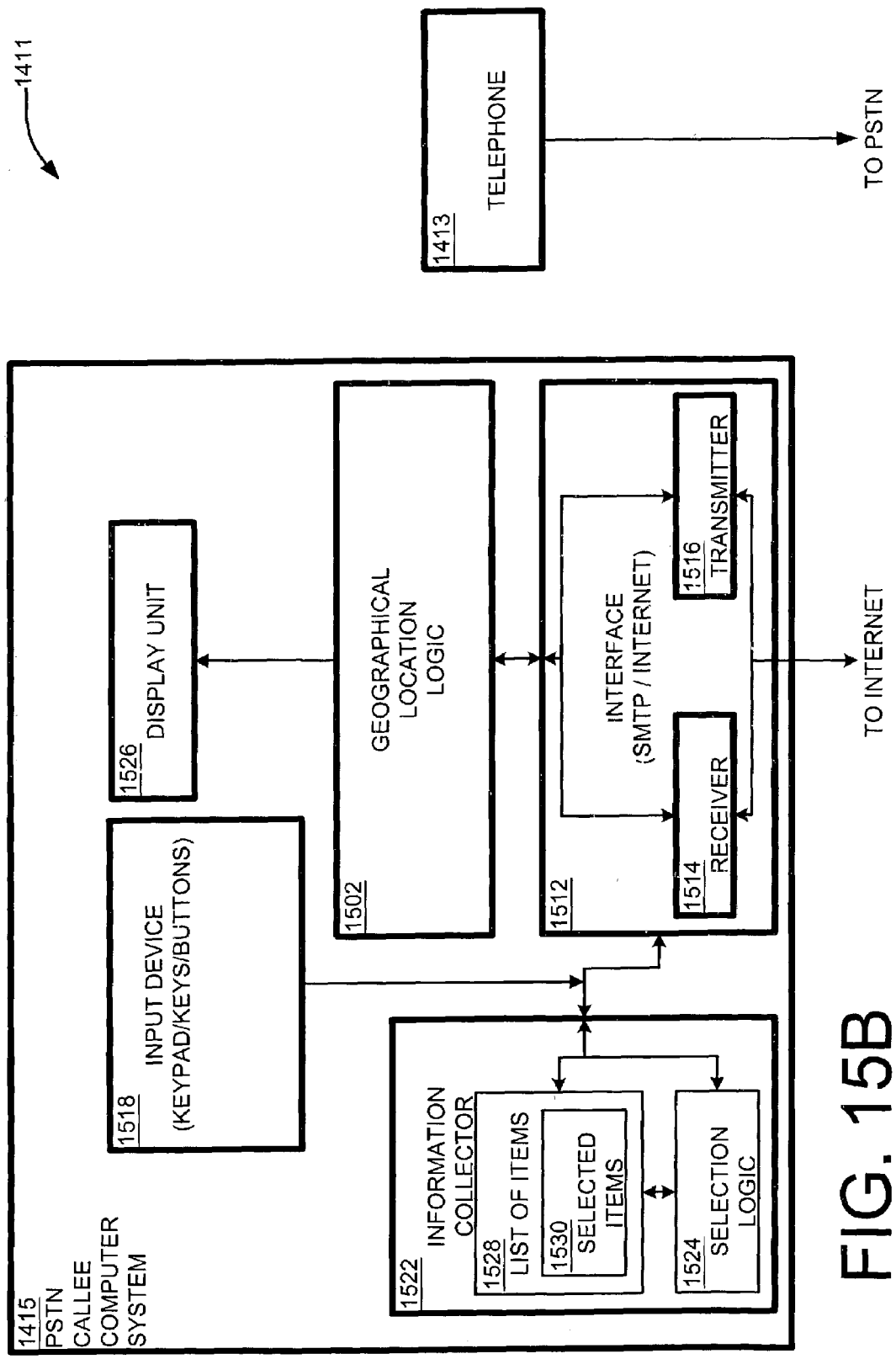
FIG. 15B is a block diagram showing the callee computer of FIG. 14 in greater detail.

FIG. 15B is a block diagram showing the PSTN callee computer system 1415 of FIG. 14 in greater detail. Since, in this embodiment, the operation of the PSTN callee computer system 1415 is similar to the operation of the PSTN caller computer system 1405, the PSTN callee computer system 1415 is similar to the PSTN caller computer system 1405 of FIG. 15A. As shown in FIG. 15B, the PSTN callee computer system 1415 comprises an input device 1518, which may be a computer keyboard, a mouse, a numeric keypad, or any number of well-known input peripheral devices. Additionally, the PSTN callee computer system 1415 comprises information collection logic 1522, which includes a list of items 1528 and selection logic 1524. Similar to FIG. 15A, the list of items 1528 may be a list showing available information for a specific geographical location, such as local time, local weather reports, local sporting events, local news, etc. from which a user may select desired items. For example, if a user desires to only find out the local news and local weather report for a given location, then the user may select only the local news and local weather report from the list of items. In this sense, the input device 1518 may be used to input a user's selection. The selected items 1530 may be stored in the information collection logic 1522 for later use. Since systems and methods for selecting items from a list is well-known in the art, further discussion of the selection of the items is omitted here.

In addition to the input device 1518 and the information collection logic 1522, the PSTN callee computer system 1415 further comprises geographical location logic 1502, an interface 1512 having a receiver 1514 and a transmitter 1516, and a display unit 1526. The interface 1512 is configured to receive information via the receiver 1514 and transmit information via the transmitter 1516. In one embodiment, the interface 1512 receives the geographical location from the location server 1407, as well as the geographical location information from the information server 803. The geographical location logic 1502 stores the specific geographical location that has been received from the location server 1407. This information is used by the information collection logic 1522 during the retrieval of geographical location information associated with the caller's location. Once the desired information has been collected by the information collection logic 1522, the collected information may be displayed on the display unit. As such, the display unit 1526 may be a computer monitor or any number of known display devices.

Having described one embodiment of a PSTN telephony system having geographical location information retrieval capabilities, attention is turned to FIGS. 16A through 16D, which show one embodiment of a process for obtaining geographical location information in the PSTN telephony system of FIGS. 14 through 15B.

FIGS. 16A through 16D are flowcharts showing one embodiment of a process for obtaining location information in a PSTN telephony system. In a preferred embodiment, as shown in FIG. 16A, the process begins when a feature code is entered, in step 1602, and a telephone number is dialed, in step 1606, at a PSTN caller telephone 1403. In an alternative embodiment, the process may begin with the dialing 1606 of the telephone number, and the information retrieval process may be disabled with the entry 1604 of the feature code. In any event, in the preferred embodiment, once the feature code has been entered 1604 and the the telephone number dialed 1606, a caller service switching point (SSP) 603 receives, in step 1608, the dialed number with the feature code. The caller SSP 603 issues, in step 1610, a query having the dialed telephone number to the service control point (SCP) 605, which receives, in step 1612, the query having the dialed telephone number from the caller SSP 603. The SCP 605 instructs, in step 1614, the caller SSP 603 to continue the call processing, and also issues, in step 1620, an instruction to a location server 1407 to retrieve a geographical location correlated to the dialed telephone number. The instruction to continue call processing is received, in step 1616, by the caller SSP 603, and the call processing continues in FIG. 16C. The issued 1620 instruction to the location server 1407 is received, in step 1622, by the location server 1407, which determines, in step 1624, whether or not the caller is logged on at a PSTN caller computer system 1405 at the PSTN caller site 1401. If it is determined that the caller is not logged on, then the retrieval of geographical location information is terminated, in step 1626. If, on the other hand, it is determined 1624 that the caller is logged on to a PSTN caller computer system 1405, then the geographical location information retrieval process continues in FIG. 16B.

FIG. 16B is a flowchart showing one embodiment of the geographical information retrieval process as seen from the perspective of the PSTN caller. Once the location server 1407 has determined 1624 that a caller is logged on to a PSTN caller computer system 1405, then the location server 1407 correlates, in step 1642, the dialed telephone number to a specific geographical location. In one embodiment, this may be done using a lookup table or another database that has telephone numbers correlated to geographical locations. Since databases correlating geographical locations with telephone numbers are well-known in the art, further discussion of the correlating of geographical locations with telephone numbers is omitted here. Once a geographical location has been correlated to the dialed telephone number, the geographical location is relayed, in step 1644, by the location server to the PSTN caller computer system 1405. The PSTN caller computer system receives, in step 1646, the geographical location using geographical location logic 1502 (FIG. 15A), and issues, in step 1648, an instruction for information associated with the geographical location using information collection logic 1522 (FIG. 15A). Since, in a preferred embodiment, the process is executed by the PSTN caller computer system 1405 of FIG. 15A, the PSTN caller computer system 1405 already has a list of selected items 1528 (FIG. 15A) related to a geographical location, which the caller desires to collect. Hence, in the preferred embodiment, the issued 1648 instruction includes the list of items (e.g., local time, local weather, local sports, local news, etc.) selected by the caller. Once the instruction has been issued 1648 by the information collection logic 1522 (FIG. 15A), the information server 803 receives, in step 1650, the instruction, and obtains, in step 1652, the information associated with the specific geographical location. The obtained 1654 information is then relayed, in step 1654, to the PSTN caller computer system 1405, which receives, in step 1656, the location information through the interface 1512 (FIG. 15A) and displays, in step 1658, the information for the caller using the display unit 1526 (FIG. 15A).

During this time, the call connection process continues in FIG. 16C. Once the continue instruction has been received 1616 by the caller SSP 603, the caller SSP 603 issues, in step 1662, a connection request to the callee SSP 609. The callee SSP 609 receives, in step 1664, the connection request, which also includes the telephone number of the PSTN caller telephone 1403. The callee SSP 609 issues, in step 1666, a query to the SCP 605 using the telephone number of the PSTN caller telephone 1403, and the query is received, in step 1668, by the SCP 605. The SCP 605 then instructs, in step 1670, the callee SSP to continue the call processing, and also issues, in step 1678, an instruction to the location server 1407 for a geographical location that correlates to the telephone number of the PSTN caller telephone 1403. The callee SSP 609 receives, in step 1672, the continue instruction from the SCP 605, and accepts, in step 1674, the connection request, thereby connecting, in step 1676, the telephone call between the PSTN caller telephone 1403 and the PSTN callee telephone 1413.

While the call is being connected by the callee SSP 609, the location server 1407 receives, in step 1680, the instruction issued 1678 by the SCP 605. Upon receiving 1680 the instruction, the location server 1407 determines, in step 1682, whether or not the callee is logged on at a PSTN callee computer system 1415. If it is determined 1682 that the callee is not logged on, then the data retrieval process ends, in step 1684. If, however, it is determined 1682 that the callee is logged on, then the geographical location retrieval process continues in FIG. 16D.

FIG. 16D is a flowchart showing one embodiment of the geographical information retrieval process as seen from the perspective of the PSTN callee. Once the location server 1407 has determined 1682 that a callee is logged on to a PSTN callee computer system 1415, then the location server 1407 correlates, in step 1628, the telephone number of the PSTN caller telephone 1403 to a specific geographical location. In one embodiment, this may be done using a lookup table or another database that has telephone numbers correlated to geographical locations. Since databases correlating geographical locations with telephone numbers are well-known in the art, further discussion of the correlating of geographical locations with telephone numbers is omitted here. Once a geographical location has been correlated to the telephone number of the PSTN caller telephone 1403, the geographical location is relayed, in step 1630, by the location server 1407 to the PSTN callee computer system 1415. The PSTN callee computer system 1415 receives, in step 1632, the geographical location using geographical location logic 1502 (FIG. 15B), and issues, in step 1634, an instruction for information associated with the geographical location using information collection logic 1522 (FIG. 15B). Since, in a preferred embodiment, the process is executed by the PSTN callee computer system 1415 of FIG. 15B, the PSTN callee computer system 1415 already has a list of selected items 1528 (FIG. 15B) related to a geographical location, which the callee desires to collect. Hence, in the preferred embodiment, the issued 1634 instruction includes the list of items (e.g., local time, local weather, local sports, local news, etc.) selected by the callee. Once the instruction has been issued 1634 by the information collection logic 1522 (FIG. 15B), the information server 803 receives, in step 1636, the instruction, and obtains, in step 1686, the information associated with the specific geographical location. The obtained 1686 information is then relayed, in step 1688, to the PSTN callee computer system 1415, which receives, in step 1690, the location information through the interface 1512 (FIG. 15B) and displays, in step 1692, the information for the callee using the display unit 1526 (FIG. 15B).

The geographical location retrieval logic 902 (FIGS. 9A and 9B), the Internet telephony logic 930 (FIGS. 9A and 9B), the information collection logic 922, 1522 (FIGS. 9A, 9B, 15A, and 15B), and the geographical location logic 1502 (FIGS. 15A and 15B) of the present invention can be implemented in hardware, software, firmware, or a combination thereof. In the preferred embodiment(s), the geographical location retrieval logic 902 (FIGS. 9A and 9B), the Internet telephony logic 930 (FIGS. 9A and 9B), the information collection logic 922, 1522 (FIGS. 9A, 9B, 15A, and 15B), and the geographical location logic 1502 (FIGS. 15A and 15B) is implemented in software or firmware that is stored in a memory and that is executed by a suitable instruction execution system. If implemented in hardware, as in an alternative embodiment, the geographical location retrieval logic 902 (FIGS. 9A and 9B), the Internet telephony logic 930 (FIGS. 9A and 9B), the information collection logic 922, 1522 (FIGS. 9A, 9B, 15A, and 15B), and the geographical location logic 1502 (FIGS. 15A and 15B) can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

Although an exemplary embodiment of the present invention has been shown and described, it will be apparent to those of ordinary skill in the art that a number of changes, modifications, or alterations to the invention as described may be made, none of which depart from the spirit of the present invention. For example, while specific SIP embodiments have been shown to better illustrate several aspects of the invention, it will be clear to one of ordinary skill in the art that the above-described method may be implemented in any Internet telephony system. All such changes, modifications, and alterations should therefore be seen as within the scope of the present invention.

We claim:

1. A data-gathering system, comprising:
   an Internet address location database having a plurality of Internet addresses and geographical location identification information, wherein each of the plurality of Internet addresses correlates at least a portion of the geographical location identification information;
   an information server having geographical location description information associated with the geographical location identification information; and
   an Internet communications callee device configured to receive an invite to an Internet communications session from an Internet communications caller device, the invite being directed for termination at the Internet communications callee device, the invite further comprising an Internet address of the Internet communications caller device, the Internet communications callee device being further configured to retrieve geographical location identification information from the Internet address location database using the Internet address of the Internet communications caller device, wherein the retrieved geographical location identification information correlates to the Internet address, and wherein the Internet communications callee device is further configured to collect geographical location description information related to the geographical location identification information of the Internet communications caller device from the information server.

2. The system of claim 1, wherein the information server comprises a database having a plurality of news reports, wherein each of the plurality of news reports is a news report on a different geographical location.

3. The system of claim 1, wherein the information server comprises a database having a plurality of information on sporting events, wherein each of the plurality of information on sporting events is a associated with a different geographical location.

4. The system of claim 1, wherein the information server comprises a database having a plurality of weather reports, wherein each of the plurality of weather reports is a weather report on a different geographical location.

5. A data-gathering device, for providing data to a callee of a communications session, the device comprising:
   Internet communications logic associated with a callee device, the Internet communications logic being configured to receive an invite to an Internet communications session from an Internet communications caller device, wherein the invite to the Internet communications session is configured for termination with the callee device, wherein the invite to the Internet communications session includes an Internet address of the Internet communications caller device;
   geographical location retrieval logic configured to retrieve geographical location identification information corresponding to the Internet address of the Internet communications caller device; and
   information collection logic configured to collect geographical location description information associated with the retrieved geographical location identification information about a caller, wherein the retrieved geographical location description information is provided to the callee.

6. The device of claim 5, wherein the information collection logic is further configured to collect local news associated with the received geographical location identification information.

7. The device of claim 5, wherein the information collection logic is further configured to collect a local weather report associated with the received geographical location identification information.

8. The device of claim 5, wherein the information collection logic is further configured to collect a local time associated with the received geographical location identification information.

9. The device of claim 5, wherein the information collection logic is further configured to collect information on local sporting events associated with the received geographical location identification information.

10. A data-gathering method, comprising the steps of:
   receiving an invite to an Internet communications session at a callee device, wherein the invite to the Internet communications session is configured for termination at the callee device, wherein the invite to the Internet communications session includes an Internet address of an Internet communications caller device;
   retrieving geographical location identification information corresponding to the Internet address of the Internet communications caller device;
   collecting geographical location description information associated with the retrieved geographical location identification information about a caller of a communications session; and
   sending at least a portion of the geographical location description information to a callee of the communications session.

11. The method of claim 10, wherein the step of collecting information comprises the step of requesting geographical location description information from an information server.

12. The method of claim 10, wherein the step of collecting information comprises the step of requesting a local weather report, wherein the local weather report is associated with the retrieved geographical location identification information.

13. The method of claim 10, wherein the step of collecting information comprises the step of requesting a local news report, wherein the local news report is associated with the retrieved geographical location identification information.

14. The method of claim 10, wherein the step of collecting information comprises the step of requesting a local time associated with the retrieved geographical location identification information.

15. The method of claim 10, wherein the step of collecting information comprises the step of requesting information on local sporting events, wherein the information on local sporting events is associated with the retrieved geographical location identification information.

16. A data-gathering system, comprising:
   means for receiving an invite to an Internet communications session at a callee device, wherein the invite to the Internet communications session is configured for termination at the callee device, wherein the invite to the Internet communications session includes an Internet address of an Internet communications caller device;
   means for retrieving a geographical location identification information corresponding to the Internet address of the Internet communications caller device;
   means for collecting geographical location description information associated with the retrieved geographical location identification information; and
   means for sending at least a portion of the geographical location description information to a callee of the communications session.

17. The system of claim 16, wherein the means for collecting information comprises means for requesting geographical location description information from an information server.

18. The system of claim 16, wherein the means for collecting information comprises means for requesting a local weather report, wherein the local weather report is associated with the retrieved geographical location identification information.

19. The system of claim 16, wherein the means for collecting information comprises means for requesting a local news report, wherein the local news report is associated with the retrieved geographical location identification information.

20. The system of claim 16, wherein the means for collecting information comprises means for requesting a local time associated with the retrieved geographical location identification information.

21. The system of claim 16, wherein the means for collecting information comprises means for requesting information on local sporting events, wherein the information on local sporting events is associated with the retrieved geographical location identification information.

* * * * *